(12) United States Patent
Masuko

(10) Patent No.: US 11,477,424 B2
(45) Date of Patent: Oct. 18, 2022

(54) CONTENT PROJECTION CONTROL DEVICE, INFORMATION PROCESSING METHOD, AND PROGRAM

(71) Applicant: Rakuten Group, Inc., Tokyo (JP)

(72) Inventor: Soh Masuko, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1053 days.

(21) Appl. No.: 16/090,011

(22) PCT Filed: Mar. 29, 2016

(86) PCT No.: PCT/JP2016/060120
§ 371 (c)(1),
(2) Date: Mar. 13, 2019

(87) PCT Pub. No.: WO2017/168561
PCT Pub. Date: Oct. 5, 2017

(65) Prior Publication Data
US 2019/0199988 A1 Jun. 27, 2019

(51) Int. Cl.
*H04N 9/31* (2006.01)
*G09G 5/00* (2006.01)
(Continued)

(52) U.S. Cl.
CPC ......... *H04N 9/3194* (2013.01); *G03B 21/005* (2013.01); *G03B 21/26* (2013.01); *G09G 5/00* (2013.01); *G09G 5/026* (2013.01); *G09G 5/14* (2013.01); *H04N 5/74* (2013.01); *G09G 2320/0693* (2013.01); *G09G 2330/08* (2013.01); *G09G 2340/14* (2013.01)

(58) Field of Classification Search
CPC .... H04N 9/3194; G03B 21/005; G03B 21/26; G09G 5/00; G09G 5/026

USPC .......................................................... 353/69
See application file for complete search history.

(56) References Cited

U.S. PATENT DOCUMENTS

2013/0162688 A1* 6/2013 Matsuoka .............. G09G 5/026
345/682
2016/0104435 A1 4/2016 Kohtoku

FOREIGN PATENT DOCUMENTS

JP 2001-067015 A 3/2001
JP 2004-077516 A 3/2004
(Continued)

OTHER PUBLICATIONS

International Search Report for PCT/JP2016/060120 dated Jun. 14, 2016.
(Continued)

*Primary Examiner* — Jerry L Brooks
(74) *Attorney, Agent, or Firm* — Sughrue Mion, PLLC

(57) ABSTRACT

Content data representing content that includes at least one or more components is acquired. Projection area data representing a projection area is acquired. A deteriorated part, which is a part where a projection condition is deteriorated in the projection area, is identified based on the projection area data. A priority of the component included in the content is identified. Display deterioration of the content, which is caused by the deteriorated part, is suppressed based on a position of the identified deteriorated part in the projection area, the content data displayed on the projection area, a threshold according to the identified priority, and a degree of deterioration indicative of a level of deterioration of the component.

15 Claims, 33 Drawing Sheets

(51) Int. Cl.
*H04N 5/74* (2006.01)
*G09G 5/14* (2006.01)
*G09G 5/02* (2006.01)
*G03B 21/00* (2006.01)
*G03B 21/26* (2006.01)

(56) References Cited

FOREIGN PATENT DOCUMENTS

| JP | 2007-116306 A | 5/2007 |
| JP | 2010-139575 A | 6/2010 |
| JP | 2013-148868 A | 8/2013 |
| JP | 2014-170374 A | 9/2014 |
| JP | 2015-059972 A | 3/2015 |
| WO | 2015/111158 A1 | 7/2015 |

OTHER PUBLICATIONS

International Search Report for PCT/JP2016/060121 dated Jun. 14, 2016 with ISR.

\* cited by examiner

FIG. 6

| PAGE ID | ENVIRONMENT ID | ASSUMED DATA ID |
|---|---|---|
| P0000 | A0000 | S00000000 |
| | ⋮ | ⋮ |
| | AXXXX | S0000XXXX |
| ⋮ | ⋮ | ⋮ |
| PXXXX | A0000 | SXXXX0000 |
| | ⋮ | ⋮ |
| | AXXXX | SXXXXXXXX |

CONTENT PROJECTION CONTROL DEVICE, INFORMATION PROCESSING METHOD, AND PROGRAM

CROSS REFERENCE TO RELATED APPLICATIONS

This application is a National Stage of International Application No. PCT/JP2016/060120 filed Mar. 29, 2016, the entirety of which is incorporated herein by reference.

TECHNICAL FIELD

The present invention relates to a content projection control device, an information processing method, and a program that achieves the content projection control device and especially relates to a process regarding content projected onto a projection area.

CITATION LIST

Patent Literature

Patent Literature 1: JP 2014-170374 A
Patent Literature 2: JP 2010-139575 A
Patent Literature 3: JP 2001-67015 A

BACKGROUND ART

For example, there has been widely spreading a projection device that projects content (visual information) onto a required projection target such as a whiteboard and a wall of a worn. Further, techniques that assist the content projection performed by such projection device have been variously proposed.

Patent Literature 1 discloses a technique that calibrates a displacement between a coordinate system of a virtual screen on which Computer Graphics (CG) is displayed and a coordinate system of a real environment visually perceived through the virtual screen by projective transformation or similar method.

Patent Literature 2 discloses a technique that adjusts a depth of focus of a projected image to prevent deterioration of an image quality such as a blurred virtual image formed with the projected image.

Patent Literature 3 discloses a technique that adjusts a projection area using an adjustment chart.

SUMMARY OF THE INVENTION

Technical Problem

However, in the case where a condition of a projection area onto which content is projected is poor, for example, when at least a part of a color or a pattern of a projection-target wall affects a display aspect of the content, or when an attachment such as a calendar or a clock overlaps with the projection area, visibility of the projected content is possibly deteriorated.

In view of the above-described problem, an object of the present invention is to suppress deterioration of visibility of projected content even when a condition of a projection area is poor.

Solutions To The Problems

A content projection control device according to the present invention includes a content data acquisition unit, a projection area data acquisition unit, a deteriorated part identification unit, and a display aspect change unit. The content data acquisition unit is configured to acquire content data representing content that includes at least one or more components. The projection area data acquisition unit is configured to acquire projection area data representing a projection area. The deteriorated part identification unit is configured to identify a deteriorated part based on the projection area data. The deteriorated part is a part where a projection condition is deteriorated in the projection area. The display aspect change unit is configured to change a display aspect of a component displayed on the deteriorated part among the one or more components included in the content data, based on a position of the identified deteriorated part in the projection area and the content data displayed on the projection area.

Thus, the display aspect of the component on the deteriorated part in content projected onto the projection area can be changed.

The above-described content projection control device according the present invention can be configured as follows. The deteriorated part identification unit is configured to identify the deteriorated part based on a captured image and an image of the content. The captured image is an image produced by capturing an image of the content projected onto the projection area, and the content is represented by the content data.

This allows properly identifying the component requiring a correction in the projected content.

The above-described content projection control device according to the present invention can be configured as follows. The content projection control device includes a priority identification unit configured to identify a priority of the component included in the content. The display aspect change unit is configured to change the display aspect of the component displayed on the deteriorated part, based on a threshold according to the identified priority and a level of deterioration of the component.

Accordingly, the display aspect change is not executed on all components displayed on the deteriorated part but can be selectively executed on the component selected based on the priority of the component.

The above-described content projection control device according to the present invention can be configured as follows. The priority identification unit is configured to identify the priority based on a feature quantity of the component included in the content.

This allows setting the appropriate priority according to the feature of the component.

The above-described content projection control device according to the present invention can be configured as follows. The priority identification unit is configured to identify the priority based on a projected size of the component included in the content.

It can be said that the larger the projected size of the component is, the higher a degree of importance of this component is; therefore, the configuration ensures appropriately changing the display aspect in accordance with the degree of importance of the component.

The above-described content projection control device according the present invention can be configured as follows. The priority identification unit is configured to identify the priority based on an attribute of the component included in the content.

It can be said that the degree of importance of the component is correlated to this attribute of the component;

therefore, the configuration ensures appropriately changing the display aspect in accordance with the degree of importance of the component.

The above-described content projection control device according to the present invention can be configured as follows. The component includes a character. The display aspect change unit is configured to change a display color of the character included in the component to a color emphasized with respect to a color of the deteriorated part.

This ensures suppressing the deterioration of visibility of this character when the visibility of the character included in the component is deteriorated due to an influence of the deteriorated part.

The above-described content projection control device according to the present invention can be configured as follows. The component includes a character. The display aspect change unit is configured to change a display color other than a display color of the character included in the component to a color assimilated to a color of the deteriorated part.

This ensures suppressing the deterioration of visibility of this character when the visibility of the character included in the component is deteriorated due to the influence of the deteriorated part.

An information processing method according to the present invention executed by an information processing device includes: a content data acquisition step of acquiring content data representing content that includes at least one or more components; a projection area data acquisition step of acquiring projection area data representing a projection area; a deteriorated part identification step of identifying a deteriorated part based on the projection area data, the deteriorated part being a part where a projection condition is deteriorated in the projection area; and a display aspect change step of changing a display aspect of a component displayed on the deteriorated part among the one or more components included in the content data based on a position of the identified deteriorated part in the projection area and the content data displayed on the projection area.

By this information processing method, effects can be obtained similar to those of the above-described content projection control device according to the present invention.

Furthermore, a program according to the present invention is a program that causes an information processing device to execute a process executed as the information processing method.

EFFECTS OF THE INVENTION

The present invention ensures suppressing deterioration of visibility of projected content even when a condition of a projection area is poor.

BRIEF DESCRIPTION OF THE DRAWINGS

FIG. 6 is an explanatory view regarding assumed data management information.

DESCRIPTION OF EMBODIMENTS

The following describes embodiments in the order listed below.
<1. First Embodiment>
[1-1. Outline of Network System]
[1-2. Device Configuration]
[1-3. Deterioration Correction Method of First Embodiment]
[1-4. Process Procedure]
[1-5. Modification 1]
[1-6. Modification 2]
[1-7. Modification 3]
[1-8. Modification 4]
[1-9. Modification 5]
[1-10. Summary of First Embodiment]
<2. Second Embodiment>
[2-1. Outline of Network System]
[2-2. Deterioration Handling Process Method of Second Embodiment]
[2-3. Process Procedure]
[2-4. Modification 1]
[2-5. Modification 2]
[2-6. Modification 3]
[2-7. Modification 4]
[2-8. Modification 5]
[2-9. Modification 6]
[2-10. Modification 7]
[2-11. Summary of Second Embodiment]
<3. Program and Storage Medium>

1. First Embodiment 1-1. Outline of Network System

Figure 1:
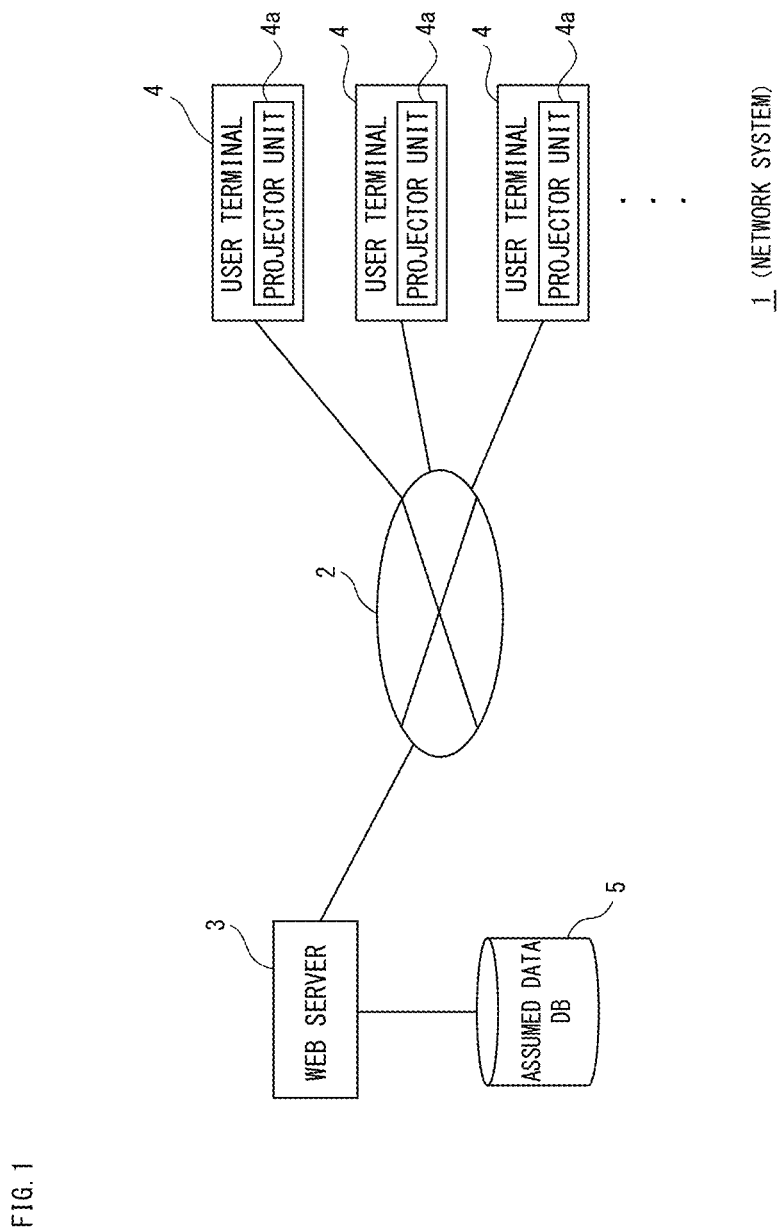
FIG. 1 is a drawing illustrating an example of a network system of a first embodiment according to the present invention.

FIG. 1 illustrates an example of a network system 1 premised in the embodiment.

The network system 1 of the embodiment includes, for example, a web server 3, a plurality of user terminals 4, 4, ..., 4, which are configured to communicate with one another via a network 2 as the Internet, and an assumed data DB 5.

The user terminal 4 is configured as a computer device (information processing device) including a web browser. Examples of the user terminal 4 include an intelligent mobile phone (smart phone), a mobile phone, and a portable information terminal (such as a tablet terminal); however, the type of the user terminal 4 is not limited to the above.

The user terminal 4 transmits a Hypertext Transfer Protocol (HTTP) request to the web server 3 to request a web page or a predetermined process. Additionally, the user terminal 4 receives web page data (for example, HyperText Markup Language (HTML) data) transmitted in response to the HTTP request and executes a display process of the web page. This allows a user to browse and operate a desired web page.

Although described later, the user terminal 4 includes a projector unit 4a as means to display visual content (hereinafter also simply referred to as "content"), thereby ensuring projecting and displaying the content based on the web page data received as described above by this projector unit 4a.

Note that the web page is merely one example of "projected content" and the content is not limited to this one.

The web server 3 is configured of a computer device and executes various processes based on the HTTP request transmitted from the user terminal 4. For example, the web server 3 creates and transmits the web page data of the requested web page.

The web server 3 and the assumed data DB 5 are configured to communicate with one another via a network such as a Local Area Network (LAN). The web server 3 executes a process to correct the content projected by the projector unit 4a of the user terminal 4 based on information stored in the assumed data DB 5. Details of this process and this information stored in the assumed data DB 5 will be described again later.

In FIG. 1, various examples of the configuration of the network 2 are assumed. For example, in addition to the Internet, an intranet, an extranet, a Local Area Network (LAN), a Community Antenna TeleVision (CATV) communications network, a virtual private network, a telephone line network, a mobile communications network, and a satellite communications network are assumed.

Additionally, various examples of a transmission medium constituting all of or a part of the network 2 are assumed. For example, a wired transmission medium such as Institute of Electrical and Electronics Engineers (IEEE) 1394, Universal Serial Bus (USB), a power-line carrier, and a telephone line; and a wireless transmission medium such as an infrared like Infrared Data Association (IrDA), Bluetooth (registered trademark), 802.11 wireless, a mobile telephone network, a satellite channel, and a terrestrial digital network are usable.

1-2. Device Configuration

Figure 2:
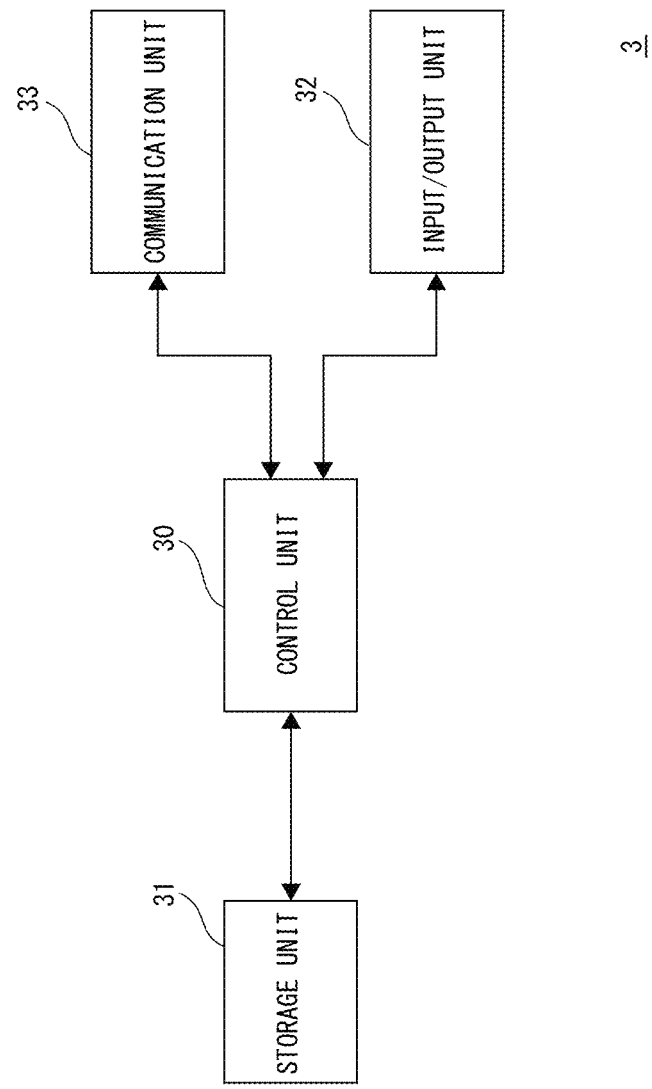
FIG. 2 is a block diagram illustrating an internal configuration of an information processing device as the first embodiment.

FIG. 2 is a block diagram illustrating an internal configuration of the web server 3 illustrated inn FIG. 1.

As illustrated in the drawing, the web server 3 includes a control unit 30, a storage unit 31, an input/output unit 32, and a communication unit 33.

The control unit 30 is configured such that the control unit 30 includes a Central Processing Unit (CPU), a Read Only Memory (ROM), and a Random Access Memory (RAM). To the control unit 30, the storage unit 31 including a Hard Disk Drive (HDD), a flash memory device, and similar device is coupled. Thus writing/reading various kinds of data to/from this storage unit 31 are ensured. The control unit 30 executes various processes in accordance with a program stored on the ROM or a program loaded from the storage unit 31 to the RAM. The RAM appropriately stores data and the like required to execute the various processes by the CPU.

To the control unit 30, the input/output unit 32 is coupled. The input/output unit 32 functions as input/output interfaces of various devices, for example, an operation input device including a keyboard, a computer mouse, a touchscreen, and similar device; a display device including a Liquid Crystal Display (LCD), a Cathode Ray Tube (CRT), an organic Electroluminescence (EL) panel, and similar device; and further a read/write device configured to execute reading/writing on a removable media such as a magnetic disk, an optical disk, a magneto-optical disk, and a semiconductor memory, are coupled as necessary. The control unit 30 is configured to input/output information using these various devices coupled to the input/output unit 32.

To the control unit 30, the communication unit 33 configured to perform mutual data communications with external equipment is coupled. In this example, the communication unit 33 is configured to perform communications over the Internet, and this allows the control unit 30 to exchange various kinds of data with the user terminal 4 over the network 2.

Here, the web server 3 with the above configuration allows uploading and downloading the data and the programs through the communications by the communication unit 33 and delivering the data and the programs via the removable media using the above-described read/write device.

By performing a process operation based on various programs by the control unit 30, information processing and communications described later are executed in the web server 3.

An information processing device as the web server 3 may include a plurality of systematized computer devices. The plurality of computer devices may be systematized with LAN or the like, or may be arranged at remote locations with VPN or the like using, for example, the Internet.

Figure 3:
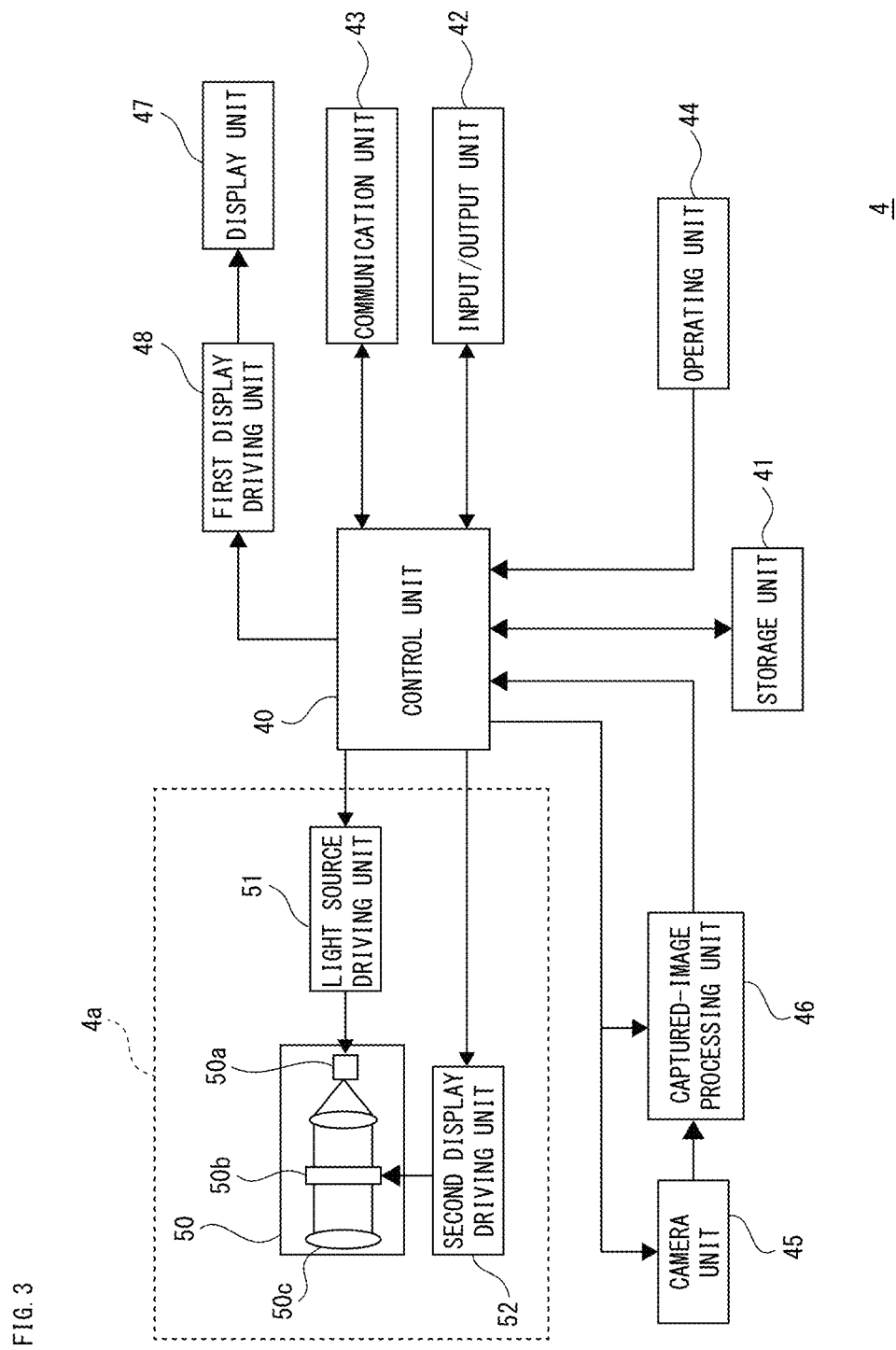
FIG. 3 is a block diagram illustrating an internal configuration of a user terminal constituting the network system of the embodiment.

FIG. 3 is a block diagram illustrating an internal configuration of the user terminal 4 illustrated in FIG. 1.

The user terminal 4 includes the projector unit 4a, a control unit 40, a storage unit 41, an input/output unit 42, a communication unit 43, an operating unit 44, a camera unit 45, a captured-image processing unit 46, a display unit 47, and a first display driving unit 48.

The control unit 40 includes a CPU, a ROM, and a RAM. To the control unit 40, the storage unit 41 including an HDD, a flash memory device, or similar device is coupled to ensure writing/reading various kinds of data to/from this storage unit 41. The control unit 40 executes various processes in accordance with a program stored on the ROM or a program loaded from the storage unit 41 to the RAM. The RAM appropriately stores data and the like required to execute the various processes by the CPU.

Here, the ROM in the control unit 40 or the storage unit 41 stores a program to achieve a function as a web browser. The control unit 40 acquires web page data from the web server 3 or performs a process to display the web page based on the acquired web page data in accordance with this program.

To the control unit 40, the input/output unit 42 functioning as input/output interfaces of various devices is coupled. This allows the control unit 40 to exchange data with various external devices coupled to the input/output unit 42.

To the control unit 40, the communication unit 43 configured to perform mutual data communications with external equipment is coupled. In this example, the communication unit 43 is configured to perform communications over the Internet, and this allows the control unit 40 to exchange various kinds of data with the web server (control unit 30) over the network 2.

To the control unit 40, the operating unit 44 is coupled. The operating unit 44 includes various operators such as a button and a touchscreen for a user to perform operation input and supplies an operation input signal according to an operation to the operator to the control unit 40.

The control unit 40 executes a process according to the operation input signal from the operating unit 44 in accordance with the program. Thus, the user terminal 4 executes an action according to the user's operation input.

The camera unit 45 includes an imaging lens to capture an image of a subject and an imaging device. In this example, this imaging device is configured to image a color image.

The captured-image processing unit 46 executes a predetermined captured-image signal process such as an A/D conversion process and a correction process of various optical aberrations on a captured image signal obtained by the imaging device in the camera unit 45 to obtain captured image data as digital data.

These camera unit 45 and captured-image processing unit 46 read the captured image signal from the imaging device and execute the captured-image signal process based on an instruction from the control unit 40.

Here, an imaging direction of the camera unit 45 is set to a direction such that an image projected onto a projection target by the projector unit 4a can be captured in the direction.

The captured-image processing unit 46 is coupled to the control unit 40, and the control unit 40 is configured to acquire the captured image data captured by the captured-image processing unit 46. The control unit 40 is configured to cause the storage unit 41 to store the acquired captured image data or transmit the captured image data to the external device via the communication unit 43.

The display unit 47 includes, for example, an LCD and an organic Electro luminescence (EL) panel and displays various kinds of information.

The first display driving unit 48 performs a display driving of the display unit 47 based on an instruction from the control unit 40.

The projector unit 4a includes a projection optical system 50, a light source driving unit 51, and a second display driving unit 52.

The projection optical system 50 includes a light source 50a, an optical modulation element 50b, and a projection lens 50c. The light source 50a includes, for example, a light-emitting diode (LED) functioning as a light source of projection light. The optical modulation element 50b performs an optical modulation (optical intensity modulation) in units of pixels on a light entered from the light source 50a. The projection lens 50c projects the light on which the optical modulation has been performed by the optical modulation element 50b onto the projection target. While the optical modulation element 50b uses a transmission type liquid crystal panel in this example, for example, other optical modulation elements such as a reflection type liquid crystal panel and a micromirror are also usable.

The light source driving unit 51 turns on/off the light source 50a and adjusts the amount of light based on an instruction from the control unit 40.

A second display driving unit 52 performs display driving on the optical modulation element 50b, specifically, drives respective pixels of the optical modulation element 50b such that the optical intensity is modulated in units of pixels based on the instruction from the control unit 40.

Here, the projector unit 4a of this embodiment is configured to project the color image. When the liquid crystal panel is used as the optical modulation element 50b, the following configuration, so-called 3-CCD method, is employed to project the color image. A light (white light)

emitted by the light source 50*a* is separated into lights in respective colors of R (red), G (green), and B (blue); the optical modulation elements 50*b*, which are arranged at respective individual optical paths for R, G, and B, perform optical modulation on the separated lights; and the projection lens 50*c* projects a synthetic light obtained through synthesis of the respective lights after the modulation. Note that the drawing illustrates only the single optical path and the single optical modulation element 50*b* for simplification. In the 3-CCD method, the second display driving unit 52 performs the display driving on the liquid crystal panels (optical modulation element 50*b*) in the colors corresponding to and based on respective values of color image data R, G, and B to be projected.

The configuration of the user terminal 4 is not limited to the configuration illustrated in FIG. 3. For example, the projector unit 4*a* and the camera unit 45 need not to be built into the user terminal 4 but can be externally mounted.

1-3. Deterioration Correction Method of First Embodiment

Figure 4:
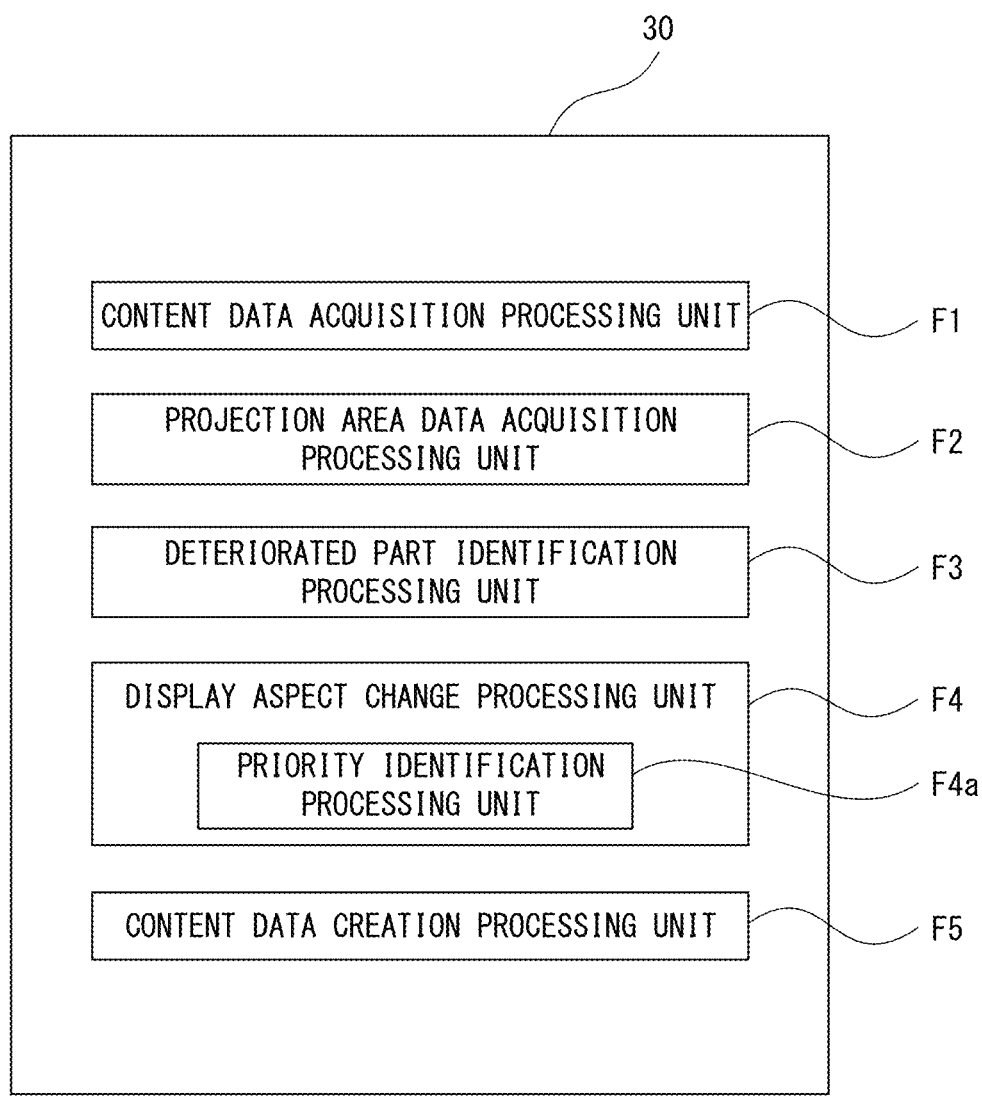
FIG. 4 is a function block diagram illustrating functions related to a deterioration correction method of the first embodiment into blocks.

The following describes various functions achieved by the control unit 30 in the web server 3 with reference to the function block diagram of FIG. 4.

FIG. 4 illustrates various processes executed by the control unit 30 to achieve the deterioration correction method of the first embodiment into blocks by functions.

Figure 5A:
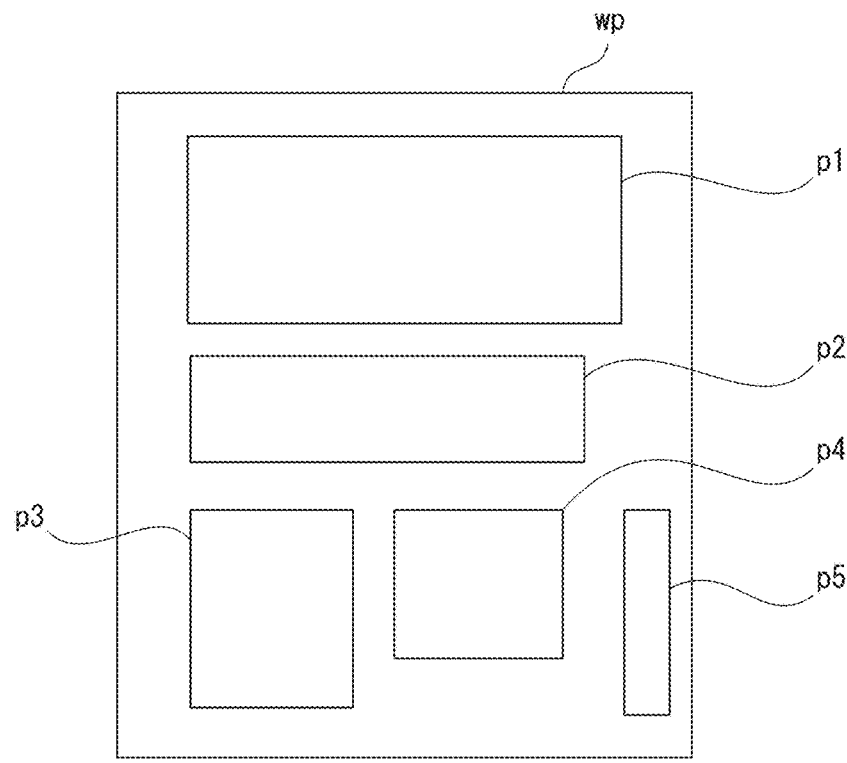
FIGS. 5A and 5B include drawings illustrating one example of content and a projection area.
Figure 5B:
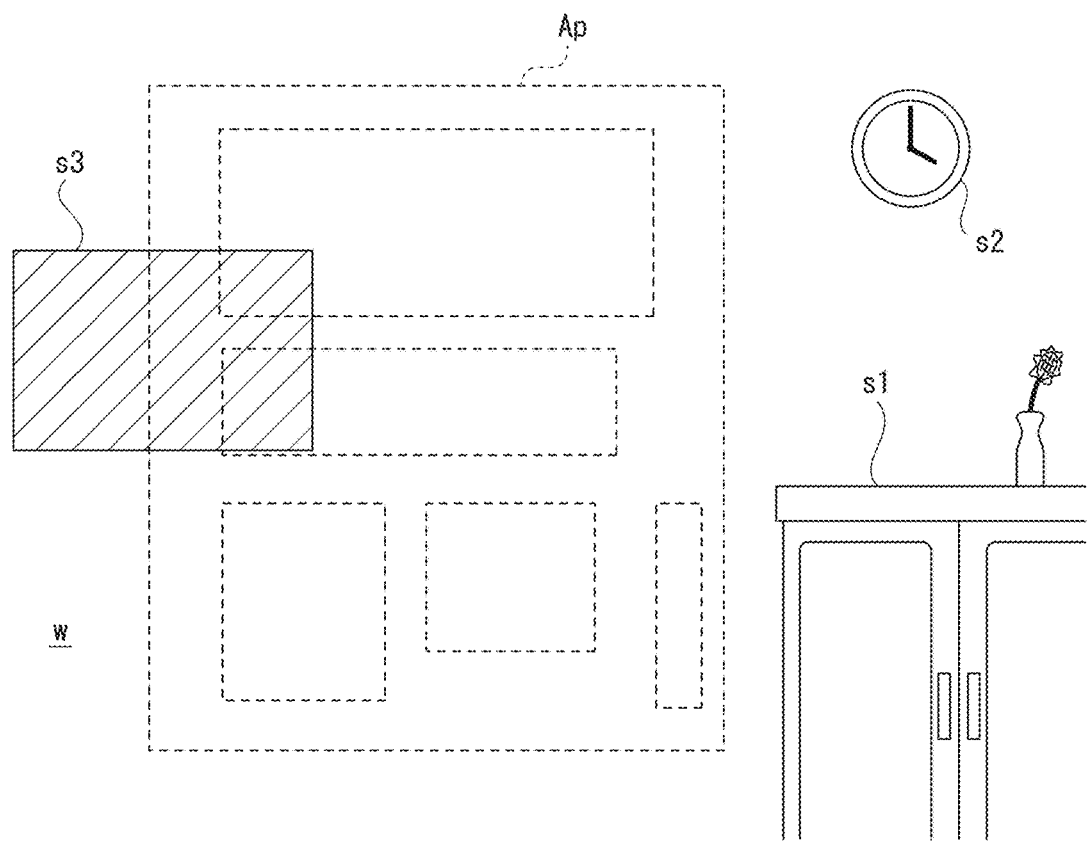

Here, first, the following describes a necessity for deterioration correction of the embodiment with reference to FIGS. 5A and 5B.

FIG. 5A illustrates an example of content projected by the projector unit 4*a*, and FIG. 5B illustrates an example of a projection target as a target onto which the content is projected.

This example premises that when the user terminal 4 causes the projector unit 4*a* to project the content based on the web page data acquired from the web server 3, the web server 3 executes the deterioration correction on the projected content based on an image captured by the user terminal 4.

FIG. 5A illustrates respective constituent parts p arranged on a web page wp as one example of the content.

The web page wp includes five constituent parts p, p1 to p5. The constituent parts p are components each constituting a part of the web page wp. This example assumes that the constituent parts p are components partitioned by tags to designate ranges, such as a <P> tag and a <div> tag, in HTML.

The constituent part p is a component defined irrelevant to a deteriorated part among the components constituting the content. Unless a shape, a size, and a position of this constituent part p match a shape, a size, and a position of the deteriorated part in the content respectively, the range of the deteriorated part would not be equal to the range of the constituent part p.

In this example, the respective constituent parts p include text information (character information) and a background color of this text can be designated by HTML.

In this description, "character" is a concept including a number and a sign and means information expressible with, for example, a character code.

In the web page wp, the respective constituent parts p have different display sizes (display areas: image sizes) and decrease in display size from p1 to p5. As illustrated in the drawing, the constituent part p1 with the largest display size is arranged on the uppermost part on the web page wp, the constituent part p2 with the second largest display size is arranged on the lower side of the constituent part p1. The constituent part p3 and the constituent part p4 are arranged side to side on the lower side of the constituent part p2, and the constituent part p5 with the smallest display size is arranged to the right of the constituent part p4.

It is assumed that the content as the web page wp is projected onto a wall w of a room as illustrated in FIG. 5B.

Furniture s1 is arranged close to the wall w, a clock s2 is hung on the wall w, and a pasted material s3 such as a poster and a calendar is pasted on the wall w. In FIG. 5B, a projection area Ap of this web page wp when the projector unit 4*a* projects the web page wp is indicated by the dashed lines. However, depending on the arrangement configuration of obstacles such as the furniture s1, the clock s2, and the pasted material s3 with respect to the wall w, the projection area Ap cannot be set to a position at which all obstacles are avoided. In such cases, there is no choice but to project the web page wp in the state where the obstacle partially overlaps.

The visibility of the web page wp possibly worsens at the part overlapped with the obstacle. In view of this, the embodiment executes the correction to suppress the deterioration, targeting the part where deterioration occurs due to the overlap with the obstacle, such that the deterioration could worsen the visibility.

Now, the description returns to FIG. 4.

As illustrated in the drawing, the control unit 30 in the web server 3 can be represented as including a content data acquisition processing unit F1, a projection area data acquisition processing unit F2, a deteriorated part identification processing unit F3, a display aspect change processing unit F4, and a content data creation processing unit F5, by the functions.

The content data acquisition processing unit F1 acquires content data representing content that includes at least one or more components. That is, in this example, the web page wp is acquired.

The projection area data acquisition processing unit F2 acquires projection area data representing the projection area.

In this example, the projection area data acquisition processing unit F2 acquires, as the projection area data, imaging data obtained by capturing an image of the content projected onto the projection area Ap. Specifically, the projection area data acquisition processing unit F2 acquires the web page wp projected by the projector unit 4*a* by receiving the captured image data Si, which is obtained by being captured by the camera unit 45, from the user terminal 4.

The deteriorated part identification processing unit F3 identifies the deteriorated part, which is a part where a projection condition is deteriorated in the projection area, based on the projection area data.

The deteriorated part identification processing unit F3 in this example identifies the deteriorated part based on the captured image (the captured image data Si in this example) produced by capturing the image of the content represented by the content data projected onto the projection area Ap, and the image of the content. Specifically, the deteriorated part identification processing unit F3 identifies the deteriorated part based on the captured image data Si and assumed display data corresponding to the content projected onto the projection area.

Here, the assumed display data is data assuming that the content is displayed in what aspect when this content is projected onto the projection target. When a factor to worsen the visibility is absent in the projection area Ap, the projection area data acquisition processing unit F2 acquires the imaging data in an aspect approximately matching the assumed display data.

The assumed display data at least includes data representing a color at each position in the projected content. Specifically, the assumed display data in this example is configured as image data having luminance values of R, B, and G for each pixel when the image as the content is divided in units of pixels by predetermined sizes.

In this example, the assumed display data is prepared with respect to each web page that can be distributed by the web server 3. Further, the assumed display data with respect to each web page is prepared for each environment possibly assumed as a projection environment when the projector unit 4a projects the content. Items representing the projection environments include, for example, the color of the projection target and brightness of the room where the projection is performed (for example, whether an illumination of the room is reduced or not).

The assumed display data is preliminarily created based on results of actual projections for each assumed projection environment of the content as the respective web pages. Alternatively, display images when projected may be preliminarily obtained by simulation operation for each projection environment.

In this example, to allow the web server 3 to acquire the above-described assumed display data, the web server 3 acquires projection environment identification information for identification of the projection environment from the user terminal 4. The user terminal 4 acquires the projection environment identification information based on an operation input by a user. For example, the control unit 40 in the user terminal 4 causes the display unit 47 to display a list of the assumed projection environments to cause the user to select the corresponding projection environment from this list. The control unit 40 transmits the projection environment identification information uniquely representing the selected projection environment to the web server 3.

The projection area data acquisition processing unit F2 acquires the corresponding assumed display data from an assumed data DB 5 based on the projection environment identification information transmitted from the user terminal 4.

Note that, for simplification, the following mentions the projection environment identification information as "environment ID."

FIG. 6 illustrates an example of assumed data management information I1 to manage the assumed display data stored in the assumed data DB 5.

The assumed data DB 5 stores the assumed display data corresponding to the respective projection environments with respect to each web page that can be distributed by the web server 3. The assumed data DB 5 stores the assumed data management information I1 to manage the assumed display data. As illustrated in the drawing, this assumed data management information I1 is configured as information in which assumed data IDs to uniquely identify the corresponding assumed display data are made to correspond to each combination of page IDs to uniquely identify the above-described respective web pages and the environment IDs.

Based on the assumed data management information I1, the web server 3 acquires the assumed display data corresponding to the environment ID received from this user terminal 4 among the assumed display data corresponding to the web page projected by the user terminal 4.

In this example, since the user terminal 4 projects the web page requested to the web server 3 by the projector unit 4a, the page ID of the projected web page is identified on the web server 3 side at the time of above-described request. That is, the web server 3 acquires the corresponding assumed display data from the assumed data DB 5 in accordance with the assumed data management information I1 based on the page ID identified according to the request of the web page from the user terminal 4 and the environment ID received from this user terminal 4.

Note that preliminarily preparing the assumed display data is not essential. For example, when the corresponding web page is projected under the corresponding projection environment, the assumed display data at that time can be acquired each time by the above-described simulation operation based on the page ID of the web page requested by the user terminal 4 and the environment ID acquired from this user terminal 4. In this case, the assumed data DB 5 can be omitted.

The example of the case where the assumed display data considering the difference of the projection environment on the user terminal 4 side is acquired has been described above. However, considering the difference of the projection environment is not essential for the deterioration correction of the content.

In this example, the deteriorated part is identified based on a result of detecting a difference between the assumed display data and the captured image data Si.

In this respect, as difference information, information indicative of a difference in feature quantities between the assumed display data and the imaging data is identified. Specifically, in this example, information indicative of a difference in colors between the assumed display data and the captured image data Si is identified. Specifically, the information indicative of the difference in colors is a difference in luminance values of R, G, and B in each pixel.

In this description, "color" is a concept including black, white, and gray.

In this example, the difference information is identified in units of pixels of the captured image data Si.

Here, to identify the difference information in units of pixels of the captured image data Si, it should be noted that how many pixels of the imaging device (captured image data Si) corresponding to a part equivalent to one pixel in the assumed display data varies depending on a focal distance of the camera unit 45 and a distance from the imaging device to the projection target when the user terminal 4 obtains the captured image data Si. That is, it should be noted that a pixel correspondence relationship (hereinafter denoted as "pixel correspondence relationship Rp") between the captured image data Si and the assumed display data varies: the relationship indicates that each pixel constituting the image, part in the projected content present in the captured image data Si corresponds to which pixel in the assumed display data.

To identify such pixel correspondence relationship Rp, the deteriorated part identification processing unit F3 identifies the image part in the projected web page wp in the acquired captured image data Si and calculates that one pixel in the assumed display data is equivalent to how many pixels in the captured image data Si from a ratio between the image size of this identified image part and the image size of the assumed display data. From this calculation result, the deteriorated part identification processing unit F3 identifies the pixel correspondence relationship Rp and identifies the difference information between the assumed display data and the captured image data Si (the image part in the projected content) in units of pixels of the captured image data Si, based on the identified pixel correspondence-relationship Rp.

The deteriorated part identification processing unit F3 identifies a part where a magnitude of the difference in colors (the difference in feature quantities) obtained as the difference information is equal to or more than a constant value as a deteriorated part D. Specifically, for example, a part where a summed value of the differences (absolute values) in the luminance values of R, G, and B is equal to or more than the constant value is identified as the deteriorated part D.

Figure 7:
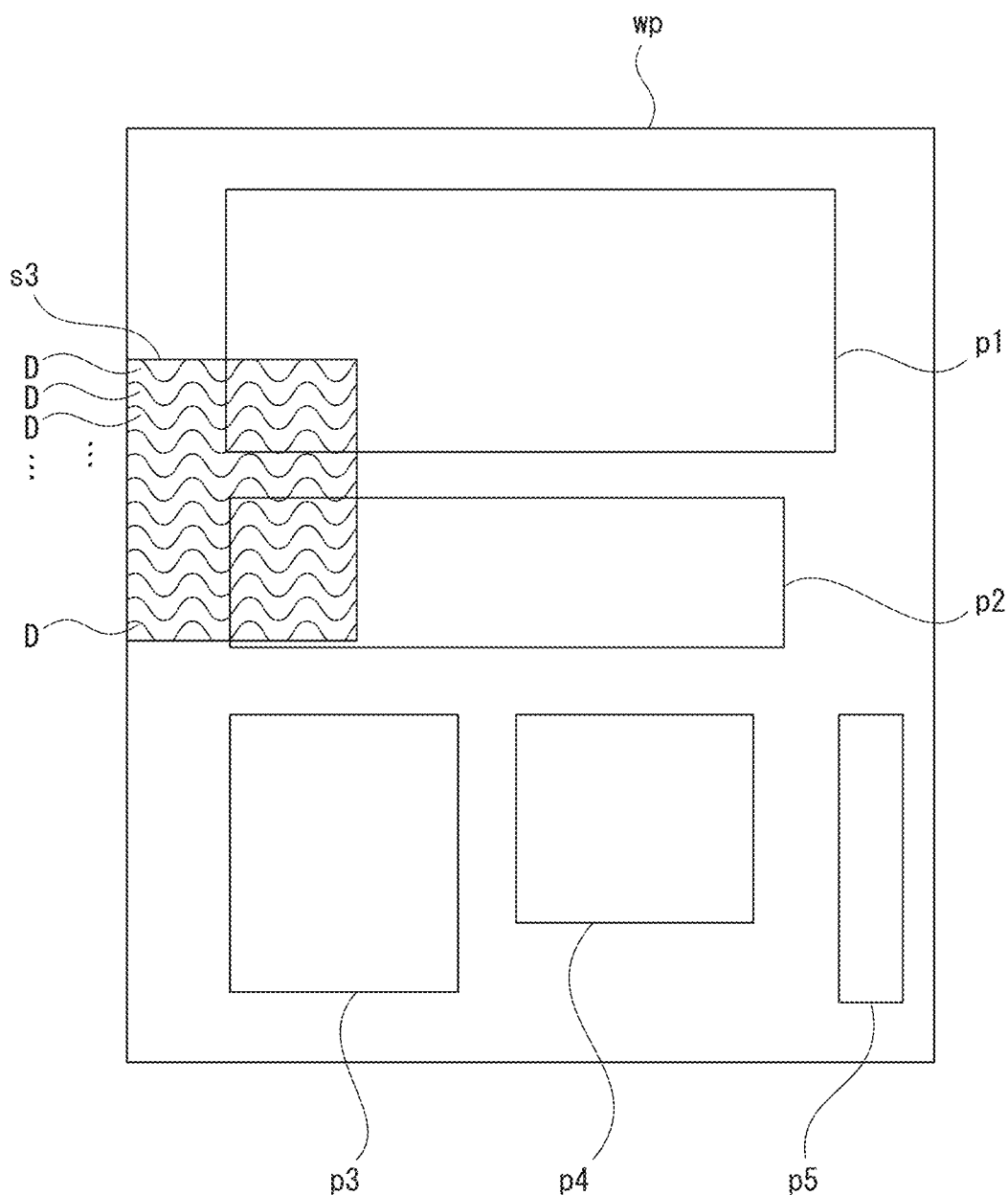
FIG. 7 is a drawing illustrating an example of deteriorated parts.

FIG. 7 describes the example of the deteriorated part D.

FIG. 7 illustrates an example of the deteriorated parts D in the case where the web page wp is projected onto the projection area Ap illustrated in the previous FIG. 5B.

Here, it is assumed that the pasted material s3 is, for example, a poster, and that a plurality of black patterns having a wavy line shape as illustrated in the drawing are formed on a white background. In this case, the deteriorated part identification processing unit F3 may identify each of these parts of black wavy line patterns as the deteriorated part D. Note that, depending on contents drawn on the pasted material s3, the deteriorated part D may have a character shape in some cases.

Now referring again to FIG. 4, the display aspect change processing unit F4 changes a display aspect of a component displayed on the deteriorated part among the components included in the content data based on the position of the identified deteriorated part in the projection area and the content data displayed on the projection area.

In this example, the color is changed as the change in display aspect.

Here, in accordance with the premise that the web page wp is projected in this example, the display aspect is changed in units of the constituent parts p. That is, the display aspect is changed targeting the constituent part p displayed on the deteriorated part D (in other words, the constituent part p overlapped with the deteriorated part D).

In this respect, this example does not always change the display aspect of the constituent part p overlapped with the deteriorated part D but selects (identifies) the constituent part p as a target for the display aspect change, in accordance with a priority identified with respect to each constituent part p.

The following describes a concrete example of the display aspect change method in this example.

First, the control unit 30 identifies the priorities with respect to each constituent part p constituting the web page wp. Such function of identifying the priorities is referred to as a priority identification processing unit F4a in FIG. 4.

In this example, the priority identification processing unit F4a identifies the priorities based on degrees of importance of the constituent parts p. Specifically, the priorities are identified based on projected sizes of the constituent parts p. Since the image sizes increase in the order of the constituent parts p1 to p5 on the web page wp, their projected sizes are in the identical order. Therefore, as the priorities in this case, the priority identification processing unit F4a identifies the higher priority gradually from the constituent part p5 to the constituent part p1.

The display aspect change processing unit F4 in this example identifies the constituent part p that should be the target for display aspect change, using degrees of deterioration of each constituent part p as the indexes, together with the above-described priority. Specifically, the display aspect change processing unit F4 in this case calculates the degrees of deterioration of each constituent part p and determines whether the constituent part p is the constituent part p that should be the target for display aspect change or not based on this degree of deterioration and the priority.

Here, the degree of deterioration is an index indicative of a level of deterioration caused by the deteriorated part D in the component constituting the content. And in this example, the degree of deterioration is calculated as follows: the degree of deterioration is calculated by multiplying a proportion of a display area of the deteriorated part D occupying a display area of the target constituent part p (hereinafter referred to as "deteriorated area proportion") by an average value of differences in colors in the deteriorated part D overlapped with this constituent part p (differences in colors identified as the above-described difference information). This average value is an average value of the pixels constituting the deteriorated part D.

Thus, the degree of deterioration of each constituent part p in this example is calculated considering the area overlapped with the deteriorated part D and the magnitude of the difference with the assumed display data at this deteriorated part D.

To determine the constituent part p that should be the target for display aspect change, first, the above-described degrees of deterioration are calculated with respect to each constituent part p overlapped with the deteriorated part D. Then, whether the calculated degree of deterioration of the constituent part p is equal to or more than a threshold THp fixed according to the priority identified for this constituent part p or not is determined to determine whether this constituent part p is the constituent part p that should be set as the change target for display aspect or not.

In this case, the threshold THp is configured, for example, so as to have a smaller value as the priority of the constituent part p becomes high as follows. In other words, the constituent part p with the higher priority is likely to be determined as the target for display aspect change at the lower degree of deterioration.

Priority: 1→threshold THp=5
Priority: 2→threshold THp=10
Priority: 3→threshold THp=20
Priority: 4→threshold THp=35
Priority: 5→Threshold THp=50

This allows execution of the display aspect change preferentially on the important constituent part p. In other words, this allows preventing the unnecessary display aspect change of the unimportant constituent part p, thereby ensuring reducing a processing load.

The display aspect change processing unit F4 identifies the constituent part p that should be the target for display aspect change by the determination process in accordance with the degree of deterioration and the priority as described above and then changes the display aspect of this constituent part p as follows.

Figure 8:
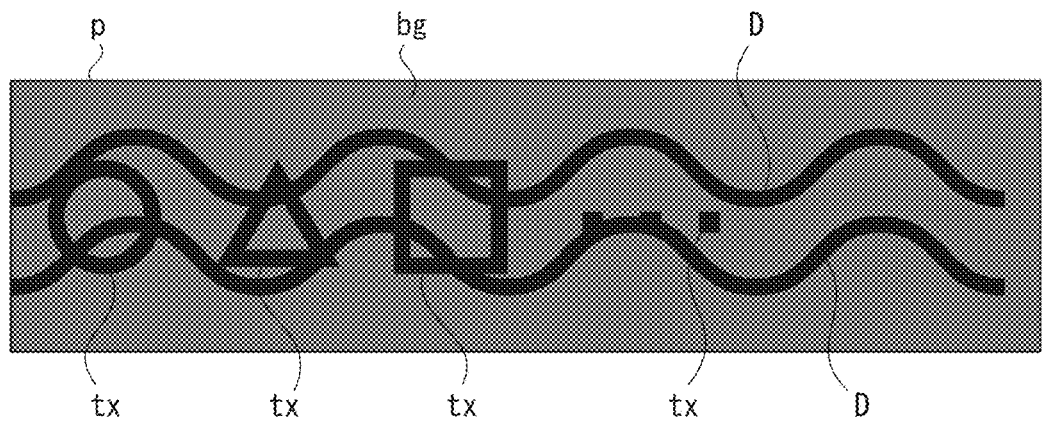
FIG. 8 is a drawing illustrating an example of the deteriorated parts overlapped with a constituent part.

FIG. 8 illustrates an example of the constituent part p determined as the target for display aspect change with which the deteriorated parts D, the black wavy line patterns, as previously illustrated in FIG. 7 as the example, overlap. In this case, character parts tx in the constituent part p have black colors and a background color of the character parts tx is a dark gray.

Figure 9A:
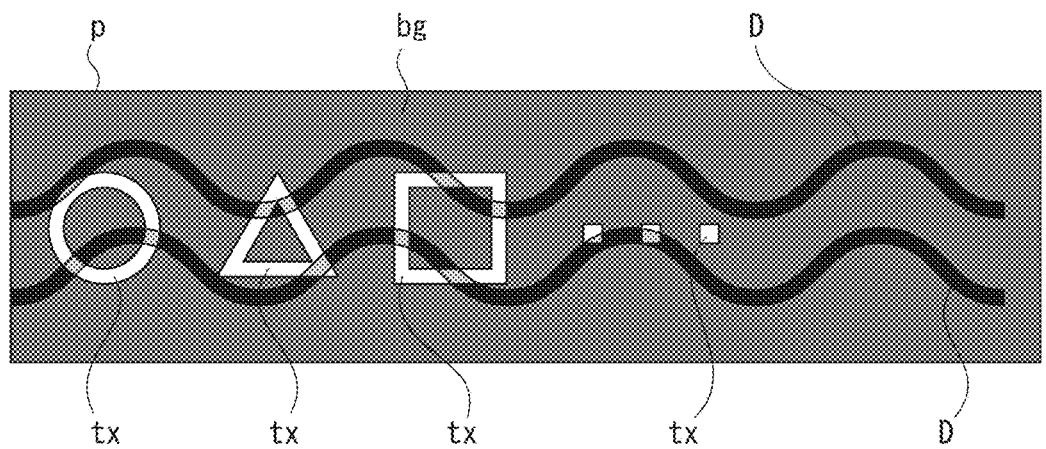
FIGS. 9A and 9B include explanatory views regarding examples of display aspect change.

With the constituent part p including the characters like this example, the display aspect is changed such that the display colors of the character parts tx in this constituent part p are changed to colors emphasized (colors to be stood out) with respect to the colors of the deteriorated parts D as illustrated in FIG. 9A. Specifically, in this case, corresponding to the colors of the deteriorated parts D being black, the colors of the character parts tx are changed to white (or a color close to white).

This ensures enhancing the visibility of the character parts tx compared with that in the original state (FIG. 8).

With the colors of the deteriorated parts D being gray, the colors of the character parts tx are changed to white (or the colors close to white) as the above-described "emphasized colors" as well.

When the deteriorated parts D have colors other than black and gray, the colors of the character parts tx are changed to opposite colors (complementary colors) of the colors of the deteriorated parts D as the above-described "emphasized colors." For example, a yellow base is employed with the colors of the deteriorated parts D being a blue base, and a green base is employed with the colors of the deteriorated parts D being a red base.

Figure 9B:
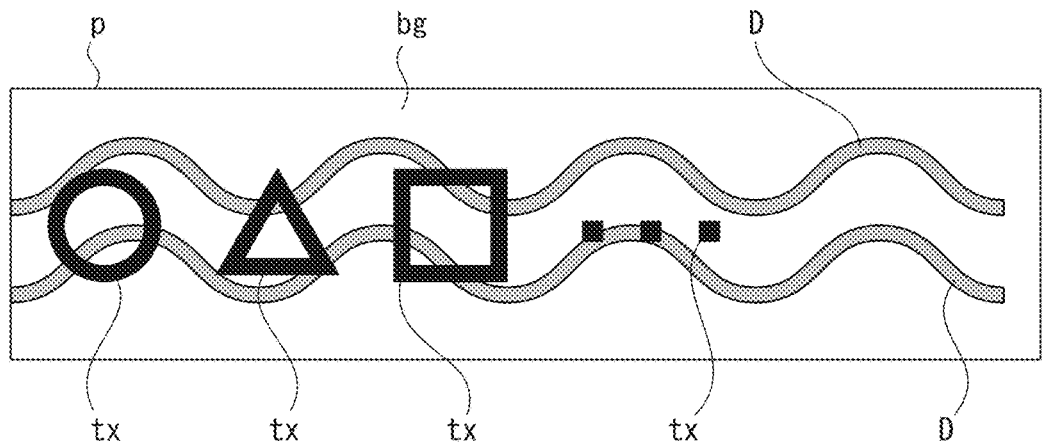

As the change in display aspect in the case where the constituent part p includes characters, as illustrated in FIG. 9B, a color of a background part bg of this constituent part p (the background color of the characters) can be changed to a color emphasized with respect to the colors of the deteriorated parts D. Specifically, in this case, the color of the background part bg is changed to white (or a color close to white) with respect to the black, the colors of the deteriorated parts D.

By changing the background color of the characters as above, the colors of the deteriorated parts D is changed so as to enhance the visibility of the characters (in the example of the transition from FIG. 8 to FIG. 9B, the colors of the deteriorated parts D can be bright). This allows enhancing the visibility of the character parts tx compared with that in the original state (FIG. 8).

The colors of the character parts tx and the background part bg in the constituent part p can be comparatively easily changed by changing the description on the corresponding tag in the HTML data in this example.

In other words, it can be said that the method for changing the background color described with FIG. 9B is a method for changing the display aspect such that the difference in colors in the deteriorated parts D between the assumed display data and the captured image data Si decreases.

Now referring again to FIG. 4, the content data creation processing unit F5 creates the content data to project the content whose display aspect has been changed by the display aspect change processing unit F4. That is, in the case of this example, the web page data including the HTML data in which the description to change the color of the target constituent part p has been changed as described above, is created as the HTML data on the web page wp.

The control unit 30 causes the communication unit 33 to transmit the web page data (content data) created by the content data creation processing unit F5 as described above to the requestor user terminal 4.

Accordingly, when deterioration of visibility caused by the deteriorated part D occurs in the web page wp, the web page wp where the deterioration of visibility has been suppressed can be projected and displayed anew.

1-4. Process Procedure

Figure 10:
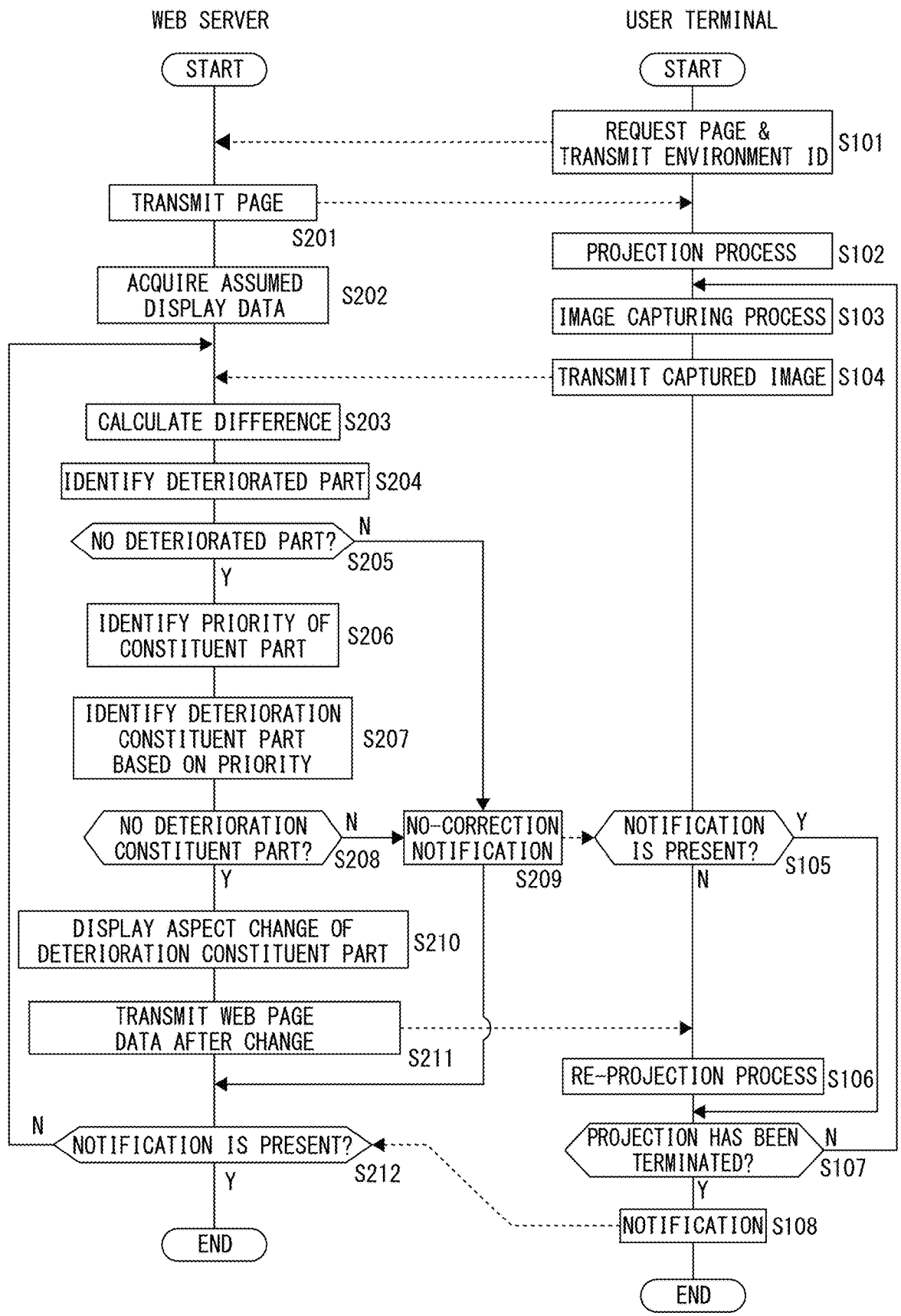
FIG. 10 is a flowchart illustrating a procedure for a process that should be executed to achieve the deterioration correction method of the first embodiment.

The following describes a procedure for a process that should be executed to achieve the above-described deterioration correction method of the first embodiment with reference to a flowchart of FIG. 10. In FIG. 10, processes indicated as "web server" are executed based on the programs stored on the ROM built into the control unit 30 or the storage unit 31, and processes indicated as "user terminal" are executed based on the programs stored in the ROM built into the control unit 40 or the storage unit 41.

When executing the processes illustrated in this drawing, assume that the user terminal 4 has acquired the above-described environment ID (projection environment identification information).

In case it is configured that the above-described projection environment is not considered, the acquisition of this environment ID is not essential.

First, at Step S101, the control unit 40 in the user terminal 4 requests the web page and transmits the environment ID to the web server 3 (control unit 30).

At Step S201, the control unit 30 in the web server 3 receiving the above-described page request transmits the web page data of the corresponding web page to the requester user terminal 4 (control unit 40).

Subsequently, at Step S202, the control unit 30 executes an assumed display data acquisition process. That is, the control unit 30 acquires the corresponding assumed display data from the assumed data DB 5 in accordance with the above-described assumed data management information I1, based on the environment ID transmitted from the user terminal 4 and the page ID of the web page requested (transmitted at Step S201) from the user terminal 4.

When the control unit 40 receives the web page data in accordance with the request from the web server 3, the control unit 40 advances the process to Step S102 and executes a projection process. That is, the control unit 40 executes a process to cause the projector unit 4a to project an image based on the received web page data.

At Step S103 subsequent to Step S102, the control unit 40 causes the camera unit 45 to read a captured image signal from the imaging device and causes the captured-image processing unit 46 to execute the captured-image signal process as an image capturing process to acquire the captured image data Si capturing the image (web page) projected by the projector unit 4a as a subject.

Next, at Step S104, the control unit 40 executes a process to transmit the acquired captured image data Si to the web server 3 as a captured image transmission process.

The control unit 40 that has executed the transmission process at this Step S104 advances the process to Step S105.

The control unit 30 that has received the captured image data Si from the user terminal 4 advances the process to Step S203 and executes a difference calculation process. That is, in this example, as described above, the difference in the luminance values of R, G, and B between the assumed display data and the captured image data Si is calculated in units of pixels of the captured image data Si. As described above, the difference calculation in this case identifies the pixel correspondence relationship Rp between the assumed display data and the captured image data Si, and calculates the difference between the assumed display data and the captured image data Si (the image part of the projected content) in units of pixels of the captured image data Si based on the identified pixel correspondence relationship Rp.

At the subsequent Step S204, the control unit 30 executes an identification process of the deteriorated part D. That is, the control unit 30 executes a process of identifying a part where the magnitude of the difference in colors obtained as the difference information (for example, the summed value of the differences (absolute values) in the luminance values of R, G, and B) is equal to or more than the constant value as the deteriorated part D.

Next, at Step S205, the control unit 30 determines whether the deteriorated part D has not been identified or not. When determining that the deteriorated part D has not been identified at the process of Step S204, the control unit 30 advances the process to Step S209, executes no-correction notification on the requestor user terminal 4, and advances the process to Step S212.

At Step S105, the control unit 40 determines the presence/absence of the no-correction notification from the web server 3. When the no-correction notification is present, the control unit 40 advances the process to Step S107, and determines whether the projection has been terminated or not, That is, the control unit 40 determines, for example, whether a predetermined termination condition to terminate the projection by the projector unit 4a, for example, the operation input to instruct the project termination by the user, has been met or not. When the projection is not terminated, the process returns to the above-described image capturing process at Step S103.

That is, in the case where the deteriorated part D is not identified, a display aspect change process (S210) of the constituent part p on the web server 3 side and a re-projection process (S106) of the web page after the change on the user terminal 4 side are not executed. In this case, the new captured image data Si is captured on the user terminal 4 side at Step S103 and transmitted to the web server 3 side (S104).

The determination process at Step S205 is also executed on the newly transmitted captured image data Si on the web server 3 side, and when the deteriorated part D is not identified, the above-described no-correction notification is executed again. That is, as long as the deteriorated part D is not detected, the display aspect change process is not executed.

When determining that the projection has been terminated at Step S107, the control unit 40 notifies the web server 3 side of the projection termination at Step S108 and terminates the processes illustrated in this drawing.

Meanwhile, when determining that the deteriorated part D has been identified at the previous Step S205, the control unit 30 executes a process to identify the priority of the constituent part p at Step S206. That is, in this example, among the constituent parts p constituting the projected web page, the priority of the constituent part p overlapped with the identified deteriorated part D is identified. As described above, the priority in this case is identified according to the image size of the target constituent part p.

At the subsequent Step S207, the control unit 30 executes an identification process of a deterioration constituent part based on the priority. The deterioration constituent part means the constituent part p that is a target for the display aspect change. The identification process of the deterioration constituent part at Step S207 is executed using the degrees of deterioration of the constituent parts p together with the priorities. That is, the above-described degrees of deterioration are calculated with respect to each constituent part p overlapped with the deteriorated parts D. The control unit 30 determines whether or not the calculated degrees of deterioration of the component pars p are equal to or more than the thresholds THp, which are fixed according to the identified priorities of these constituent parts p, to determine whether these constituent parts p are the deterioration constituent parts or not.

At the subsequent Step S208, the control unit 30 determines whether the deterioration constituent part has not been identified or not. When determining that the deterioration constituent part has not been identified, the control unit 30 advances the process to Step S209 and executes the above-described no-correction notification. That is, in the case where the deterioration constituent part is absent, the display aspect change process on the web server 3 side and the re-projection process on the user terminal 4 side are not executed as well.

Meanwhile, when determining that the deterioration constituent part has been identified at Step S208, the control unit 30 advances the process to Step S210 and executes the display aspect change process of the deterioration constituent part. That is, in this example, the process to change the display aspect of the corresponding constituent part p is executed with the method previously described using FIG. 9A or FIG. 9B. As the specific process, the process to change the description of the corresponding part in the HTML data constituting the web page data of the requested web page is executed such that the display aspect of the corresponding constituent part p is changed.

At the subsequent Step S211, the control unit 30 executes a process to transmit the web page data after the change to the requestor user terminal 4 and advances the process to Step S212.

Here, in the case where the display aspect change process at Step S210 is executed on the web server 3 side, the no-correction notification of Step S209 is not executed. That is, the user terminal 4 side obtains a determination result that the no-correction notification is not made at Step S105. When this determination result is obtained, the control unit 40 that has received the web page data after the change from the web server 3 side executes the re-projection process at Step S106. That is, the control unit 40 executes a process to cause the projector unit 4a to project an image based on the received web page data.

Then, the control unit 40 that has executed this re-projection process advances the process to the previously described Step S107. As described above, when not determining that the projection has been terminated at Step S107, the control unit 40 transmits the new captured image data Si to the web server 3 side. Meanwhile, when the projection is determined as terminated, the notification is made to the web server 3 side at Step S108.

The control unit 30 in the web server 3 determines the presence/absence of notification from the user terminal 4 side of Step S108 at Step S212. When determining that this notification is not made, the control unit 30 that has received the new captured image data Si from the user terminal 4 side executes the difference calculation process at Step S203. That is, until the user terminal 4 side executes the notification at Step S108, the processes at and after Step S203 are repeatedly executed on the new captured image data Si sequentially transmitted from the user terminal 4 side.

Meanwhile, at Step S212, when determining that the notification is made at Step S108, the control unit 30 terminates the processes illustrated in this drawing.

In the examples described above, the no-correction notification (S209) is executed on the user terminal 4 in the respective cases where the deteriorated part is absent (S205) and the deterioration constituent part is absent (S208) have been described above. The user terminal 4 side transmits the new captured image data Si, trigged by this no-correction notification.

However, the execution of the no-correction notification from the web server 3 side to the user terminal 4 side is not essential. In this respect, a cycle at which the user terminal 4 side transmits the captured image data Si may be, for example, a predetermined cycle fixed with the web server 3 side. It is only necessary to set the transmission cycle of the captured image data Si longer than a time it tales from the difference calculation on the web server 3 side (S203) to the transmission of the web page data after the change (S211).

Regarding this point, the same applies to various modifications and a second embodiment described later.

Here, with the processes illustrated in FIG. 10, the web server 3 acquires the plurality of imaging data obtained by capturing images of content projected onto the projection area Ap at a plurality of time points and change the display aspect of the deterioration constituent part based on the difference information at the plurality of time points identified from the comparison between the plurality of imaging data with the assumed display data.

This ensures the deterioration correction corresponding to the changes of the difference over time. For example, when an object that could be a factor to deteriorate the visibility newly moves to a position between the projection area Ap and the user terminal 4, the display aspect can be changed so as to suppress the deterioration of visibility caused by this object.

Especially, with the processes illustrated in FIG. 10, the web server 3 changes the display aspect based on the difference information at the above-described respective time points. Specifically, each time the web server 3 sequentially receives the new captured image data Si from the user terminal 4, the web server 3 executes the processes at and after Step S203.

This allows improving responsiveness of the correction to the changes in the deteriorated parts D over time in response to the case where the deteriorated parts D exhibit these changes over time in the projected content, such as the movement of new object as described above.

1-5. Modification 1

The example of the display aspect change on the deterioration constituent part based on the imaging data at the plurality of time points as described above is not limited to the example illustrated in FIG. 10 (the example of the display aspect change based on the difference information executed at the respective time points when the new captured image data Si is received from the user terminal 4).

For example, it is considered that the change in display aspect based on the difference information is executed, for example, under a condition that an aspect of transition of the difference information over time identified from the comparisons between the plurality of imaging data obtained at the respective time points and the assumed display data match a predetermined aspect.

As a first example, the change in display aspect based on the difference information can be executed under a condition that an amount of change of the difference information from the previous change in display aspect becomes equal to or more than a predetermined amount.

Figure 11:
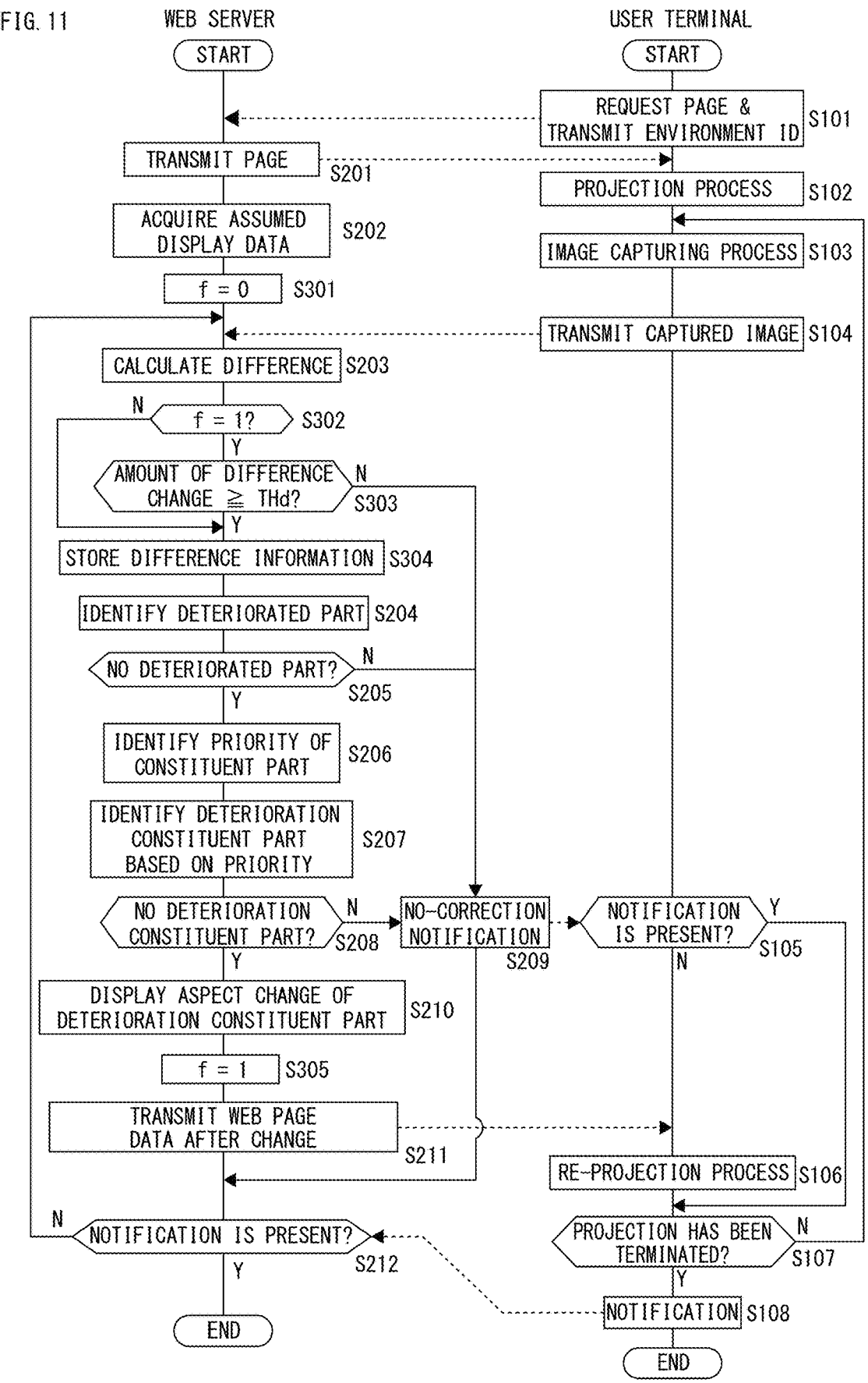
FIG. 11 is a flowchart illustrating a process as a first example in a modification 1 of the first embodiment.

FIG. 11 is a flowchart illustrating a procedure for a specific process that should be executed in this case. In the following flowcharts, the identical step numbers are given to processes similar to the processes that have already been described, and the following omits the descriptions.

In this case, the control unit 30 in the web server 3 that has acquired the assumed display data at Step S202 sets "0" to a change identification flag f at Step S301. The change identification flag f is a flag to which "1" is set at Step S305 in the drawing in response to the execution of the display aspect change process at Step S210. The control unit 30 that has executed the setting process of the change identification flag f at Step S305 advances the process to the transmission process at Step S211.

After setting the change identification flag f to "0" at Step S301, the control unit 30 executes the difference calculation process at Step S203 and determines whether the change identification flag f is equal to 1 or not at the subsequent Step S302. This process is equivalent to the determination on whether the display aspect change process at Step S210 has already been executed or not after the start of the process illustrated in FIG. 11. When the change identification flag f is not equal to 1 at Step S302, the control unit 30 advances the process to Step S304 and stores the difference information. The control unit 30 that has stored the difference information at Step S304 executes processes at and after Step S204. As understood from this point, storing the difference information at Step S304 allows preliminarily storing the difference information when the display aspect change process is executed at Step S210.

Meanwhile, when the change identification flag f is equals to 1 at Step S302, the control unit 30 determines whether an amount of difference change is equal to or more than a predetermined threshold THd or not at Step S303. That is, a difference (absolute value) between the latest value of the difference stored at the storage process at Step S304 and the latest value of the difference calculated at the calculation process at Step S203 is calculated as the above-described amount of difference change. Then, the control unit 30 determines whether this amount of difference change is equal to or more than the threshold THd or not.

When the amount of difference change is not equal to or more than the threshold THd, the control unit 30 advances the process to Step S209 and executes the no-correction notification. That is, in this case, the display aspect change process of Step S210 is not executed.

Meanwhile, when the amount of difference change is equal to or more than the threshold THd, the control unit 30 advances the process to Step S304 to store the difference information and then executes the processes at and after Step S204. That is, the display aspect is changed based on the difference information under the condition that the amount of difference change from the previous change in display aspect is equal to or more than the predetermined amount.

This prevents the unnecessary execution of the display aspect change process in the case where the occurrence aspect of the deteriorated part D is not changed, thereby ensuring reducing the processing load related to the display aspect change.

The following example may also be conceivable as a second example of a method for changing the display aspect considering the above-described "aspect of transition of the difference information over time." That is, the display aspect is changed under a condition that the difference between assumed display data and the imaging data indicated by the difference information is continuous.

Figure 12:
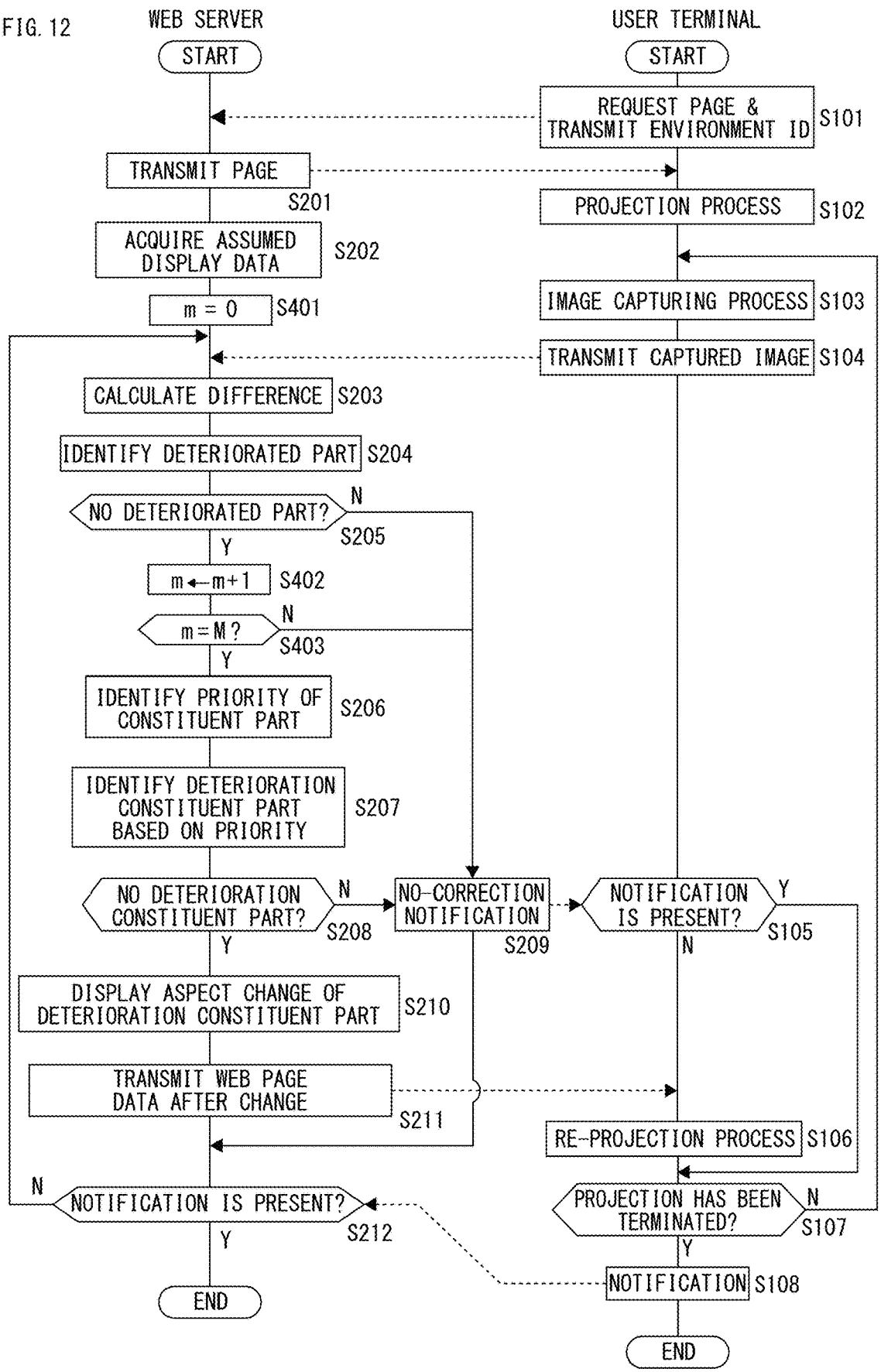
FIG. 12 is a flowchart illustrating a process as a second example in the modification 1 of the first embodiment.

FIG. 12 is a flowchart illustrating a procedure of a specific process that should be executed in this case.

In this case, the control unit 30 in the web server 3 that has acquired the assumed display data at Step S202 resets a count value m to 0 at Step S401. As illustrated in the drawing, when the control unit 30 determines that the notification of Step S108 is not given from the user terminal 4 side at Step S212, the process on the web server 3 side in this case is returned to Step S401. As understood from this point, the count value in is reset to 0 each time the display aspect change process of Step S210 is executed.

The control unit 30 that has executed the reset process at Step S401 advances the process in the order of Steps S203, S204, and S205. When determining that the deteriorated part D is identified at Step S205, the control unit 30 advances the process to Step S402 and increments the count value m by 1. That is, the count value m is incremented by 1 in the case where there is a difference between the captured image data Si that the user terminal 4 has newly transmitted and the assumed display data.

At the subsequent Step S403, the control unit 30 determines whether the count value m is equal to or more than a predetermined value M or not. When the count value m is not equal to or more than the predetermined value M, the no-correction notification of Step S209 is executed. Thus, in the case where the count value m is not equal to or more than the predetermined value M and the no-correction notification is executed, the process is advanced to Step S212. When it is determined that the notification of Step S108 is not given at this Step S212, the count value in is reset to 0 at Step S401. As understood from this point, the count value m functions as a count value indicative of the number of times that the difference between the captured image data Si and the assumed display data continuously occurs. That is, the determination process at Step S403 determines whether the difference between the captured image data Si and the assumed display data has continuously occurred equal to or more than M times or not.

When determining that the count value m is equal to or more than the predetermined value M at Step S403, the control unit 30 executes processes at and after Step S206. That is, this executes the display aspect change process under the condition that the difference between the assumed display data and the captured image data Si is continuous.

The above-described process prevents the unnecessary execution of the display aspect change process following a temporal difference, thereby ensuring reducing the processing load related to the display aspect change.

The following another example is also conceivable as the method for preventing following occurrence of the temporal difference.

That is, first, a first difference is identified: the first difference is a difference between difference information (hereinafter the reference numeral is denoted as "Ds1"), which is identified based on the captured image data Si (hereinafter the reference numeral is denoted as "Si1") acquired in the lapse of a first cycle (for example, ten seconds) and the assumed display data corresponding to the content projected onto the projection area; and difference information (hereinafter the reference numeral is denoted as "Ds0"), which is identified based on the captured image data Si (hereinafter the reference numeral is denoted as "Si0") acquired before this captured image data Si1 and the assumed display data corresponding to the content projected onto the projection area. Then, when this first difference is equal to or more than a first threshold, the acquisition cycle of the captured image data Si is changed to a second cycle (for example, two seconds), which is shorter than the first cycle.

Then, a second difference is identified: the second difference is a difference between difference information (hereinafter the reference numeral is denoted as "Ds2"), which is identified based on the captured image data Si (hereinafter the reference numeral is denoted as "Si2") acquired in the lapse of the second cycle and the assumed display data corresponding to the content projected onto the projection area; and the difference information Ds0, which is identified based on the captured image data Si0 acquired in the past more than the captured image data Si1 and the assumed display data corresponding to the content projected onto the projection area. Then, in the case where the difference between the first difference and the second difference is less than a second threshold, since it is estimated that the change in the deteriorated part in the projection area is a continuous change, the deteriorated part is identified. In the case where the difference between the first difference and the second difference is equal to or more than the second threshold, since is estimated that the change in the deteriorated part in the projection area is a temporal change, the deteriorated part is identified.

Note that the following configuration is also conceivable. In the case where difference information (Ds3) between the captured image data Si2, which is acquired in the lapse of the second cycle, and the captured image data Si1, which is acquired in the lapse of the first cycle, is less than the second threshold, since it is estimated that the change in the deteriorated part in the projection area is a continuous change, the deteriorated part is identified. In the case where the difference between the first difference and the second difference is equal to or more than the second threshold, since it is estimated that the change in the deteriorated part in the projection area is a temporal change, the deteriorated part is not identified.

Figure 13:
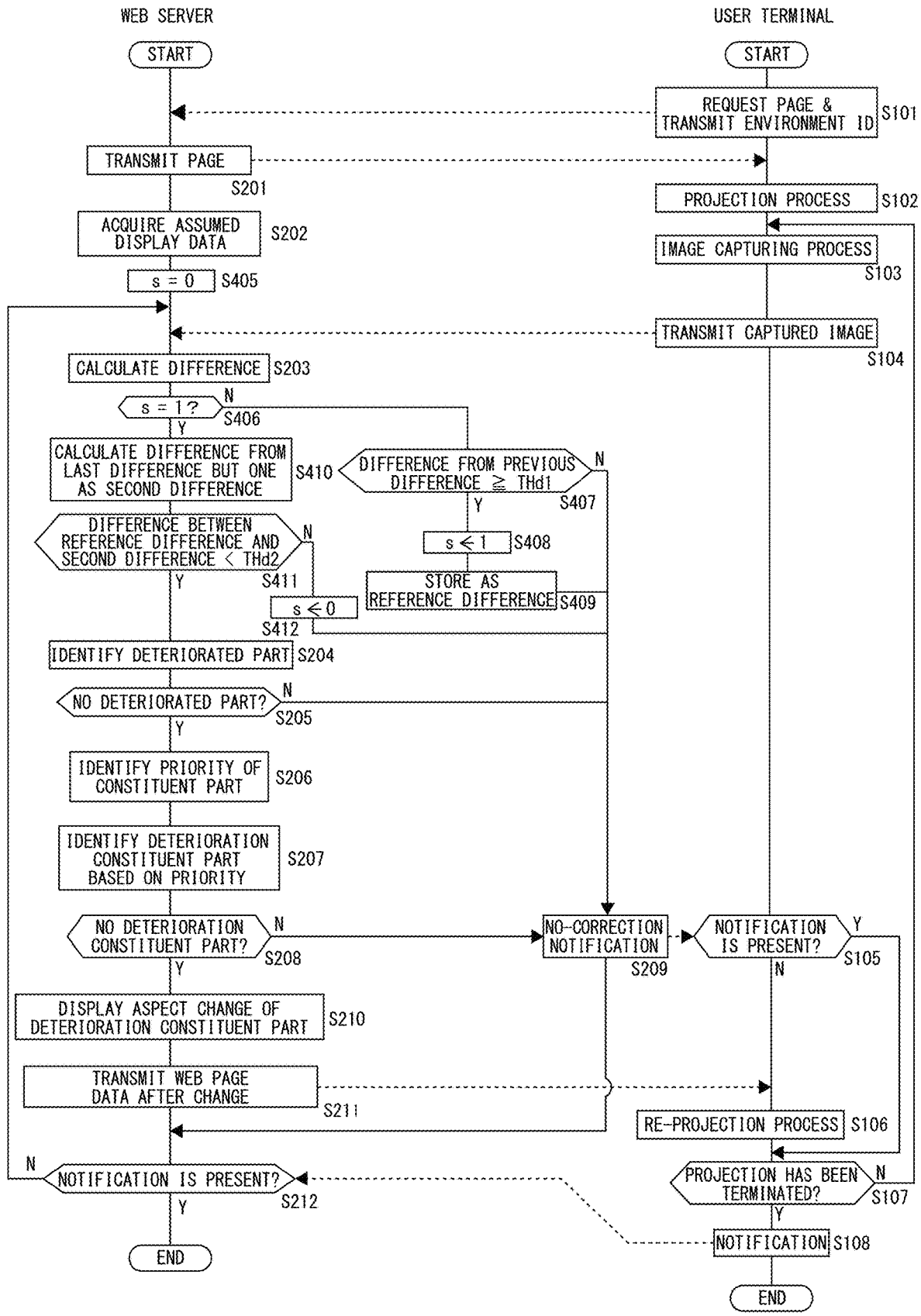
FIG. 13 is a flowchart illustrating a process as yet another second example in the modification 1.

FIG. 13 is a flowchart for above-described method.

In this case, the control unit 30 in the web server 3 that has acquired the assumed display data at Step S202 sets a value of a cycle identifiers to "0" at Step S405. The cycle identifier s is information to identify the acquisition cycle of the captured image data Si. "0" means the cycle is equal to ten seconds (first cycle), and "1" means the cycle is equal to two seconds (second cycle).

In this example, the adjustment of the acquisition cycle of the captured image data Si is achieved by adjusting a timing to execute the no-correction notification at Step S209 according to the value of this cycle identifier s.

The control unit 30 executes the difference calculation process at the subsequent Step S203 and then determines whether s is equal to 1 or not at Step S406. When s is not equal to 1, the control unit 30 advances the process to Step S407 and determines whether a difference from the previous difference is equal to or more than a first threshold THd1 or not. The "difference from the previous difference" here is equivalent to the above-described "first difference" and in this example, this means a difference between a difference calculated at an acquisition timing of this time and a difference calculated at the previous acquisition timing among the respective acquisition timings of the captured image data Si in the first cycle.

At Step S407, when the difference from the previous difference is not equal to or more than the first threshold THd1, the control unit 30 advances the process to Step S209 and executes the no-correction notification. That is, in this case, the acquisition cycle of the captured image data Si is maintained at the first cycle.

Meanwhile, when the difference from the previous difference is equal to or more than the first threshold THd1, the control unit 30 advances the process to Step S408, updates the value of the cycle identifier s to "1," stores the above-described "difference from the previous difference" (namely, "first difference") as a "reference difference" at the subsequent Step S409, and advances the process to Step S209.

When s is equal to 1 at the previous Step S406, the control unit 30 advances the process to Step S410 and calculates a difference from the last difference but one as a second difference. The "difference from the last difference but one"

here is a difference between a difference calculated at the acquisition timing of the captured image data Si of this time (that is, a difference identified based on the captured image data Si acquired in the lapse of two seconds) and a difference obtained at the acquisition timing of the last timing but one of the captured image data Si (that is, a difference obtained at the above-described acquisition timing of the captured image data Si0).

The control unit 30 that has calculated the second difference at Step S410 determines whether the difference between the reference difference and the second difference is less than a second threshold THd2 or not at Step S411. When the difference between the reference difference and the second difference is not less than the second threshold THd2, the control unit 30 advances the process to Step S412 to return the value of the cycle identifier s to "0" and advances the process to Step S209. That is, in this case, it is estimated that the change in the deteriorated part D in the projection area Ap is a temporal change; therefore, the identification process of the deteriorated part D (S204) is not executed and the acquisition cycle is returned to the first cycle.

Meanwhile, when the difference between the reference difference and the second difference is less than the second threshold THd2, the control unit 30 advances the process to Step S204 to execute the identification process of the deteriorated part D. That is, the processes at and after the identification process of the deteriorated part D is executed corresponding to the case where the change in the deteriorated part D in the projection area Ap is estimated as continuous.

The above-described method can cyclically detect the occurrence of the deteriorated part D; therefore, even when the deteriorated part D temporarily occurs, the change in display aspect each time this deteriorated part D occurs can be suppressed. When the deteriorated part D is detected in the first cycle, which is the relatively long cycle, the continuous occurrence of the deteriorated parts D can be quickly handled by switching the image-capturing cycle to the second cycle, which is the relatively short cycle. That is, deterioration of responsiveness of the deterioration correction can be effectively suppressed while the unnecessary execution of the deterioration correction following the temporal difference is prevented at the same time.

While the example where "the first difference" is "the difference from the previous difference" has been described above, "the first difference" may be a difference from an initial difference, that is, a difference from a difference calculated with the captured image data Si of the currently projected content acquired at the first time.

The example where the acquisition cycle of the captured image data Si is adjusted by the cycle of the no-correction notification, corresponding to the case of executing this no-correction notification, has been described above. When the no-correction notification is not executed, it is only necessary to transmit information instructing a transmission cycle (image-capturing cycle) of the captured image data Si corresponding to s=0/s=1 to the user terminal 4.

1-6. Modification 21

While the example where the priorities of the constituent parts p are fixed according to the projected sizes of the constituent parts p has been described above, these priorities can be fixed according to attributes of the constituent parts p. In this case, the priority identification processing unit F4a identifies the priorities set according to these attributes with respect to each constituent part p.

A specific example of the attribute can include, for example, a main content part such as a body text, a side bar part, and an advertisement part of the web page. The attribute may be identified from attribute information preliminarily described with respect to each constituent part p or may be identified by estimation from a component such as a character in the constituent part p.

In this case, the example of a priority order according to the attribute information can include the order of "moving image>still image>text>advertisement" regarding the attributes of the moving image, the still image, the text, and the advertisement.

Additionally, setting the priorities according to data amounts (data sizes) of the constituent parts p is also possible. Specifically, an example may be conceivable such that the priorities are identified with respect to each constituent part p so that a higher priority is identified for a constituent part p with relatively large data amount.

Furthermore, the priorities can be identified based on the feature quantities of the constituent parts p.

Here, the feature quantity of the constituent part p can include, for example, an amount of edge and a density of the edge in the constituent part p. Regarding such feature quantity of the constituent part p, the higher priority is identified as the feature quantity increases and the lower priority is identified as the feature quantity decreases. Accordingly, even when an amount of overlap with the deteriorated part D is small, the constituent part p having the large amount of edge or the high edge density is likely to be identified as the deterioration constituent part (that is, the component target for the display aspect change). In other words, the priority of the component having the small feature quantity like a background area almost painted thick with one color is set low. Therefore, even when the difference between the captured image data Si and the assumed display data in the overlapping deteriorated part D is large, the constituent part p is not identified as the deterioration constituent part unless the overlapping range is comparatively large.

Besides, "raising priority" is equivalent to lowering the above-described threshold THp. Accordingly, to identify the high priority as the feature quantity increases as described above, is, in other word, "to identify the priority such that the threshold lowers as the feature quantity increases." Similarly, to identify the low priority as the feature quantity decreases, is, in other words, "to identify the priority such that the threshold raises as the feature quantity decreases."

The priorities of the constituent parts p may be fixed according to appearance frequencies of the constituent parts p.

1-7. Modification 3

While the example that web server 3 side executes the process regarding the change in display aspect has been described above, the user terminal 4 side can execute the process.

Figure 14:
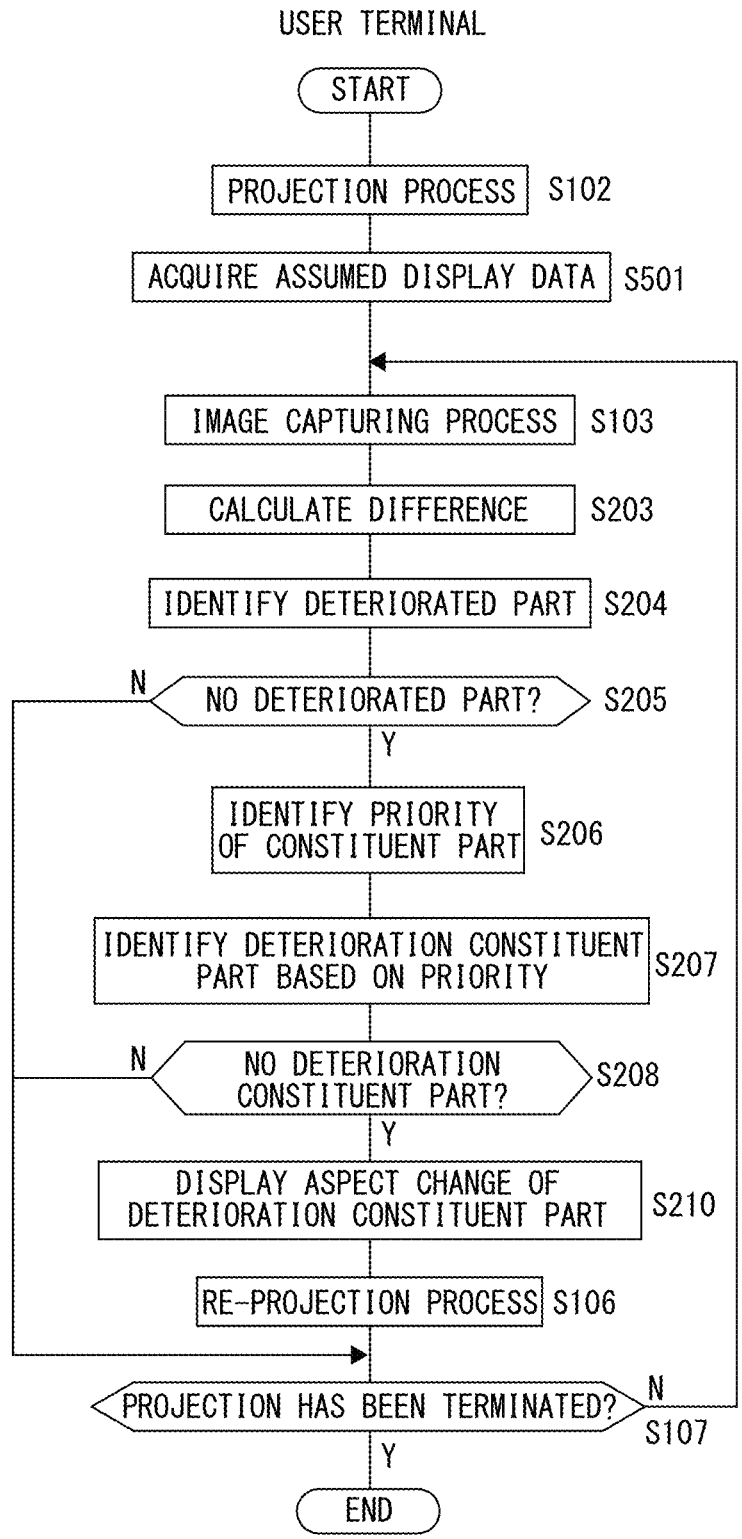
FIG. 14 is a flowchart illustrating a process as a modification 3 in the first embodiment.

FIG. 14 is a flowchart illustrating a procedure for a process that should be executed by the control unit 40 in the user terminal 4 in this case. To execute the process illustrated in this drawing, assume that the user terminal 4 has already acquired the content data such as the web page data to be projected and the above-described environment ID.

The control unit 40 in this case that has executed the projection process at Step S102 executes an acquisition process of the assumed display data at Step S501. The acquisition process of the assumed display data in this case is a process that, for example, transmits identification information (for example, a URL) of the web page projected at Step S102 and the environment ID to the web server 3 and acquires the corresponding assumed display data from the assumed data DB 5. Alternatively, the acquisition process may be a process that acquires the corresponding assumed display data by the above-described simulation operation.

The acquisition process at Step S501 only needs to be executed before the difference calculation process at Step S203 and is not limited to the execution immediately after Step S102.

The control unit 40 that has acquired the assumed display data at Step S501 executes the image capturing process at Step S103 to acquire the captured image data Si of the projected content and executes the difference calculation process at the subsequent Step S203.

After the execution of the difference calculation process at Step S203, the control unit 40 in this case executes the processes of Steps S205 to S208 described in FIG. 10 and Step S210 similarly to the case of the web server 3 (control unit 30). The control unit 40 that has executed the display aspect change process of Step S210 executes a process to cause the projector unit 4a to project an image based on the web page data after the change at this Step S210 as the re-projection process of Step S106, and then executes a projection termination determination process at Step S107.

In this case, in the respective cases where the deteriorated part D is determined as not identified at Step S205 and the deterioration constituent part is determined as not identified at Step S208, the process advances to Step S107 to skip the change process at Step S210 and the re-projection process at Step S106.

When the control unit 40 determines that the projection has not been terminated at Step S107, the control unit 40 executes processes at and after the image capturing process at Step S103 again. When the control unit 40 determines that the projection has been terminated, the processes illustrated in FIG. 14 are terminated.

The example where the web server 3 or the user terminal 4 is in charge of all processes from the content data acquisition processing unit F1 to the content data creation processing unit F5, which are previously described with FIG. 4, has been described above. Meanwhile, the respective web server 3 and user terminal 4 may be partially in charge of these processes.

1-8. Modification 4

While the example where the change in display aspect is achieved by the description change of the HTML data in response to the case where the projected content is the web page has been described above, the change in display aspect can be achieved by an image process on image data such as JPEG.

Figure 15:
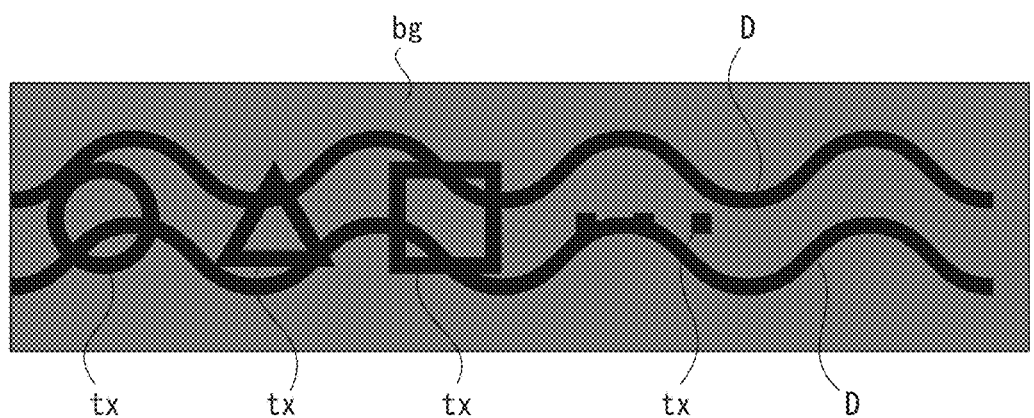
FIG. 15 is an explanatory view regarding a modification 4 in the first embodiment.

For example, assume that the character parts tx and the background part bg of these character pars tx are present and the deteriorated parts D occur overlapping with the character parts tx in the projected image as illustrated in FIG. 15. In this case, components of the character parts tx and the background part bg are identified from this image by an image recognition technique such as an edge detection. Then, the image process to change the display aspect can be selectively executed on the identified component. Alternatively, the component target for the display aspect change can also be identified as a part matching the deteriorated part D in the image. That is, the range of the deteriorated parts D in the image is identified similarly by edge detection or similar method. Then, the image process to change the display aspect can be executed on this identified image range.

Thus, the use of the image process allows extracting an arbitrary range in the projected content as the component of this content and changing the display aspect of the extracted component.

While the example where the components of the character parts tx and the background part bg are identified from the projected image (captured image) has been described above, the components of these character parts tx and background part bg can also be identified from the assumed display data.

Further, the deteriorated part D may be identified based on the captured image data obtained by capturing the image of the projection area before the projection of the image (content).

1-9. Modification 5

While the example where the color of the character part tx or the background part bg is changed to the color emphasized with respect to the color of the deteriorated part D has been described above as the example of the display aspect change, another example of the display aspect change is conceivable.

Figure 16A:
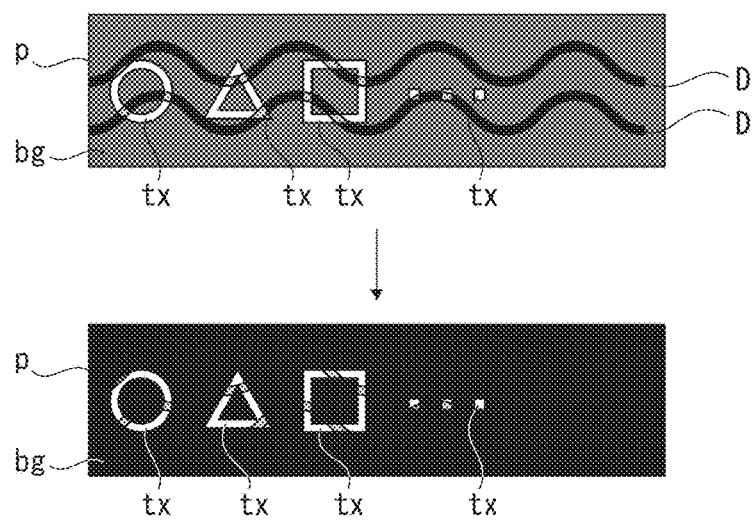
FIGS. 16A and 16B include explanatory views regarding examples of display aspect change as a modification 5 in the first embodiment.

For example, the display color of the background part bg (the part other than the characters included in the component) can be changed to a color assimilated to the color of the deteriorated part D. FIG. 16A illustrates an example where the display color of the background part bg is changed to black, which is the color assimilated to the color of the deteriorated parts D when the colors of the character parts tx are white, the color of the background part bg is gray, and the colors of the deteriorated parts D is black. Changing the color to the assimilated color is, in other words, changing the color to a similar color, for example, a blue base for blue base and a red base for red base.

By changing the display color of the part other than the characters to the color assimilated to the colors of the deteriorated parts as described above, boundaries between the part other than the characters and the deteriorated parts tend to bury. Thus, the projected characters can be identified relatively easily.

Figure 16B:
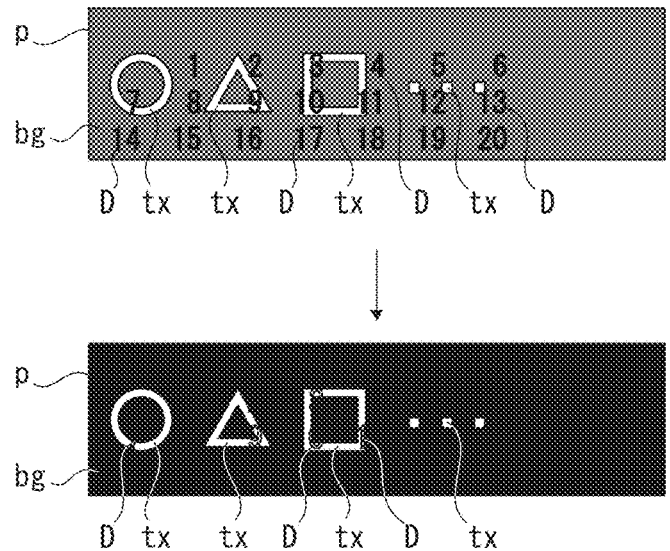

Additionally, in the case where the deteriorated parts D are caused by, for example, the calendar and occur at a comparatively high density (for example, a proportion occupying per unit area is equal to or more than a predetermined proportion) as illustrated in the upper drawing in FIG. 16B, the color density of the background part bg can be increased as illustrated in the lower drawing in FIG. 16B. This ensures suppressing the deterioration of readability of "the projected characters" due to an influence of a character string and fine edges.

Alternatively, as the example of the display aspect change, the synthesis with the colors of the deteriorated parts D in the projected content allows changing the colors of the deteriorated parts D to colors close to a color of the adjacent area of these deteriorated parts D.

Figure 17A:
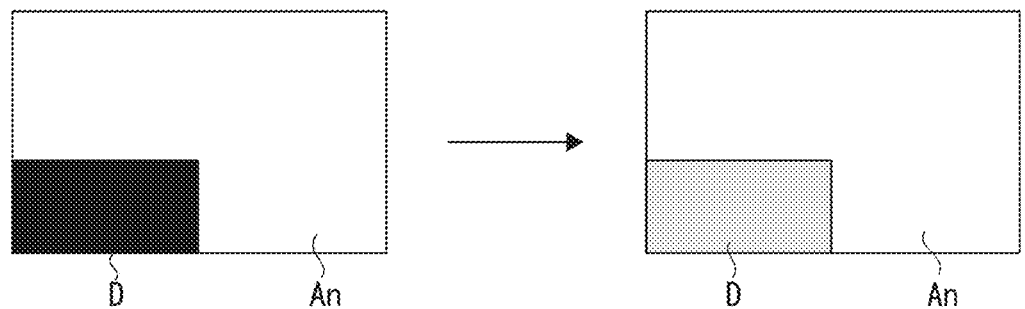
FIGS. 17A and 17B include explanatory views regarding examples of display aspect change as another example of the modification 5 in the first embodiment.

For example, as illustrated in the left drawing in FIG. 17A, when the deteriorated part D (for example, black) and an adjacent area An (for example, white) are present in the projected content, the color of the deteriorated part D is changed to a color close to the color of the adjacent area An, namely, white in this case. Accordingly, as illustrated in the right drawing in FIG. 17A, the difference in colors between the adjacent area An and the deteriorated part D is less likely to be noticeable in the content after the change, thus producing the suppression effect of deterioration of visibility caused by the deteriorated part D.

The same can be executed in the case where the projected content includes the character parts tx.

Figure 17B:
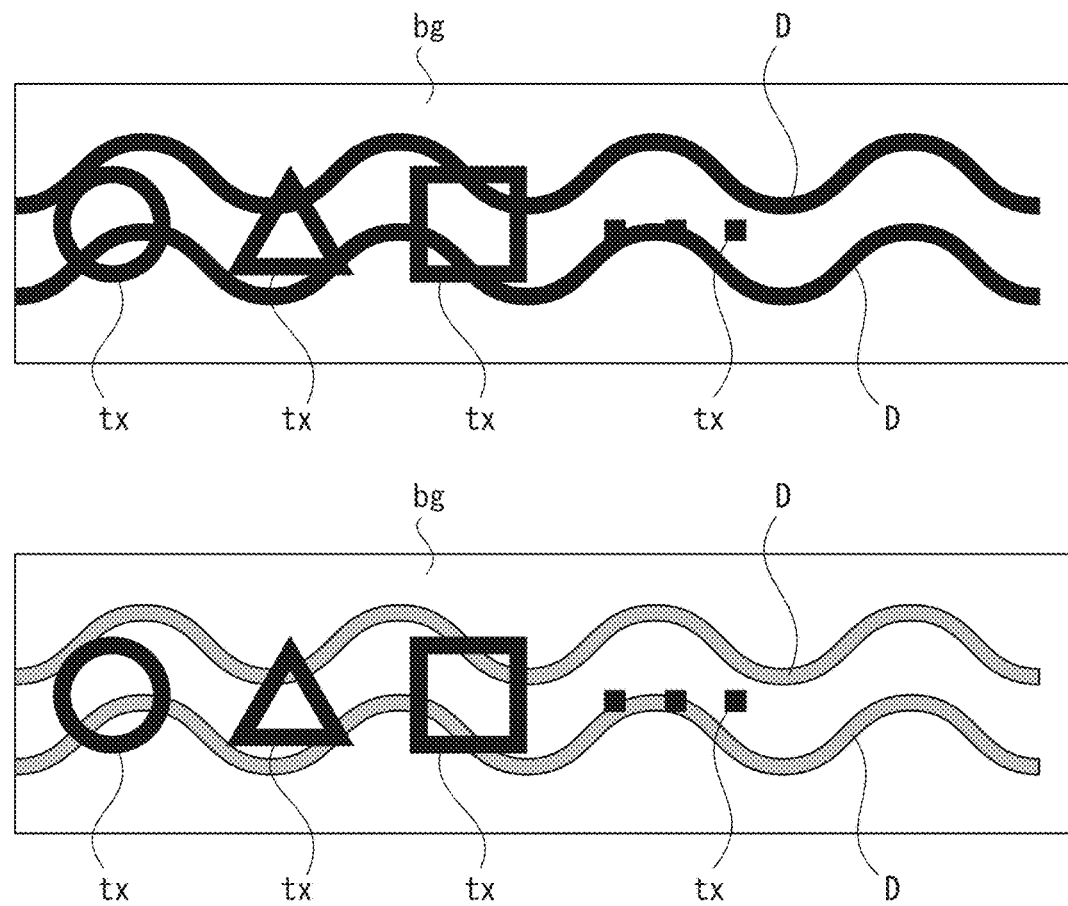

For example, as illustrated in the upper drawing in FIG. 17B, assume that the projected content includes the character parts tx (for example, black), the background part bg (for example, white), and the deteriorated parts D (for example, black) overlapped with the character parts tx. In this case, the colors of the deteriorated parts D are changed to colors close to the color of the background part bg, which is the adjacent area of these deteriorated parts D, namely, white in this case. Accordingly, as illustrated in the lower drawing in FIG. 17B, the difference in colors between the adjacent area (background part bg) and the deteriorated parts D is less likely to be noticeable in the content after the change, thus producing the suppression effect of the deterioration of visibility caused by the deteriorated parts D.

Since the method described with FIGS. 17A and 17B selectively changes the display aspect of the deteriorated part D in the image, the above-described method of the image process as the "modification 4" is preferably applicable, rather than the description change of the HTML data.

The above-described description has described the example where the color of the component is changed as the change in display aspect. However, for example, a display size of the component such as the character may be changed or a font of the component may be changed (that is, a font may be changed, to a font of higher visibility), as the change in display aspect.

1-10. Summary of First Embodiment

As described above, the content projection control device (web server 3) of the first embodiment includes the content data acquisition unit (content data acquisition processing unit F1), the projection area data acquisition unit (projection area data acquisition processing unit F2), the deteriorated part identification unit (deteriorated part identification processing unit F3), and the display aspect change unit (display aspect change processing unit F4). The content data acquisition unit is configured to acquire the content data representing the content that includes at least one or more components. The projection area data acquisition unit is configured to acquire the projection area data representing the projection area. The deteriorated part identification unit is configured to identify a deteriorated part based on the projection area data. The deteriorated part is a part where the projection condition is deteriorated in the projection area. The display aspect change unit is configured to change the display aspect of a component displayed on the deteriorated part among the one or more components included in the content data based on the position of the identified deteriorated part in the projection area and the content data displayed on the projection area.

Thus, the display aspect of the component on the deteriorated part in the content projected onto the projection area can be changed.

Therefore, even when the condition of the area to be projected is poor, the deterioration of visibility of the projected content can be suppressed.

With the content projection control device of the first embodiment, the deteriorated part identification unit is configured to identify the deteriorated part based on the captured image and the image of the content. The captured image is an image produced by capturing the image of the content projected onto the projection area, and the content is represented by the content data.

This allows properly identifying the component requiring the correction in the projected content.

Furthermore, the content projection control device of the first embodiment includes the priority identification unit (priority identification processing unit F4a) configured to identify the priority of the component included in the content. The display aspect change unit is configured to change the display aspect of the component displayed on the deteriorated part based on the threshold according to the identified priority and the level of deterioration of the component.

Accordingly, the display aspect change is not executed on all components displayed on the deteriorated parts but can be selectively executed on the component selected based on the priority of the component.

This allows preventing unnecessarily increasing the components whose display aspects are to be changed, thereby ensuring reducing the processing load related to the change in display aspect.

Further, with the content projection control device of the first embodiment, the priority identification unit is configured to identify the priority based on the feature quantity of the component included in the content.

This allows setting the appropriate priority according to the feature of the component.

With the content projection control device of the first embodiment, the priority identification unit is configured to identify the priority based on the projected size of the component included in the content.

It can be said that the larger the projected size of the component is, the higher the degree of importance of this component is; therefore, the configuration ensures appropriately changing the display aspect in accordance with the degree of importance of the component.

Further, with the content projection control device of the first embodiment, the priority identification unit is configured to identify the priority based on the attribute of the component included in the content.

It can be said that the degree of importance of the component is correlated to this attribute of the component; therefore, the configuration ensures appropriately changing the display aspect in accordance with the degree of importance of the component.

With the content projection control device of the first embodiment, the component includes the character. The display aspect change unit is configured to change the display color of the character included in the component to the color emphasized with respect to the color of the deteriorated part.

This ensures suppressing the deterioration of visibility of this character when the visibility of the character included in the component is deteriorated, due to the influence of the deteriorated part.

Furthermore, with the content projection control device of the first embodiment, the component includes the character. The display aspect change unit is configured to change the display color other than the display color of the character included in the component to a color assimilated to the color of the deteriorated part.

This ensures suppressing the deterioration of visibility of this character when the visibility of the character included in the component is deteriorated due to the influence of the deteriorated part.

2. Second Embodiment

2-1. Outline of Network System

Subsequently, the following describes the second embodiment.

The identical reference numerals are given to parts similar to the parts that have already been described, and the following omits the descriptions.

Figure 18:
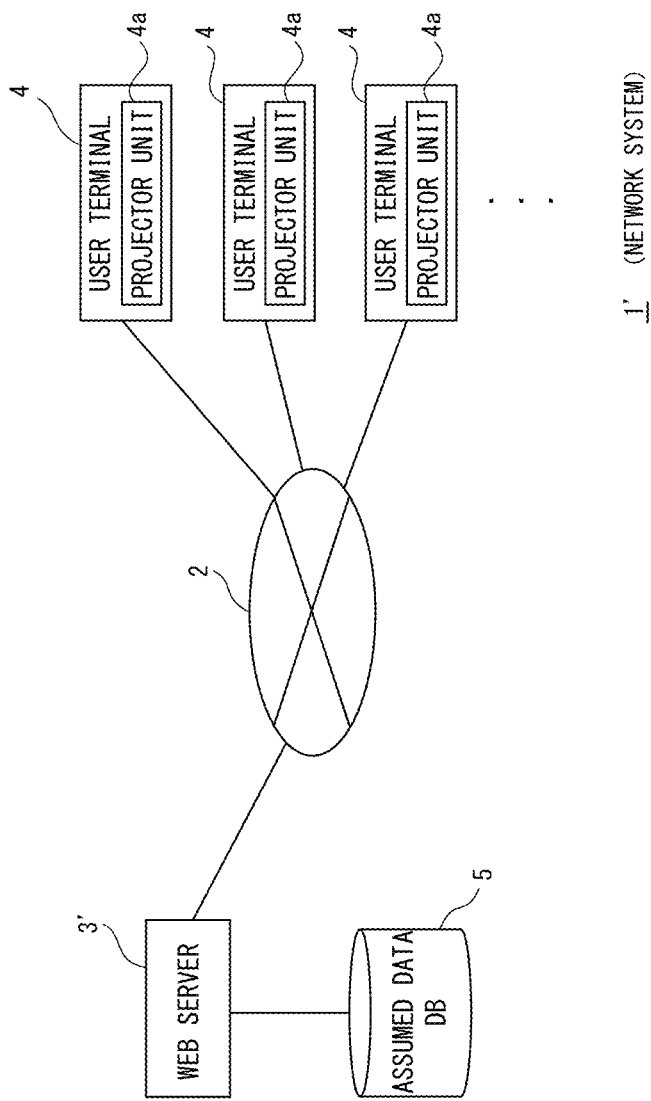
FIG. 18 is a drawing illustrating an example of a network system of a second embodiment according to the present invention.

FIG. 18 illustrates an example of a network system premised in the second embodiment.

The network system 1' is different from the network system 1 of the first embodiment in that a web server 3' is provided instead of the web server 3.

The web server 3' executes a process different from that of the web server 3 as a process related to a deterioration correction on the content projected by the user terminal 4. Since the web server 3' has an internal configuration similar to that illustrated in FIG. 2, the following omits the overlapped description.

2-2. Deterioration Handling Process Method of Second Embodiment

Figure 19:
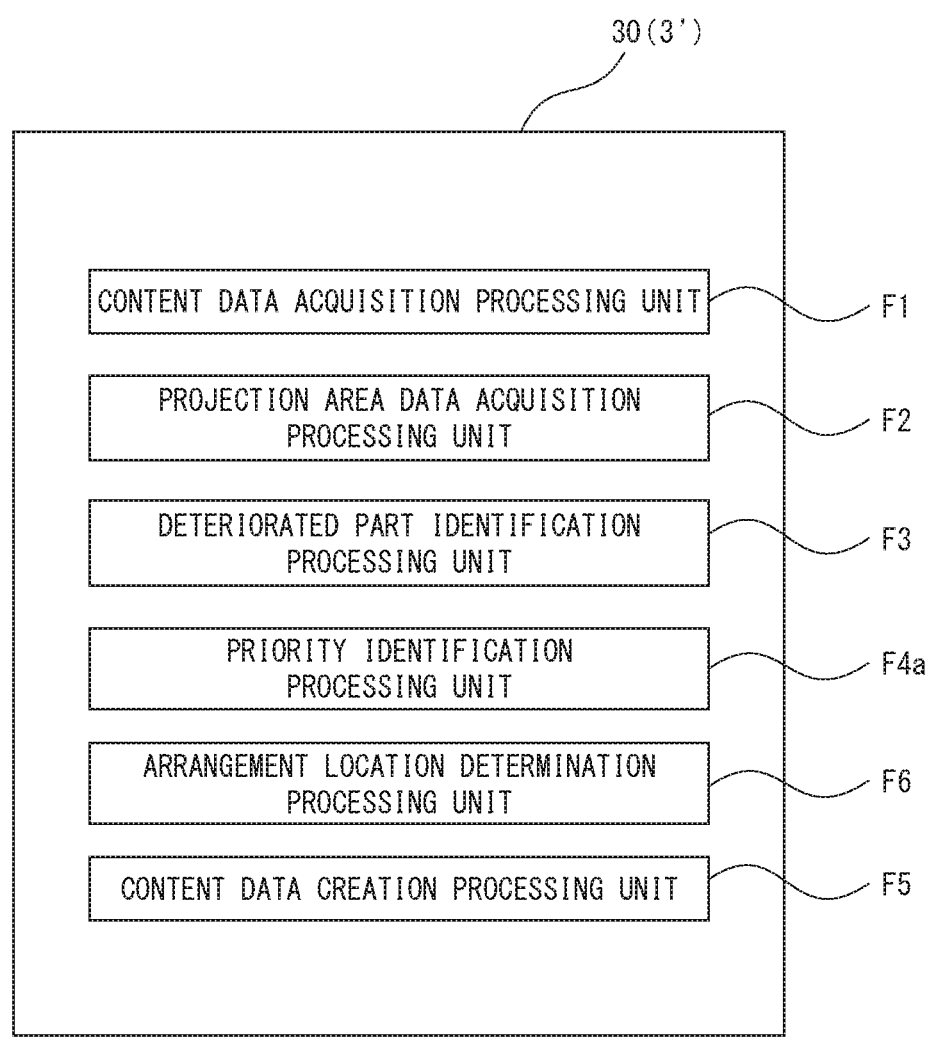
FIG. 19 is a function block diagram illustrating functions related to a deterioration correction method of the second embodiment into blocks.

The following describes various functions achieved by the control unit 30 in the web server 3' with reference to the function block diagram of FIG. 19.

FIG. 19 illustrates various processes executed by the control unit 30 to achieve the deterioration handling process method of the second embodiment into blocks by functions.

As illustrated in the drawing, the control unit 30 in the web server 3' is represented as having the content data acquisition processing unit F1, the projection area data acquisition processing unit F2, the deteriorated part identification processing unit F3, the priority identification processing unit F4a, an arrangement location determination processing unit F6, and a content data creation processing unit F7 by the functions.

The content data acquisition processing unit F1, the projection area data acquisition processing unit F2, the deteriorated part identification processing unit F3, and the priority identification processing unit F4a are each similar to those described in the first embodiment and therefore the following omits the overlapped description.

The arrangement location determination processing unit F6 determines the arrangement locations of the components included in the content data such that a proportion of the components with the relatively low priorities included in the deteriorated parts D is higher than a proportion of the components with the relatively high priorities included in the deteriorated parts D, based on the positions of the deteriorated parts D identified in the projection area A, the content data projected onto the projection area Ap, and the priorities of the components included in the content data.

Besides, "the components included in the deteriorated parts D" is, in other words, "the components that overlap with the deteriorated parts D."

In this case as well, it is assumed that the priorities are fixed according to the projected sizes of the constituent parts p.

A specific method for arrangement location determination in this example will be described later.

A content data creation processing unit F7 creates the content data to project the content whose components are arranged at the arrangement locations determined by the arrangement location determination processing unit F6.

Figure 20:
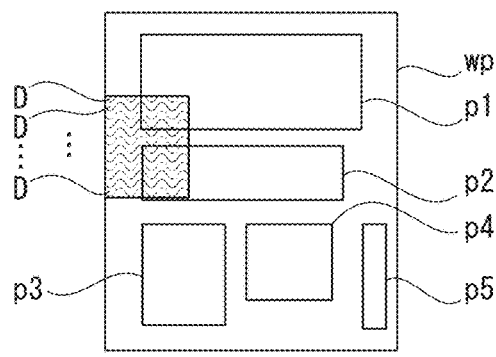
FIG. 20 is an explanatory view regarding an outline of arrangement location determination of components.

The following describes an outline of the arrangement location change of the constituent parts p by the arrangement location determination processing unit F6 with reference to FIG. 20.

FIG. 20 illustrates an example when the content projected by the user terminal 4 is the web page wp. Among the respective constituent parts p (p1 to p5) in the web page wp, p1 has the largest projected size (image size) and thereafter the projected sizes decrease from p2 to p5 in this case as well.

The arrangement location determination process in this example determines the arrangement locations of the constituent parts p so as to avoid these deteriorated parts D as much as possible.

Figure 21:
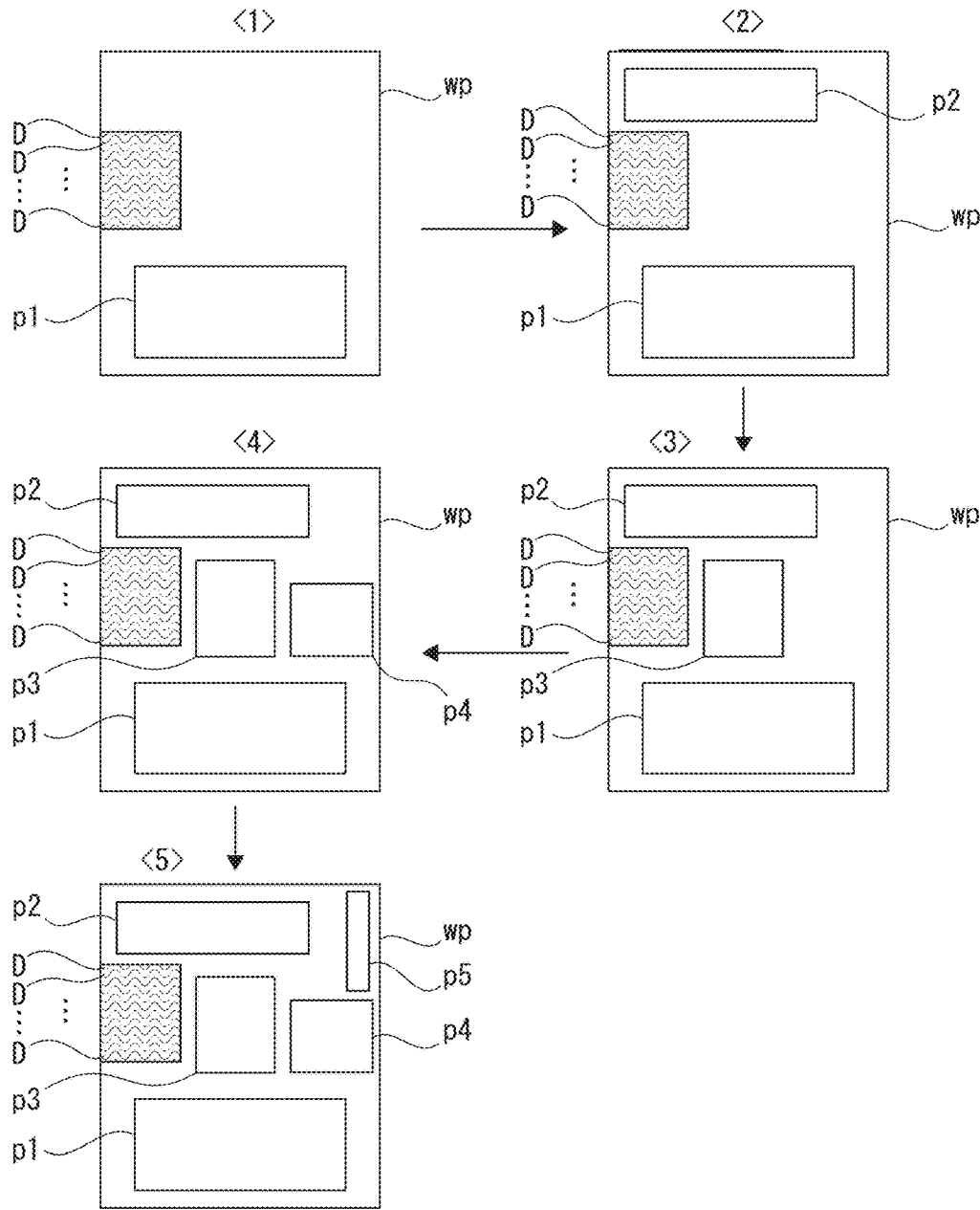
FIG. 21 includes explanatory views regarding a concrete example of the arrangement location determination of the components.

The following describes the specific method for arrangement location determination with reference to FIG. 21.

FIG. 21 premises the case where the deteriorated parts D occur on the projected web page wp in the aspect illustrated in FIG. 20.

The following description describes the arrangement areas of the respective constituent parts p before the arrangement locations are changed as "initial arrangement areas."

First, the arrangement location determination processing unit F6 determines whether the constituent part p is the deterioration constituent part or not in accordance with the priority. Whether the constituent part p is the deterioration constituent part or not is determined by the method similar to the display aspect change processing unit F4 previously described, using the degree of deterioration together with the priority in this case as well.

The example in these drawings assumes that the constituent part p1 and the constituent part p2 are the deterioration constituent parts.

First, as illustrated in <1> in the drawing, the arrangement area is secured (the arrangement location is determined) starting from the constituent part p1 with the highest priority. In this case, since the constituent part p1 is the deterioration constituent part, the arrangement location change from the initial arrangement area is required. In the example of this drawing, since the area where the constituent part p1 can be arranged is the area lower than the areas where the deteriorated parts D occur, the arrangement area for the constituent part p1 is secured with respect to these areas.

Subsequently, the arrangement area for the constituent part p2 with the second highest priority is secured (<2> in the drawing). Since the constituent part p2 is also the deterioration constituent part, the arrangement location change from the initial arrangement area is required. In the example of this drawing, since the area where the constituent part p2 can be arranged is the area above the areas where the deteriorated parts D occur, the arrangement area for the constituent part p2 is secured with respect to these areas.

Furthermore, in accordance with the priorities, the arrangement areas are secured in the order of the constituent pad p3, the constituent part p4, and the constituent part p5. Since these constituent parts p3 to p5 are not the deterioration constituent parts, the arrangement location changes from the initial arrangement areas are not essential. However, in the example of this drawing, the arrangement area for the constituent part p1 with the higher priority has already been secured at the initial arrangement areas for the constituent parts p3 to p5. In view of this, the arranged positions of these constituent parts p3 to p5 are also changed.

Since the constituent part p3 can be arranged at the area to the right of the areas where the deteriorated parts D occur, the arrangement area is secured at this area (<3> in the drawing).

Since the constituent part p4 can be arranged at the area to the right of the arrangement area secured for the constituent part p3, the arrangement area is secured at this area (<4> in the drawing).

Since the constituent part p5 can be arranged at the area to the right of the arrangement area secured for the constituent part p2, the arrangement area is secured at this area (<5> in the drawing).

Here, in the example illustrated in FIG. 21, the areas occupied by the deteriorated parts D are comparatively small; therefore, all constituent parts p can be arranged at the positions avoiding the deteriorated parts D. However, depending on the sizes of the areas occupied by the deteriorated parts D, there may be a case where arranging all constituent parts p at the positions avoiding the deteriorated parts D is impossible.

Figure 22:
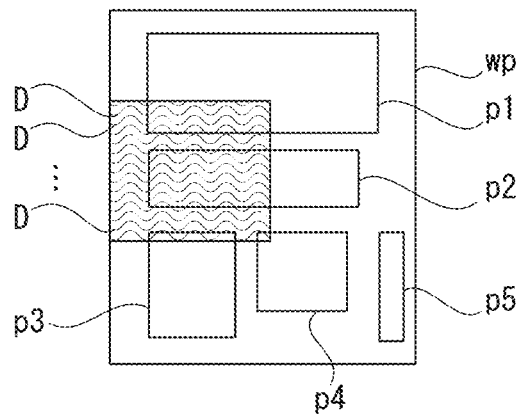
FIG. 22 is a drawing illustrating an example where comparatively large deteriorated parts occur.
Figure 23:
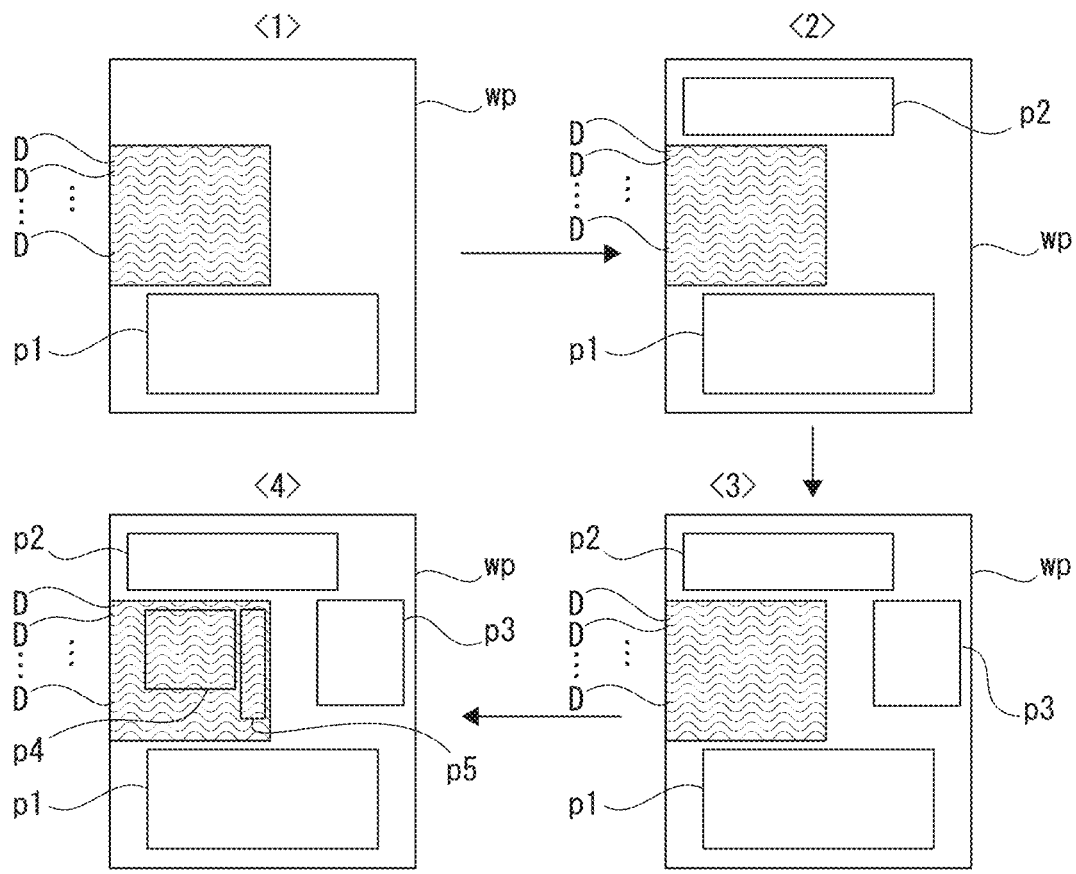
FIG. 23 includes drawings for describing specifically an arrangement location determination method of components, on the premise of occurrence of the deteriorated parts illustrated in FIG. 22.

FIG. 22 illustrates an example where the comparatively large deteriorated parts D occur. FIG. 23 includes drawings to describe the specific method for arrangement location determination of the constituent parts p in this example on the premise of the occurrence of the deteriorated parts D illustrated in FIG. 22. With the deteriorated parts D in this case, the constituent part p3 is also the deterioration constituent part in addition to the constituent parts p1 and p2.

In this case, since the constituent part p1 can be arranged at the area lower than the areas where the deteriorated parts D occur similarly to the example of FIG. 21, the arrangement area is secured at this area (<1> in FIG. 23). Since the constituent part p2 can be arranged at the area above the areas where the deteriorated parts D occur similarly to the example of FIG. 21, the arrangement area is secured at this area (<2> in FIG. 23). Furthermore, since the constituent part p3 can be arranged at the area to the right of the areas where the deteriorated parts D occur, the arrangement area is secured at this area (<3> in FIG. 23).

Here, the constituent part p4 cannot be arranged at a position avoiding the deteriorated parts D and the arrangement areas that have already been secured (hereinafter referred to as "already-secured-areas") for the constituent parts p with the higher priorities (p1 to p3 in this example).

Thus, in response to the appearance of the constituent part p that cannot be arranged at the position avoiding the deteriorated parts D and the already-secured-areas, the arrangement location determination method in this example permits the overlaps with the deteriorated parts D and determines the arrangement locations of the remaining constituent parts p including this constituent part p.

<4> in FIG. 23 illustrates an example where the arrangement locations of both remaining constituent parts p4 and p5 are determined at areas overlapped with the deteriorated parts D.

As described above, in the case where the constituent parts p that cannot be arranged at the positions avoiding the deteriorated parts D appear in the process of securing the arrangement areas (determining the arrangement locations) at the positions avoiding the deteriorated parts D in the descending order of the priority of the constituent part p, the arrangement location determination method in this example permits the overlaps with the deteriorated parts D and determines the arrangement locations of the remaining constituent parts p.

Thus, in response to the case where the arrangements of all constituent parts p at the positions avoiding the deteriorated parts D are impossible, the arrangement locations of the respective constituent parts p are determined such that the proportion of the constituent parts p with the relatively low priorities included in the deteriorated parts D is higher than the proportion of the constituent parts p with the relatively high priorities included in the deteriorated parts D.

The above-described arrangement location determination method suppresses the deterioration of visibility of the constituent parts p with the relatively high priorities caused by the deteriorated parts D more than the constituent parts p with the relatively low priorities. That is, the deterioration of visibility of the relatively important information is suppressed.

Therefore, even when the condition of the projected area is poor, the deterioration of visibility of the projected content can be suppressed.

2-3. Process Procedure

Figure 24:
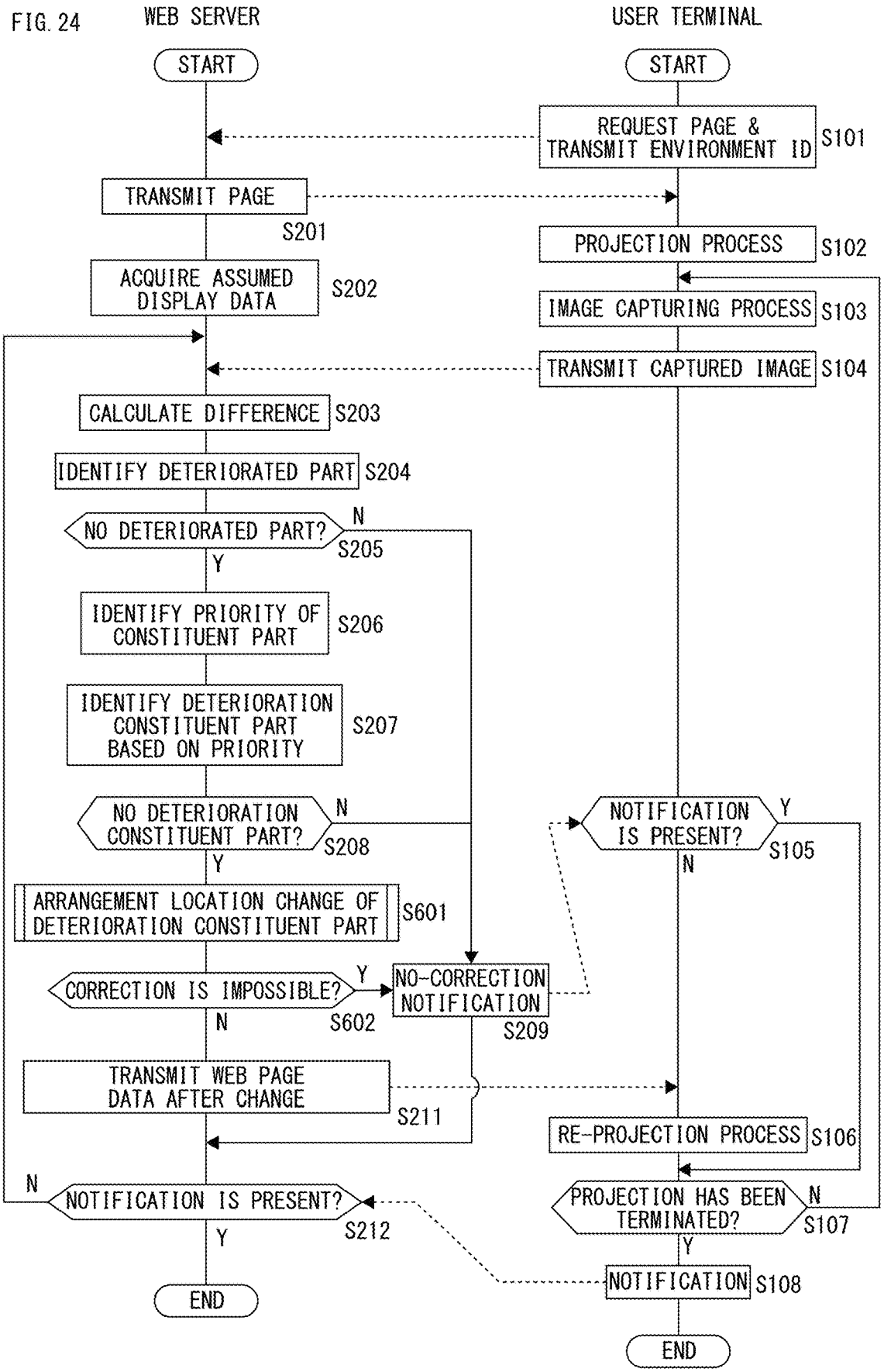
FIG. 24 is a flowchart illustrating a procedure for a process that should be executed to achieve the arrangement location determination method of the second embodiment.

The following describes a procedure for a process that should be executed to achieve the above-described deterioration correction method of the second embodiment with reference to the flowchart of FIG. 24. In FIG. 24, processes indicated as "web server" are executed based on the programs stored on the ROM built into the control unit 30 or the storage unit 31 in the web server 3'.

To execute the illustrated process, FIG. 24 also premises that the user terminal 4 has already acquired the environment ID.

As seen from the comparison with the previous FIG. 10, the processes of the user terminal 4 side of the second embodiment are similar to those of the first embodiment.

Through comparison, the processes of the web server 3' side are different from the processes by the web server 3 in the following points. Instead of the change process at Step S210, a change process at Step S601 (an arrangement location change process of the deterioration constituent part) is executed, a determination process whether a collection is impossible or not is executed at Step S602 subsequent to this Step S601, and the transmission process at Step S211 is executed when the correction is determined as not impossible at this Step S602.

The determination process at Step S602 will be described again later.

Figure 25:
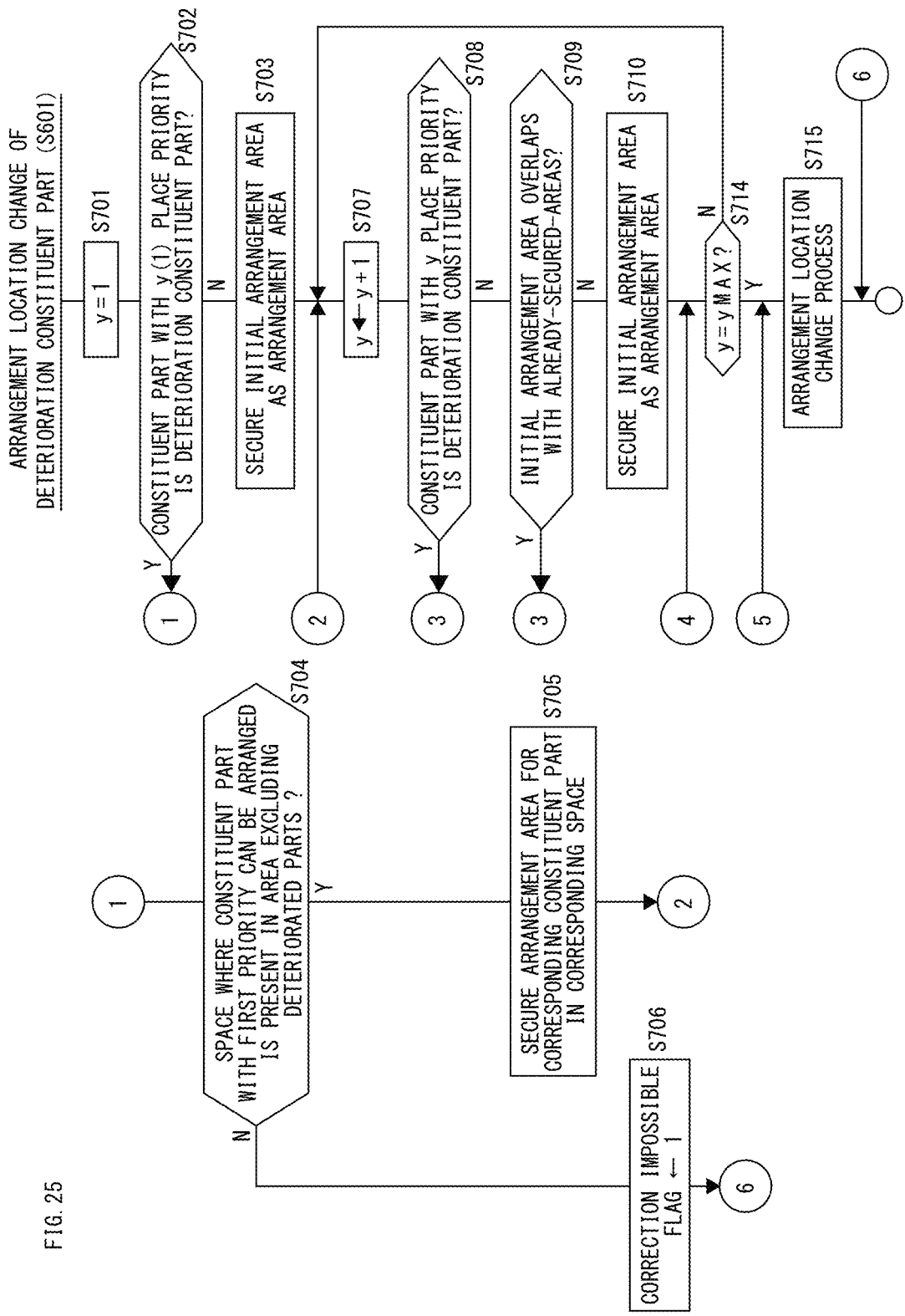
FIG. 25 is a flowchart illustrating details of an arrangement location change process.
Figure 26:
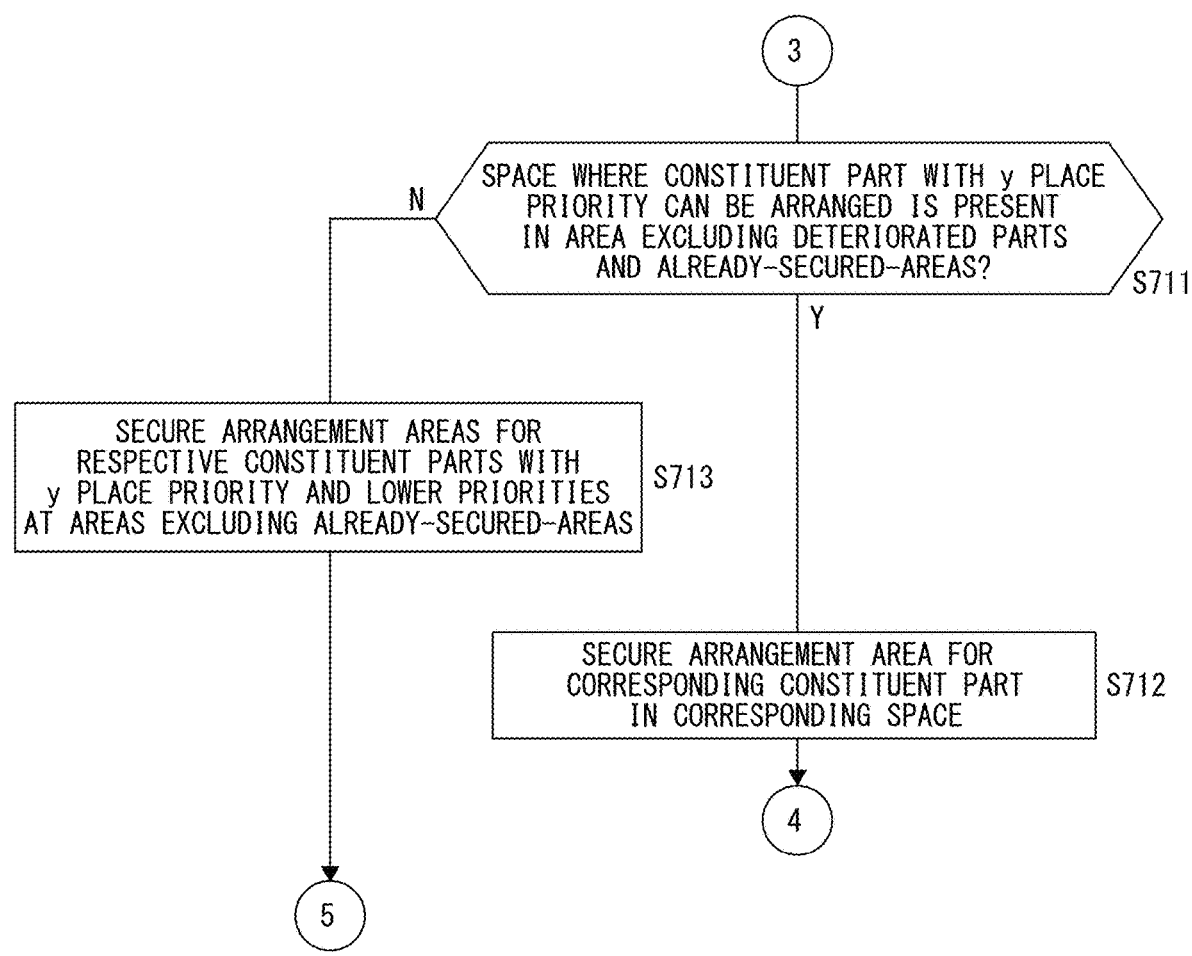
FIG. 26 is similarly a flowchart illustrating details of the arrangement location change process.

FIG. 25 and FIG. 26 are flowcharts illustrating details of the arrangement location change process of the deterioration constituent parts executed as Step S601.

As described with reference to FIG. 21 and FIG. 23, the process at this Step S601 is basically the process to secure the arrangement areas in the descending order of the priority of the constituent part p.

In FIG. 25, the control unit 30 in the web server 3' first sets "1" to a priority identification value y at Step S701. The priority identification value y is a value to identify the constituent part p with which priority is set as the process target.

At the subsequent Step S702, the control unit 30 determines whether the constituent part p with the y place priority (namely, the first rank) is the deterioration constituent part or not. The identification process of the deterioration constituent part based on the degree of deterioration and the priority with respect to each constituent part p is executed at Step S207 (FIG. 24). The determination process at Step S702 is executed based on the result of this identification process.

At Step S702, when determining that the constituent part p with the first priority is not the deterioration constituent part, the control unit 30 advances the process to Step S703, secures the initial arrangement area for this constituent part p as the arrangement area for this constituent part p, and advances the process to Step S707.

Meanwhile, when determining that the constituent part p with the first priority is the deterioration constituent part at Step S702, the control unit 30 advances the process to Step S704 and executes a process to secure the arrangement area at the position avoiding the deteriorated parts D.

First, at Step S704, the control unit 30 determines whether a space where the constituent part p with the first priority can be arranged is present in an area excluding the deteriorated parts D or not. When the corresponding—space is present, the control unit 30 advances the process to Step S705 and secures the arrangement area for the corresponding constituent part p in the corresponding space.

To secure the arrangement areas for the corresponding constituent parts p in the corresponding spaces, it is preferred that the arrangement areas for the other constituent parts p with the lower priorities are easily secured, for example, by aligning the secured areas to the lower left or to the upper right in the corresponding spaces, depending on the positions of the area where the deteriorated parts D occur.

Meanwhile, when determining that there is no space where the constituent part p with the first priority can be arranged in the area excluding the deteriorated parts D at Step S704, the control unit 30 advances the process to Step S706, sets "1" to a correction impossible flag, and terminates the arrangement location change process at Step S601.

Note that the initial value of this correction impossible flag is "0." And when the correction impossible flag is equal to 1, it is indicated that the correction is impossible.

Subsequently, the control unit 30 increments the priority identification value y by 1 at Step S707, and determines whether the constituent part p with the y place priority is the deterioration constituent part or not at the subsequent Step S708.

When determining that the constituent part p at the y place priority is not the deterioration constituent part at Step S708, the control unit 30 advances the process to Step S709 and determines whether the initial arrangement area (that is, the initial arrangement area for the constituent part p with the y place priority) overlaps with the already-secured-areas or not.

At Step S709, when determining that the initial arrangement area does not overlap with the already-secured-areas, the control unit 30 advances the process to Step S710, secures the initial arrangement area as the arrangement area for the constituent part p with they place priority, and advances the process to Step S714.

In the respective cases where determining that the constituent part p with the y place priority is the deterioration constituent part at the previous Step S708 and where determining that the initial arrangement area overlaps with the already-secured-area at Step S709, the control unit 30 advances the process to Step S711 illustrated in FIG. 26.

At Step S711, the control unit 30 determines whether a space where the constituent part p with the y place priority can be arranged is present in an area excluding the deteriorated parts D and the already-secured-areas or not. When the corresponding space is present, the control unit 30 advances the process to Step S712 and secures the arrangement area for the corresponding constituent part p in the corresponding space.

Accordingly, when the arrangements at the areas avoiding the deteriorated parts D (and the already-secured-areas) are possible, the arrangement areas for the constituent parts p with the second priority and the lower priorities are secured at these areas as well.

Meanwhile, when determining that there is no space where the constituent part p with the y place priority can be arranged in the area excluding the deteriorated parts D and the already-secured-areas at Step S711, the control unit 30 advances the process to Step S713 and secures the arrangement areas for the constituent parts p with the y place priority and the lower priorities at the areas excluding the already-secured-areas.

That is, in response to the appearance of the constituent part p that cannot be arranged at the position avoiding the deteriorated parts D and the already-secured-areas, the overlaps with the deteriorated parts D are permitted and the arrangement locations of the remaining constituent parts p including this constituent part p are determined.

The control unit 30 that has executed the securing process of the arrangement area at Step S712 advances the process to Step S714 illustrated in FIG. 25.

At Step S714, the control unit 30 determines whether the priority identification value y has reached an upper limit value pMAX or not. In this example, the upper limit value pMAX is a value indicative of a total count of the constituent parts p included in the projected content (the web page wp in this example).

When the priority identification value y does not reach the upper limit value pMAX, the control unit 30 returns the process to Step S707, increments the priority identification value y by 1, and then executes processes at and after Step S708 again. Accordingly, processes to secure the arrangement areas for the respective constituent parts p included in the web page wp are repeated.

In the respective cases where the priority identification value y has reached the upper limit value pMAX and the arrangement areas for the constituent parts p with the y place priority and the lower priorities are secured at Step S713 (FIG. 26) described above, the control unit 30 advances the process to Step S715, executes the process that arranges the respective constituent parts p at the arrangement areas secured for these constituent parts p as the arrangement location change process, and terminates the arrangement location change process at Step S601. Here, the arrangement location change of the constituent parts p described above is achieved by changing the descriptions of the HTML data of the web page wp.

Now, the description returns to FIG. 24.

The control unit 30 determines whether the correction is impossible or not, that is, whether the correction impossible flag is equal to 1 or not at Step S602 subsequent to the arrangement location change process at Step S601. When determining that the correction is impossible, the control unit 30 advances the process to Step S209 and executes the no-correction notification to the user terminal 4. That is, in this example, when determining that the arrangement of the constituent part p with the first priority at the position avoiding the deteriorated, parts D is impossible, the change in the arrangement location of the constituent part p and the re-projection process of the content after the change on the user terminal 4 side are not executed. In this case, the user terminal 4 side continuously projects the content during projection until then onto the projection area Ap. The respective constituent parts p in this projected content are displayed in the projection area Ap.

Event when the constituent part p with the first priority cannot be arranged at the position avoiding the deteriorated parts D (that is, the position where the degree of deterioration is "0"), in the case where the constituent part p can be arranged at an area where the degree of deterioration becomes lower than that in the case where the constituent part p is arranged at the initial arrangement area, the correction flag is not set to 1 but the arrangement area for the constituent part p with the first priority can be secured at this area and the process can be continued.

Meanwhile, when determining that the correction is not impossible at Step S602, the control unit 30 advances the process to Step S211 and transmits the web page data after the change, that is, the web page data on which the arrangement location change process has been executed at Step S715 (FIG. 25), to the user terminal 4 side.

This allows the user terminal 4 side to project the content after the arrangement location change again.

Here, in the process illustrated in FIG. 24, the web server 3' obtains the plurality of imaging data obtained by capturing the images of the content projected onto the projection area Ap at the plurality of time points and changes the arrangement locations based on the difference information at the plurality of time points identified from comparisons between the plurality of imaging data and the assumed display data.

This allows executing the deterioration correction corresponding to the change in the difference over time in the second embodiment as well.

Especially, in the process illustrated in FIG. 24, the web server 3' changes the arrangement locations based on the difference information at the above-described respective time points. Specifically, the web server 3' executes the processes at and after Step S203 each time the new captured image data Si is sequentially received from the user terminal 4.

This allows improving responsiveness of the correction to the changes in the deteriorated parts D over time in response to the case where the deteriorated parts D exhibit these changes over time in the projected content in the second embodiment as well.

While the example where the difference in colors with the assumed display data is used as the reference to identify the deteriorated parts D similarly to the case of the first embodiment has been described above, the factor causing the deteriorated part D is possibly, for example, a level difference and undulations (unevenness) formed on the wall as the projection target.

Considering this point, the deteriorated part D can be identified not only based on the magnitude of the difference in colors but also based on a position or a magnitude of an error in size of the image parts identified between the captured image data Si and the assumed display data. For example, the deteriorated part D is possibly identified based on the position or the magnitude of the error in size of the edge parts identified between the captured image data. Si and the assumed display data.

While in the above, it is premised that the size (projected size) of the constituent part p cannot be changed to determine the arrangement location, the change in size of the constituent part p may be permitted to determine the arrangement location. For example, by permitting size reduction of the constituent parts p, all constituent parts p can be further easily arranged at the locations avoiding the deteriorated parts D.

As a specific method, for example, it is conceivable to preliminarily fix a reduction ratio to scale down the projected size of the constituent part p according to the priority of the constituent part p. In this respect, the reduction ratio is preliminarily fixed such that the degree of size reduction is reduced small as the priority of the constituent part p becomes high. For example, when the reduction ratio "1" is set as identical to the actual size, in the case where the value is configured such that the degree of size reduction increases as the value decreases, the higher the priority is, the larger the value of the reduction ratio is.

Thus fixing the reduction ratio according to the priority ensures suppressing the deterioration of visibility accompanying the size reduction as the degree of importance of the constituent part p becomes high.

For the arrangement location determination of the constituent part p, an aspect ratio of the constituent part p may be changed. This allows further facilitating the arrangement of the constituent part p at the position avoiding the deteriorated parts D and the already-secured-areas.

The above-described size reduction in the constituent part p and change in the aspect ratio are achieved by changing the description of the HTML data of the web page wp. When the constituent part p is reduced in size, if a character is included in this constituent part p, the size of this character can be similarly decreased.

The example where the constituent parts p are arranged at the positions avoiding the deteriorated parts D in the descending order of the priority of the constituent part p has been described above. Conversely, the constituent parts p can be arranged at areas including the deteriorated parts D in the ascending order of the priority of the constituent part p.

Figure 27:
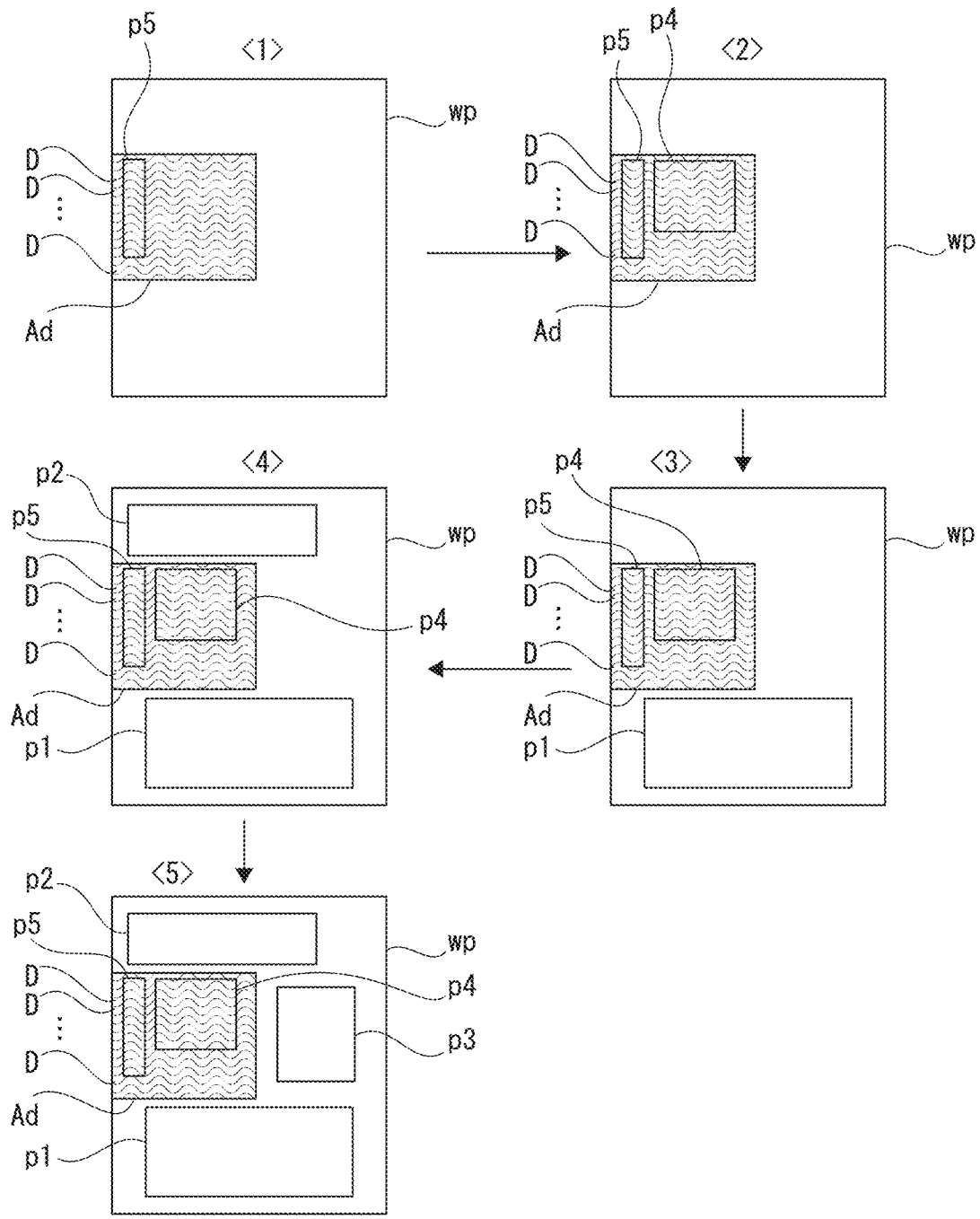
FIG. 27 includes explanatory views regarding a method of executing arrangement in an area including the deteriorated parts in an ascending order of the priority of the component.

FIG. 27 includes explanatory views regarding a specific method in the case. FIG. 27 premises the case where the deteriorated parts D occur in the aspect illustrated in the previous FIG. 22.

In this case, the arrangement location determination processing unit F6 first identifies an area including the deteriorated parts D, that is, a target area where the constituent part p with the low priority is preferentially arranged (hereinafter referred to as "deteriorated part inclusion area Ad"), The deteriorated part inclusion area Ad is identified as, for example, an area where the deteriorated parts D are dense at equal to or more than a predetermined density. Depending on the occurrence aspect of the actual deteriorated parts D, the plurality of deteriorated part inclusion areas Ad are possibly identified.

The arrangement location determination processing unit F6 in this case secures the arrangement areas in the identified deteriorated part inclusion area Ad in the order from the constituent part p5 with the lowest priority (<1> and <2> in FIG. 27).

The example in this drawing describes the case where, at a phase where the arrangement area for the constituent part p4 with the second lowest priority is secured, there is no space where the constituent part p3 with the next lowest priority can be arranged in the deteriorated part inclusion area Ad.

In response to a situation where no more constituent part p can be arranged in the deteriorated part inclusion area Ad as described above, the arrangement location determination processing unit F6 in this case switches the arrangement process of the constituent parts p to a process that arranges the constituent parts p at positions avoiding the deteriorated parts D in the descending order of the priority of the constituent part p. Specifically, in this case, as illustrated as transition of <3>, <4>, and <5> in FIG. 27, the arrangement areas are secured at the areas excluding the deteriorated parts D and the already-secured-areas in the order of the constituent parts p1, p2, and p3.

As described above, by employing the method of arranging the constituent parts p at the positions including the deteriorated parts D in the ascending order of the priority of the constituent part p, the proportion of the constituent parts p with the relatively low priorities included in the deteriorated parts D is configured to be higher than the proportion of the constituent parts p with the relatively high priorities included in the deteriorated parts D.

The example where the deteriorated part inclusion area Ad is identified has been described above as the example of the method that arranges the constituent part p at the area including the deteriorated part D. However, identifying this deteriorated part inclusion area Ad is not essential. Another method, for example, a method of arranging the constituent parts p such that an area overlapped with the deteriorated parts D is configured to be the maximum, may be employed.

Figure 28:
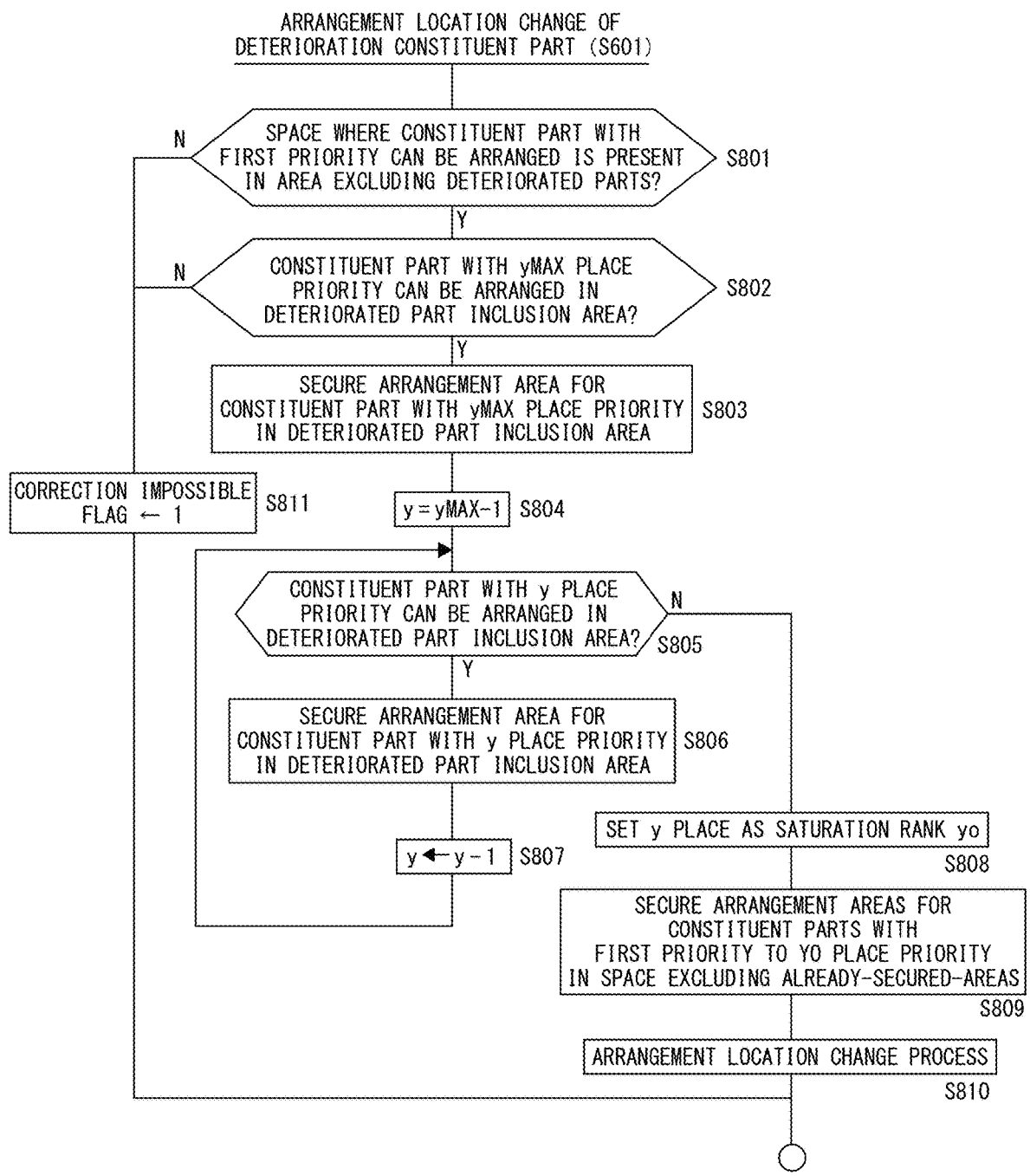
FIG. 28 is a flowchart illustrating a procedure for a process that should be executed to achieve the method of FIG. 27.

FIG. 28 is a flowchart illustrating a procedure for a specific process that should be executed to achieve the method described in FIG. 27. The control unit 30 in this case executes a process illustrated in this FIG. 28 as the arrangement location change process at Step S601 illustrated in FIG. 24.

In FIG. 28, the control unit 30 determines whether a space where the constituent part p with the first priority can be arranged is present in an area excluding the deteriorated parts D or not at Step S801.

This process at Step S801 functions as a process that determines whether a result of "the proportion of the components with the relatively low priorities included in the deteriorated parts is higher than the proportion of the components with the relatively high priorities included in the deteriorated parts" is obtained or not by executing the arrangements at the positions including the deteriorated parts D in the ascending order of the priority of the constituent part p.

In the case where the entire region of the projection area Ap is the deteriorated part inclusion area Ad, even when the arrangement locations of the constituent parts p are changed by any way, the result of "the proportion of the components with the relatively low priorities included in the deteriorated parts is higher than the proportion of the components with the relatively high priorities included in the deteriorated parts" cannot be obtained. From this point, it is also possible to change the process of Step S801 to a process of determining "whether the size of the deteriorated part inclusion area Ad is equal to or more than a predetermined value or not."

At Step S801, when there is no space where the constituent part p with the first priority can be arranged in the area excluding the deteriorated parts D, the control unit 30 sets the correction impossible flag to "1." at Step S811 and terminates the arrangement location change process at Step S601.

Meanwhile, when there is a space where the constituent part p with the first priority can be arranged in the area excluding the deteriorated parts D, the control unit 30 advances the process to Step S802 and determines whether the constituent part p with a yMAX place priority (namely, the lowest rank) can be arranged in the deteriorated part inclusion area Ad or not. That is, whether the entire constituent part p with the yMAX place priority can fall within the deteriorated part inclusion area Ad or not is determined.

When the constituent part p with the yMAX place priority cannot be arranged in the deteriorated part inclusion area Ad, the control unit 30 advances the process to Step S811, sets the correction impossible flag to "1," and terminates the arrangement location change process at Step S601.

When the constituent part p with the yMAX place priority can be arranged in the deteriorated part inclusion area Ad, the control unit 30 advances the process to Step S803 and secures an arrangement area for the constituent part p with the yMAX place priority in the deteriorated, part inclusion area Ad.

At the subsequent Step S804, the control unit 30 sets the priority identification value y to "yMAX−1" and then determines whether the constituent part p with the y place priority can be arranged in the deteriorated part inclusion area Ad excluding the already-secured-areas or not at Step S805.

When the constituent part p with the y place priority can be arranged in the deteriorated part inclusion area Ad excluding the already-secured-areas, the control unit 30 advances the process to Step S806 and secures the arrangement area for the constituent part p with the y place priority in the deteriorated part inclusion area Ad excluding the already-secured-areas.

Then, at the subsequent Step S807, the control unit 30 decrements the prior identification value y by 1 (−1) and returns the process to Step S805. This secures the arrangement areas for the constituent parts p in the deteriorated part inclusion area Ad as many as possible.

Meanwhile, when the constituent pad p with the y place priority cannot be arranged in the deteriorated part inclusion area Ad excluding the already-secured-areas, the control unit 30 advances the process to Step S808, sets the y place as a saturation rank yo, and secures arrangement areas for the constituent parts p with the first priority to the yo place in a space excluding the already-secured-areas at the subsequent Step S809. At this time, the arrangement areas are secured in the order from the constituent part p with the first priority in the space excluding the already-secured-areas.

To describe for confirmation, since the determination process at Step S801 has been executed in this example, it is guaranteed that the arrangement area can be secured for at least the constituent part p with the first priority in the space excluding the deteriorated parts D.

The control unit 30 that has executed the arrangement area securing process at Step S809 executes a process to arrange the respective components p at arrangement areas secured similarly to the previous Step S715 as the arrangement location change process of Step S810 and terminates the arrangement location change process of Step S601.

When the constituent part p with the first priority cannot be arranged at the area excluding the deteriorated parts D (S801) and when the constituent part p with the lowest priority does not fall within the area including the deteriorated part D (S802), in the above-described example, it is assumed that there is a possibility that the condition "the proportion of the components with the relatively low priorities included in the deteriorated parts is higher than the proportion of the components with the relatively high priorities included, in the deteriorated parts" cannot be achieved, "1" is set to the correction impossible flag, and the processes (processes at and after S803) for the arrangement location change of the constituent parts p are not executed.

However, as the determination process whether to execute the process for the arrangement location change or not, a process of determining whether another condition is met can be employed. For example, the process may be a determination process of determining whether "the degree of deterioration of the constituent part p with the first priority when this constituent part p with the first priority is arranged at an area where the degree of deterioration is the lowest is smaller than the degree of deterioration of the constituent part p with the lowest rank priority when the constituent part p with the lowest rank priority is arranged at an area where the degree of deterioration is the maximum" or not.

2-4. Modification 1

Another method is also conceivable as the method for the arrangement location determination such that "the proportion of the components with the relatively low priorities included in the deteriorated parts is higher than the proportion of the components with the relatively high priorities included in the deteriorated parts" in addition to the method described above as the example.

For example, a method of exchanging the deterioration constituent parts for the constituent parts p with the relatively low priorities in the descending order of the priority of the deterioration constituent part is employable.

Figure 29:
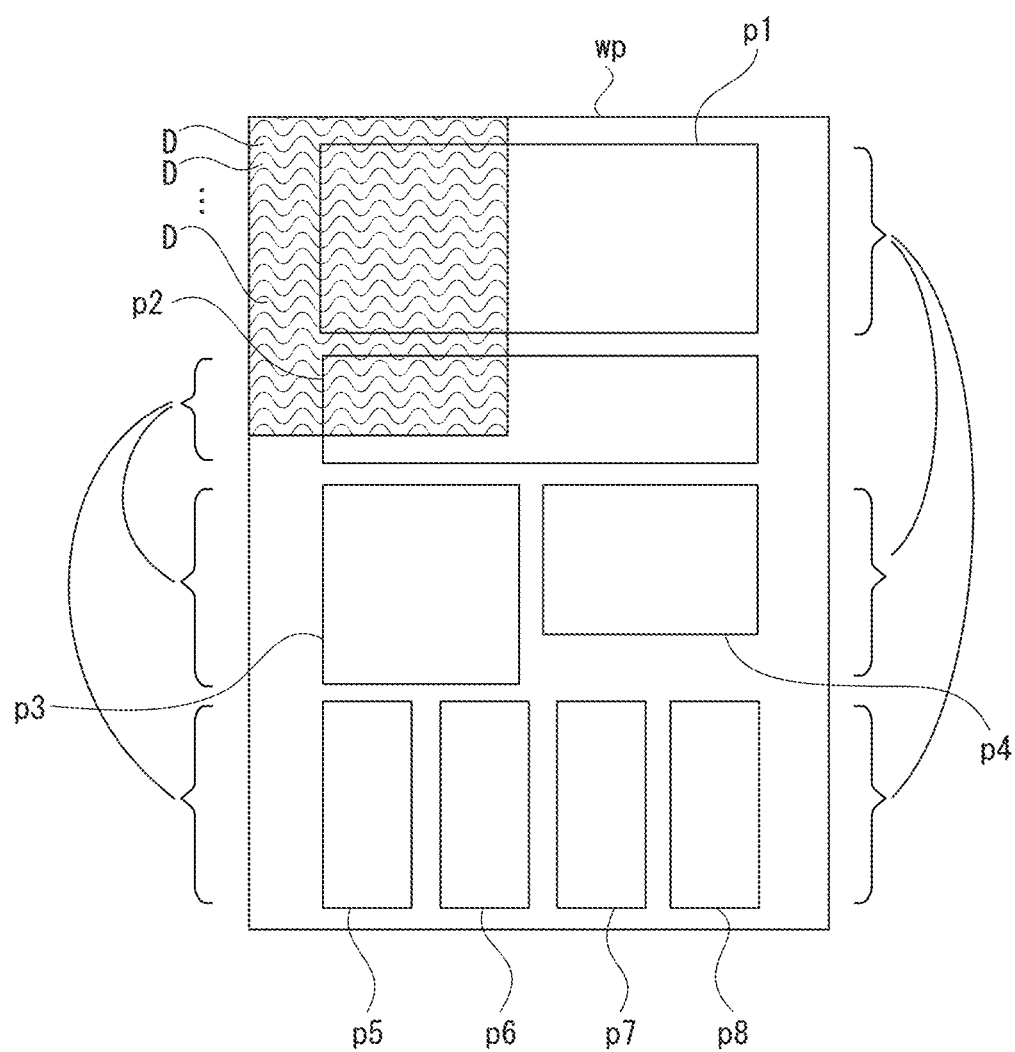
FIG. 29 is an explanatory view regarding an arrangement location determination method as a modification 1 in the second embodiment.

FIG. 29 is a drawing to describe the method as the modification 1 as described above.

As illustrated in the drawing, it is assumed that eight constituent parts p1 to p8 are arranged as the constituent parts p on the web page wp in this case (the numbers at the ends indicate the priorities of the constituent parts p in this case as well).

As illustrated in the drawing, the deteriorated parts D occur so as to overlap with each of a part of the constituent part p1 and a part of the constituent part p2; therefore, these constituent parts p1, p2 correspond to the deterioration constituent parts. The constituent parts p other than the component parts p1 and p2 do not overlap with the deteriorated parts D and therefore correspond to non-deterioration constituent parts.

In the example illustrated in FIG. 29, as subordinate constituent parts p that can be exchanged for the constituent part p1 as the deterioration constituent part and can lower the degree of deterioration (for example, the degree of deterioration=0) of constituent part p1 by the exchange, a set of the constituent part p3 and the constituent part p4 and a set of the constituent parts p5, p6, p7, and p8 are present.

Similarly, as further subordinate constituent parts p that can be exchanged for the constituent part p2 as the deterioration constituent part and can lower the degree of deterioration of constituent part p2 by the exchange, the set of the constituent part p3 and the constituent part p4 and the set of the constituent parts p5, p6, p7, and p8 are present.

The following abbreviates the set of the constituent parts p as "constituent part set."

For example, in such case, the arrangement location determination processing unit F6 in the modification 1 determines the arrangement locations so as to exchange the deterioration constituent parts for the constituent parts p with the relatively low priorities, in the descending order of the priority of the deterioration constituent part.

At this time, regarding the constituent parts p1 and p2 as the deterioration constituent parts, there are a plurality of exchangeable candidates. In this example, in the case where the plurality of exchangeable candidates are present for the deterioration constituent parts, a candidate closest to the original position (initial arrangement area) of this deterioration constituent part is determined as the exchange target. Specifically, the constituent part p1 is exchanged for the constituent part set of the constituent parts p3 and p4 among the constituent part set of the constituent parts p3 and p4 and the constituent part set of the constituent parts p5 to p8 as the exchangeable candidates.

In this case, since the candidate of the constituent part p2 (the candidate that can lower the degree of deterioration of this constituent part p2 by exchange) remained after the exchange of the arrangement location (after the determination of the arrangement location) of the constituent part p1 with the higher priority is only the constituent part set of the constituent parts p5 to p8, the constituent part p2 is exchanged with this constituent part set of the constituent parts p5 to p8.

The method of exchanging the arrangement location as described above also achieves the arrangement location determination such that the proportion of the components with the relatively low priorities included in the deteriorated parts is higher than the proportion of the components with the relatively high priorities included in the deteriorated parts.

Accordingly, the deterioration of visibility of the relatively important information is suppressed. Even when the condition of the projected area is poor, the deterioration of visibility of the projected content can be suppressed.

Figure 30:
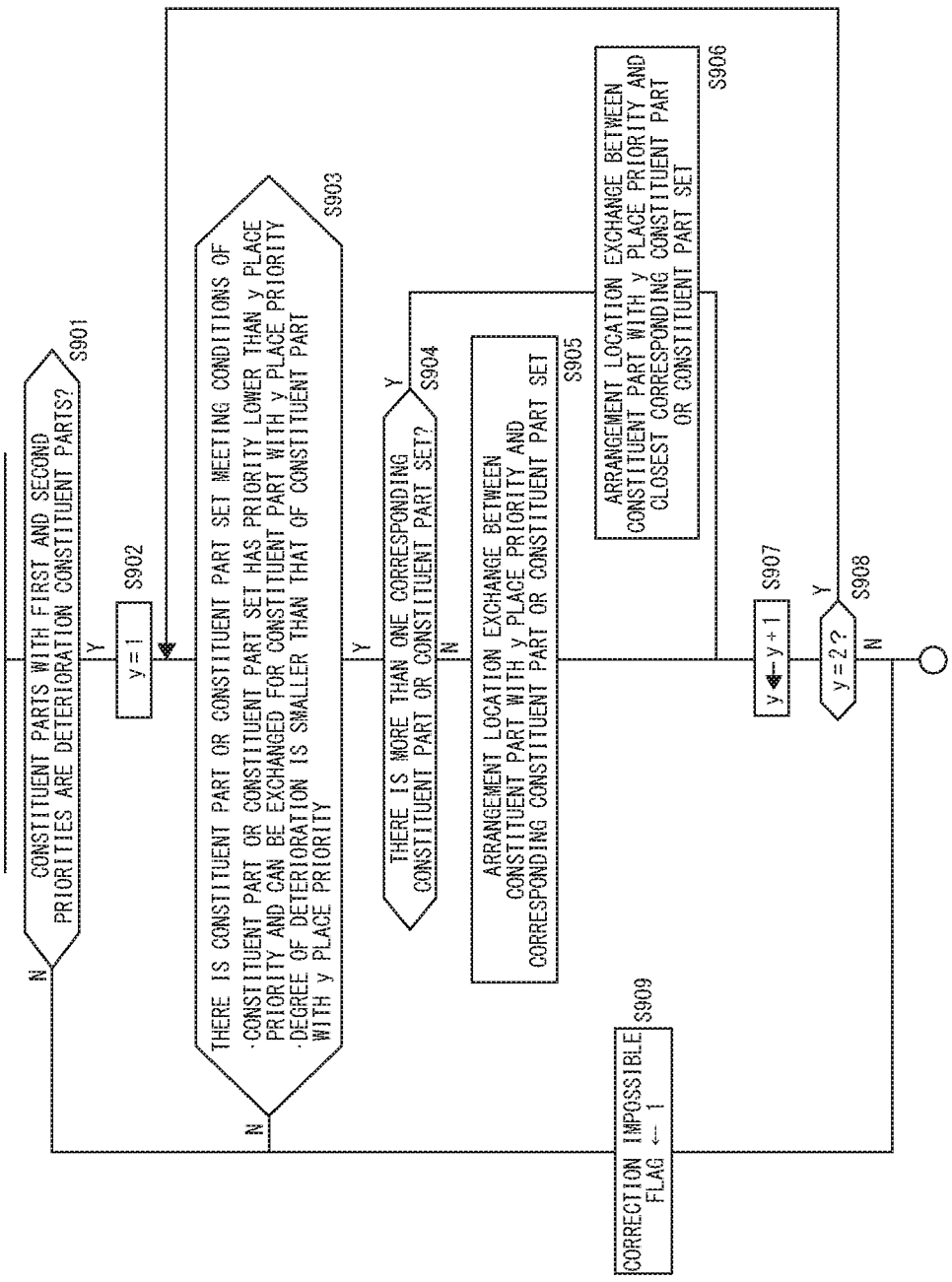
FIG. 30 is a flowchart illustrating a procedure for a process that should be executed to achieve the arrangement location determination method as the modification 1.

FIG. 30 is a flowchart illustrating a process procedure to achieve the arrangement location determination method as the above-described modification 1. The control unit 30 in this example executes a process illustrated in this FIG. 30 as the arrangement location change process at Step S601 illustrated in FIG. 24.

In FIG. 30, the control unit 30 determines whether the constituent parts p with the first and second priorities are the deterioration constituent parts or not at Step S901.

When the constituent parts p with the first and second priorities are not the deterioration constituent parts, the control unit 30 advances the process to Step S909, sets "1" to the correction impossible flag, and terminates the arrangement location change process of Step S601.

Here, to exchange the deterioration constituent parts for the constituent parts p with the relatively low priorities in the descending order of the priority of the deterioration constituent part, at least the two or more deterioration constituent parts as the exchange targets need to be present. In view of this, the determination process of Step S901 is provided.

Meanwhile, at Step S901, when the constituent parts p with the first and second priorities are the deterioration constituent parts, the control unit 30 sets "1" to the priority identification value y at Step S902, and executes a determination process at Step S903. That is, at this Step S903, it is determined whether there is a constituent pad p or a constituent part set meeting conditions of:

the constituent part p or the constituent pad set has a priority lower than they place priority, and can be exchanged for the constituent part p with the y place priority; and the degree of deterioration is smaller than that of the constituent part p with they place priority.

At Step S903, when there is no constituent part p or constituent part set meeting the above-described conditions, the control unit 30 advances the process to Step S909, sets "1" to the correction impossible flag, and terminates the arrangement location change process at Step S601.

Meanwhile, when there is the constituent part p or the constituent part set meeting the above-described conditions, the control unit 30 advances the process to Step S904 and determines whether there is more than one corresponding constituent part p or constituent part set.

When there is not more than one corresponding constituent part p or constituent part set, the control unit 30 advances the process to Step S905, executes an arrangement location exchange process between the constituent part p with the y place priority and the corresponding constituent part p or constituent part set, and advances the process to Step S907.

Meanwhile, when there is more than one corresponding constituent part p or constituent part set, the control unit 30 advances the process to Step S906, executes the arrangement location exchange process between the constituent part p with the y place priority and the closest corresponding constituent part p or constituent part set, and advances the process to Step S907. At Step S906, "the closest" means, as understood from the previous description, the closest to the position of the constituent part p with the y place priority with reference to the mutual positions of the initial arrangement areas.

At Step S907, the control unit 30 increments the priority identification value y by 1 and determines whether the priority identification value y is "2" or not at the subsequent Step S908.

When the priority identification value y is "2," the control unit 30 returns the process to Step S903. That is, the presence/absence of the constituent part p or the constituent part set as the exchange candidate for the constituent part p2 with the second priority is the determined (S903). When the exchange candidate is present, the processes at and after Step S904 are executed.

Meanwhile, when the priority identification value y is not "2" (namely, "3" or more), the control unit 30 terminates the arrangement location change process of Step S601.

While the example where the determination of the deterioration constituent parts as the exchange targets is ended at the deterioration constituent part with the second priority has been described above, obviously, the deterioration constituent parts with the third and lower priorities can be included as the exchange targets.

2-5. Modification 2

The previous FIG. 25 and FIG. 26 give the examples where, to change the arrangement locations, the arrangement locations are determined in the descending order of the priority of the constituent part p. The arrangement locations can be determined at the positions avoiding the deteriorated parts D targeting only the constituent parts p with the relatively high priorities.

Figure 31:
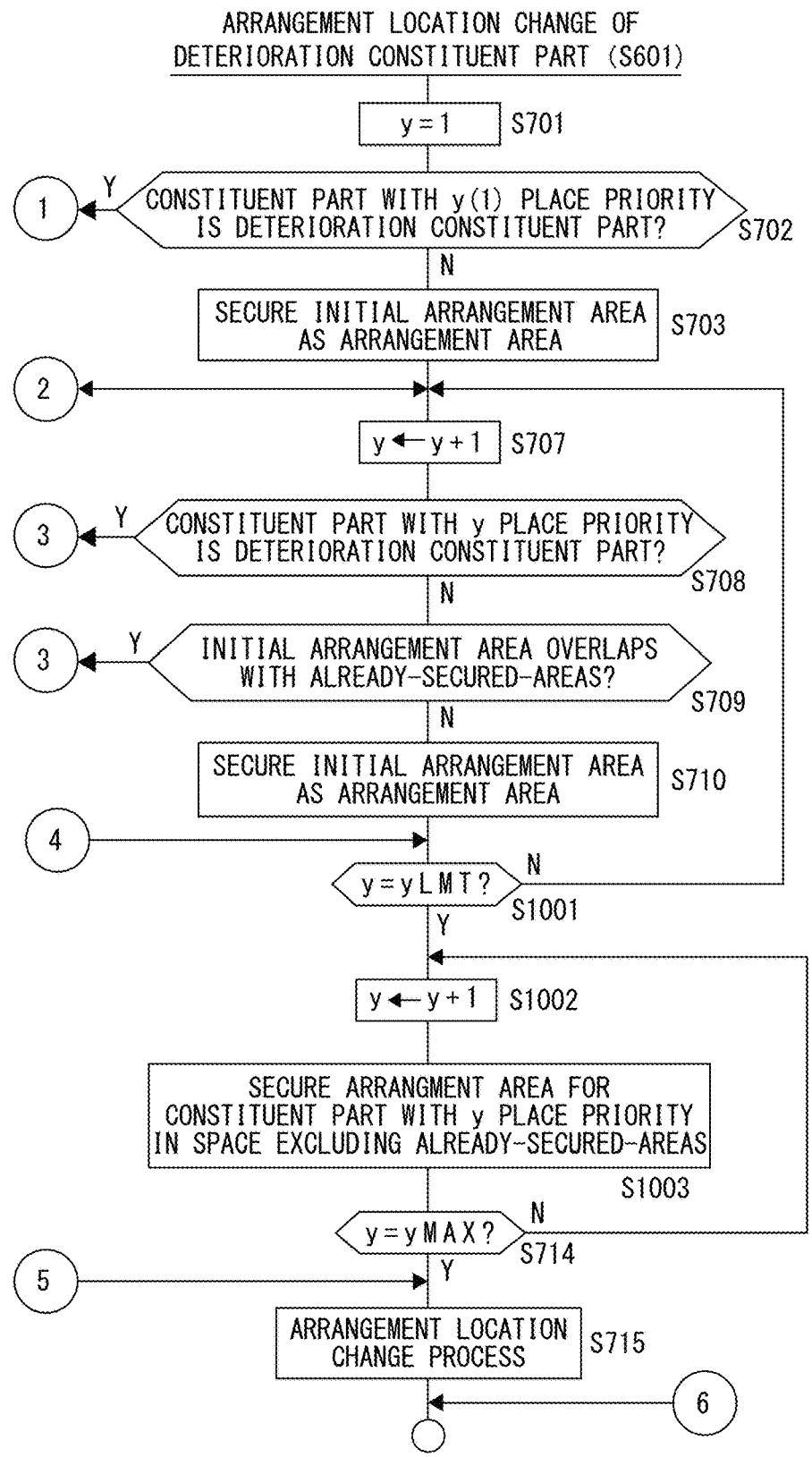
FIG. 31 is a flowchart illustrating a procedure for a process that should be executed to achieve an arrangement location determination method as a modification 2 in the second embodiment.

FIG. 31 is a flowchart illustrating a procedure for the arrangement location change process at Step S601 that should be executed to achieve the arrangement location determination method as the modification 2.

Compared with the process at Step S601 illustrated in FIG. 25 and FIG. 26, the process at Step S601 in the modification 2 differs in that processes of Steps S1001 to S1003 are inserted between Step S710 and Step S714.

Specifically, in this case, the control unit 30 that has executed the arrangement area securing process at Step S710 or the arrangement area securing process at Step S712 (see FIG. 26) determines whether the priority identification value y has reached a limit value yLMT or not at Step S1001. The limit value yLMT is a value fixing that the constituent parts p with up to which upper priorities would be the targets as the constituent parts p target for the arrangement location change avoiding the deteriorated parts D. For example, to set the constituent parts p up to the second top places as these targets for arrangement location change, the limit value yLMT is set to be equal to 2.

At Step S1001, when determining that the priority identification value y does not reach the limit value yLMT, the control unit 30 returns the process to Step S707 and increments the priority identification value y by 1.

From the processes of Step S701 to Step S1001, the arrangement areas for the constituent parts p with the priorities up to the upper "yLMT" priority are secured in the spaces excluding the deteriorated parts D and the already-secured-areas (only the deteriorated parts D regarding the first priority).

At Step S1001, when determining that the priority identification value y reaches the limit value yLMT, the control unit 30 advances the process to Step S1002, increments the priority identification value y by 1, and executes a process to secure the arrangement area for the constituent part p with the y place priority in the space excluding the already-secured-areas at the subsequent Step S1003.

The control unit 30 that has executed the securing process at Step S1003 executes the determination process at Step S714. In this case, when determining that the priority identification value y does not reach the upper limit value yMAX at this Step S714, the control unit 30 returns the process to Step S1002 and executes the increment process of the priority identification value y.

Accordingly, the arrangement areas are secured for remaining constituent parts p with the priorities lower than the "yMLT" place conditioning only avoiding the already-secured-areas.

As described above, when the arrangement location determination targeting only the constituent parts p with the relatively high priorities and avoiding the deteriorated parts D is executed, the constituent parts p with the relatively low priorities are permitted to be arranged overlapped with the deteriorated parts D; therefore, the arrangement location change of the constituent parts p can be easily executed in the limited space. Especially, in the case where the size reduction of the constituent part p and the aspect ratio change are permitted, a possibility of execution of the size reduction and the aspect ratio change can be lowered, thereby ensuring reducing a processing load accompanied by these size reduction and aspect ratio change.

2-6. Modification 3

As a method for the arrangement location determination in the second embodiment, a method that updates the arrangements of the constituent parts p triggered by a lapse of a display period according to the priorities is employable.

Figure 32A:
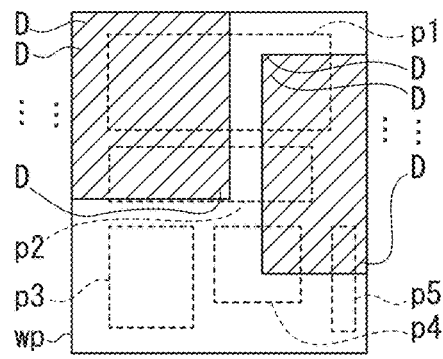
FIGS. 32A-32C include explanatory views regarding an arrangement location change method as a modification 3 in the second embodiment.
Figure 32B:
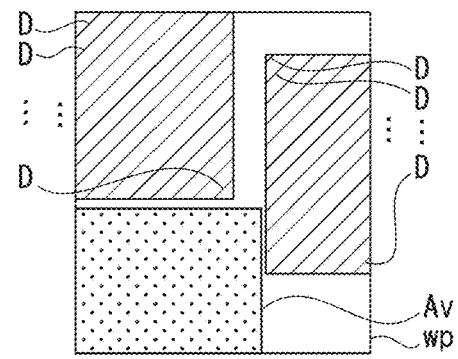
Figure 32C:
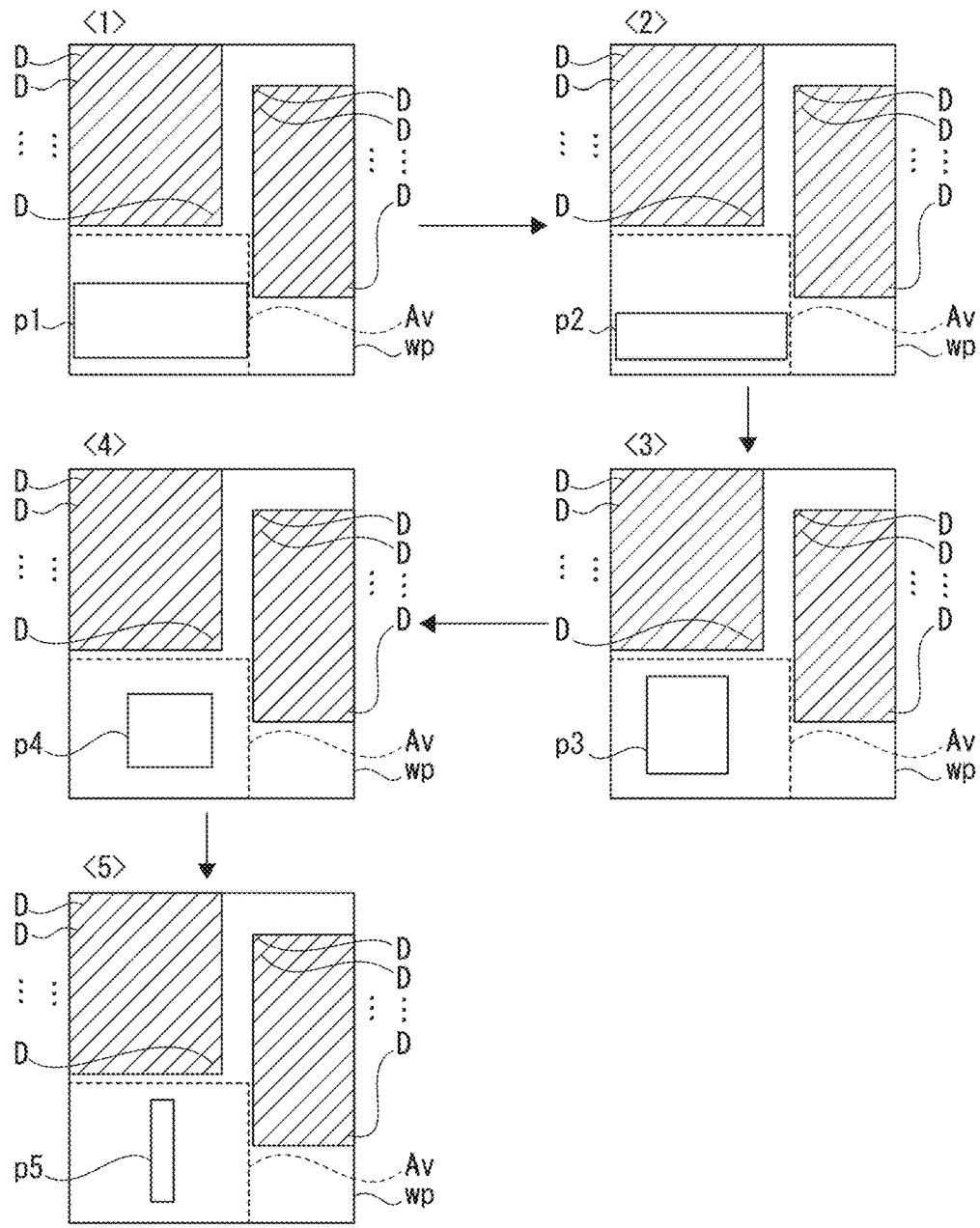

FIGS. 32A-32C are explanatory views for the arrangement location change method as the modification 3.

For example, as illustrated in FIG. 32A, it is assumed that areas where the deteriorated parts D occur are present at the respective right and left positions on the projected web page wp by comparatively large areas.

The modification 3 sets a sequential display target area Av as illustrated in FIG. 32B in a space excluding the deteriorated parts D. For example, a square-shaped area is set as this sequential display target area Av. To secure some extent of area, an area where lengths in respective vertical direction and lateral direction can be secured by predetermined lengths or more is searched from the space excluding the deteriorated parts D and the area is set as the sequential display target area Av.

The modification 3 determines the arrangement locations such that the respective constituent parts p are sequentially displayed for time lengths in accordance with their priorities in the thus set sequential display target area Av.

Specifically in this example, as illustrated as the transition <1> to <5> in FIG. 32C, the arrangement locations of the constituent parts p are updated according to the time passage such that the constituent parts p1, p2, p3, p4, and p5 are sequentially displayed in this order in the sequential display target area Av.

In this case, the display time lengths of the respective constituent parts p are fixed according to the priorities, and the constituent parts p with the higher priorities have the longer display time lengths. That is, the display period can be configured to be longer as the information becomes important.

In the case where the image size of the constituent part p as the display target is larger than the size of the set sequential display target area Av, the image size of the constituent part p is scaled down. In this respect, the aspect ratio can be changed together with the size reduction or instead of the size reduction.

As described above, the method of the modification 3 that updates the arrangements of the constituent parts p triggered by the lapse of the display periods according to the priorities eliminates a need for simultaneously arranging the plurality of constituent parts p in the limited space where the deteriorated parts D can be avoided. This ensures further facilitating displaying the respective constituent parts p in the aspect suppressing the deterioration of visibility.

The method of the modification 3 can lengthen the display time length as the information becomes important; therefore, this ensures lowering a possibility of overlooking the important information by a viewer of the content.

Figure 33:
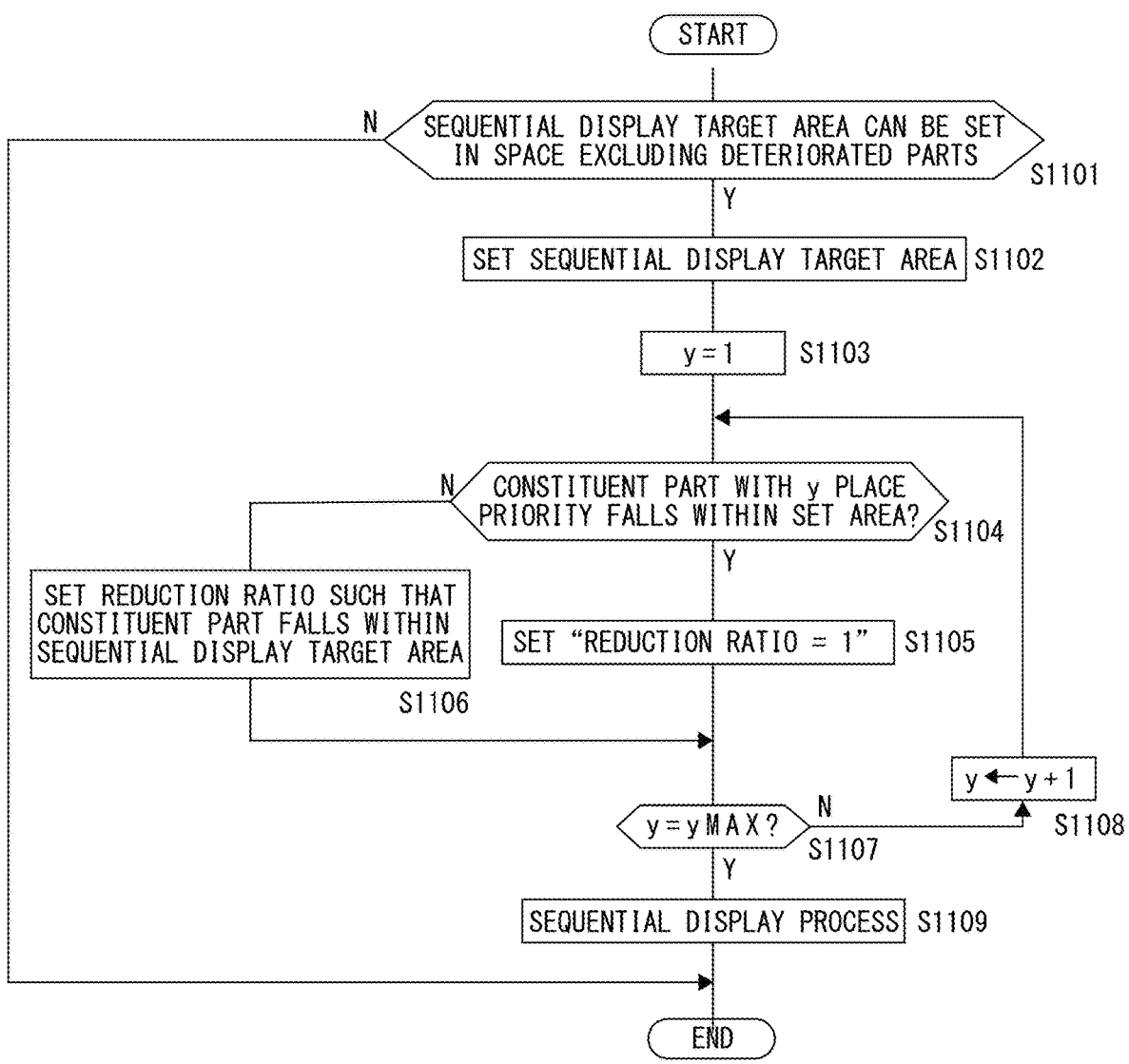
FIG. 33 is a flowchart illustrating a procedure for a process that should be executed to achieve the arrangement location change method as the modification 3.

FIG. 33 is a flowchart illustrating a procedure for a process that should be executed to achieve the arrangement location change method as the modification 3.

Note that, to execute the process illustrated in this drawing, it is assumed that the processes of Steps S201 to S208 illustrated in FIG. 24 have been already executed, and the determination result that the deteriorated constituent part has been identified is obtained at Step S208.

In this case, the control unit 30 first determines whether the sequential display target area Av can be set in the space excluding the deteriorated parts D or not at Step S1101. Since the method for searching the sequential display target area Av has already been described above, the following omits the overlapped description.

When the control unit 30 determines that the sequential display target area Av cannot be set, the control unit 30 terminates the processes illustrated in this drawing. That is, the control unit 30 determines that the correction is impossible in this case and does not execute the process for the deterioration correction of the web page wp.

Meanwhile, when the control unit 30 determines that the sequential display target area Av can be set, the control unit 30 sets the sequential display target area Av at Step S1102, sets "1" to the priority identification value y at the subsequent Step S1103, and then determines whether the constituent part p with the y place priority falls within the set area (namely, the area AV set at Step S1102) or not at Step S1104. Specifically, the control unit 30 determines whether the vertical and lateral lengths of the corresponding constituent pad p fall within the respective vertical and lateral lengths of the set sequential display target area Av or not.

When determining that the corresponding constituent part p falls within the set area at Step S1104, the control unit 30 executes a process to set a reduction ratio to 1 time as a reduction ratio setting process of the constituent part p with they place priority at Step S1105, and advances the process to Step S1107.

Meanwhile, when determining that the corresponding constituent part p does not fall within the set area at Step S1104, the control unit 30 executes a process to set the reduction ratio such that the constituent part p falls within the sequential display target area Av as the reduction ratio setting process of the constituent part p with the y place priority at Step S1106, and advances the process to Step S1107.

At Step S1107, the control unit 30 determines whether the priority identification value y has reached the upper limit value yMAX or not. When the priority identification value y does not reach the upper limit value yMAX, the control unit 30 executes the increment process of the priority identification value y at Step S1108 and then returns the process to Step S1104.

This repeats the processes from Step S1104 to Step S1107 on the respective constituent parts p.

Meanwhile, when determining that the priority identification value y has reached the upper limit value yMAX, the control unit 30 executes a sequential display process at Step S1109. That is, the arrangement locations for the constituent parts p are changed in the order from the constituent part p with the first priority such that the respective constituent pads p with the image sizes at the set degrees of reduction are sequentially displayed in the set sequential display target area Av. At this time, the arrangement location change of the constituent parts p is executed such that the display time lengths of the display target constituent parts p in the sequential display target area Av is the time lengths fixed according to the priorities of these constituent parts p.

Although the description by the illustration is omitted, in the process of the arrangement location change process for the above-described sequential display, the control unit 30 in this case transmits the created web page data to the user terminal 4 side each time the control unit 30 creates this web page data in which the new constituent part p is arranged in the sequential display target area Av and causes the user terminal 4 to execute the re-projection process.

This sequentially exchanges the constituent parts p displayed in the sequential display target area Av also in the projected content.

2-7. Modification 4

In the second embodiment as well, like the modification 1 of the first embodiment, the arrangement location can be changed based on the difference information, considering the aspect of the transition of the difference information over time identified from the comparisons between the plurality of imaging data obtained at the respective time points and the assumed display data.

Specifically, the arrangement location is changed based on the difference information, on condition that the above-described aspect of the transition of the difference information over time matches a predetermined aspect.

In this case as well, as a first example, it is conceivable that the display aspect is changed based on the difference information, on condition that the amount of change of the difference information from the previous change of the arrangement location is a predetermined amount or more.

Figure 34:
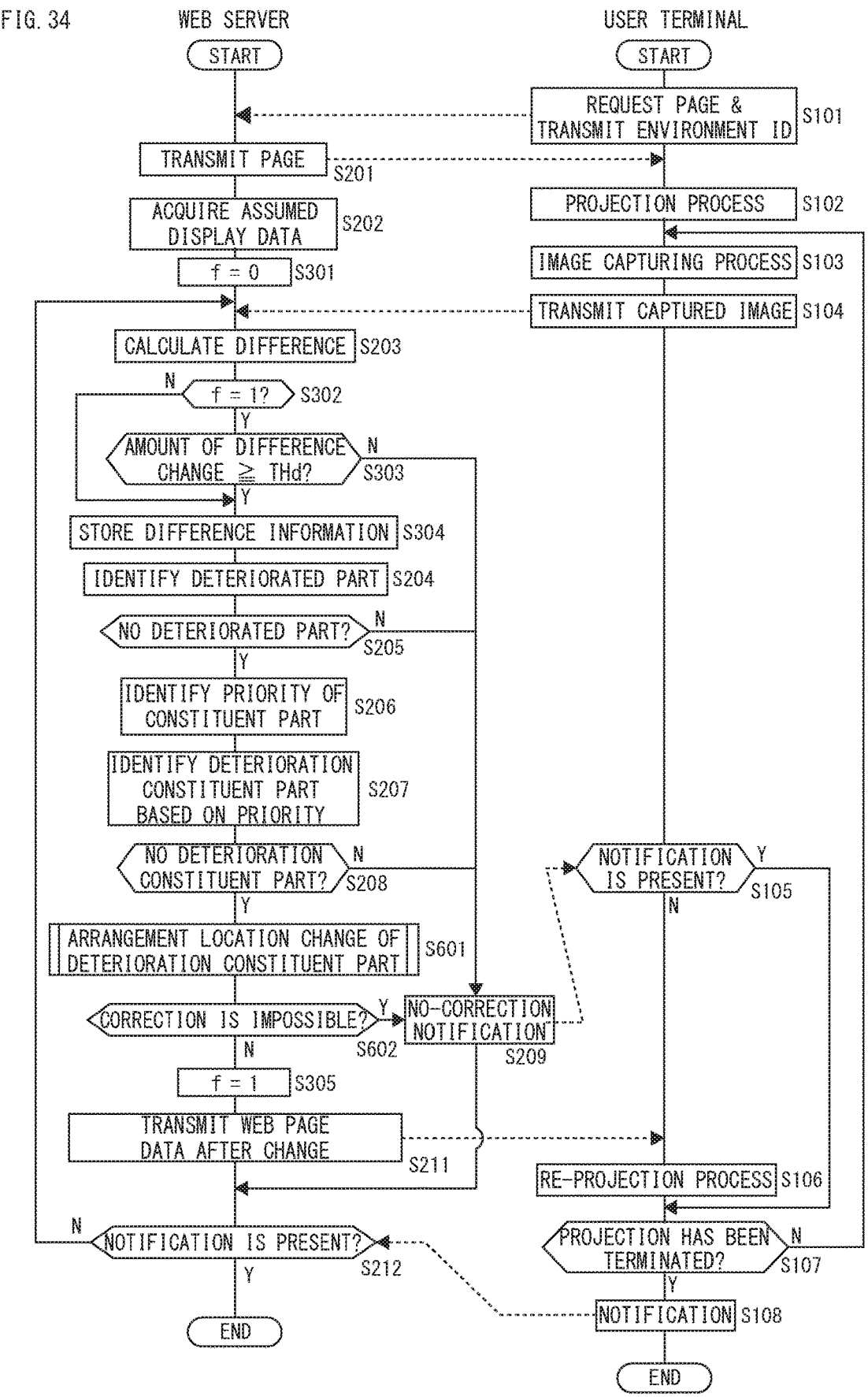
FIG. 34 is a flowchart illustrating a process as a first example in a modification 4 of the second embodiment.

FIG. 34 is a flowchart illustrating a procedure for a specific process that should be executed in this case.

The differences from the previous process of FIG. 11 are that the arrangement location change process at Step S601 is executed instead of the display aspect change process at Step S210 and the determination process of Step S602 is inserted between Step S601 and Step S305. In this case, when it is determined that the correction is impossible at Step S602, the no-correction notification process of Step S209 is executed. When it is determined that the correction is not impossible, the process of Step S305 is executed.

The method as the first example prevents the unnecessary execution of the arrangement location change process when there is no change in the occurrence aspect of the deteriorated part D and allows reducing the processing load related to the arrangement location change.

Additionally, as the arrangement location determination method considering the above-described "aspect of the transition of the difference information over time," it is conceivable, as a second example, that the arrangement location is changed on condition that the difference between the assumed display data and the imaging data indicated by the difference information is continuous.

Figure 35:
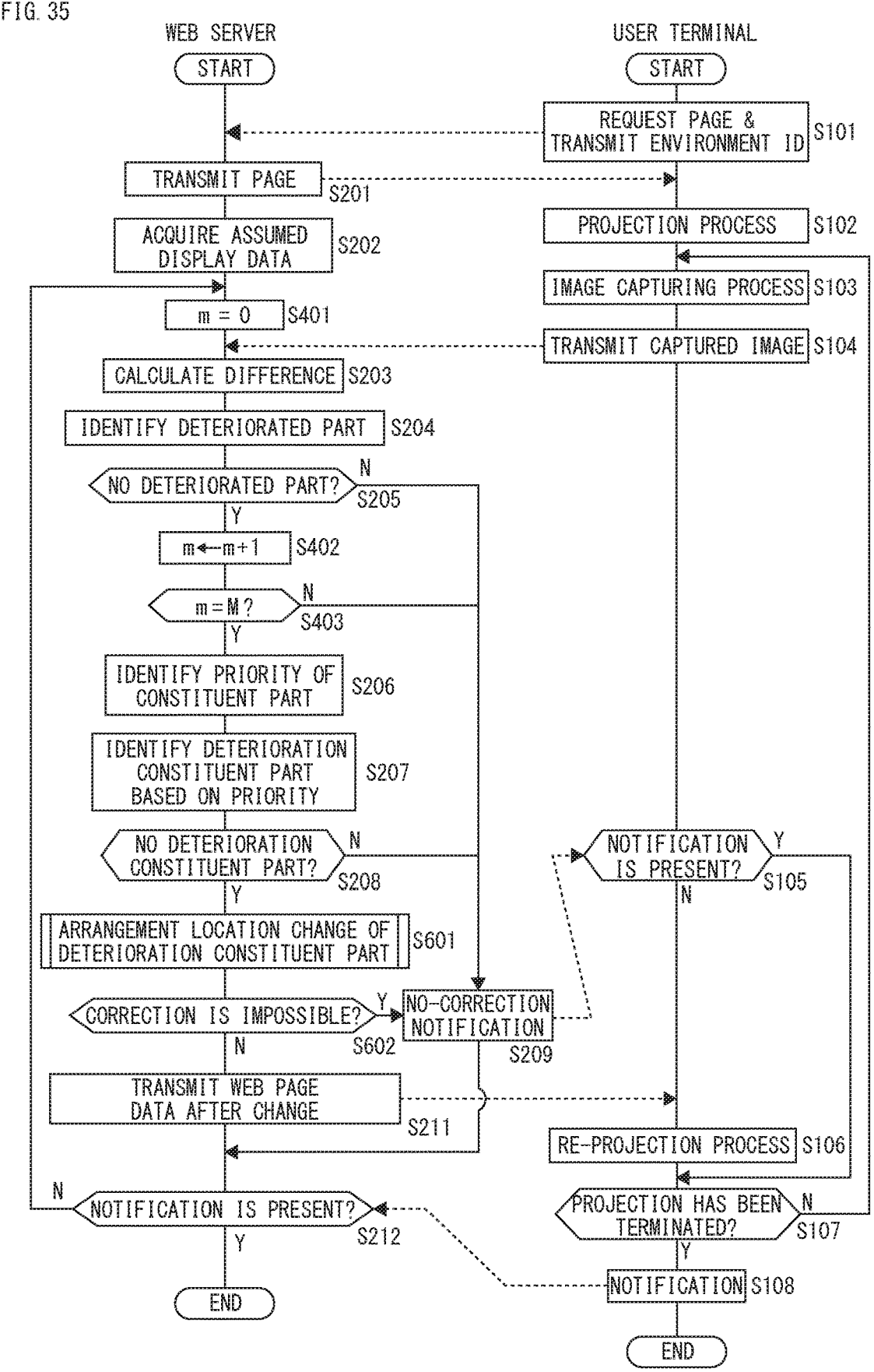
FIG. 35 is a flowchart illustrating a process as a second example in the modification 4 of the second embodiment.

FIG. 35 is a flowchart illustrating a procedure for a specific process that should be executed in this case.

The differences from the previous process of FIG. 12 are that the arrangement location change process of Step S601 is executed instead of the display aspect change process of Step S210 and the determination process of Step S602 is inserted between Step S601 and Step S211. In this case, when it is determined that the correction is impossible at Step S602, the no-correction notification process of Step S209 is executed. When it is determined that the correction is not impossible, the transmission process of Step S211 is executed.

The method as the second example prevents the unnecessary execution of the arrangement location change process following the temporal difference and allows reducing the processing load related to the arrangement location change.

Furthermore, in the second embodiment as well, as a method to prevent following the temporal difference, the method as another example using the first cycle and the second cycle previously described in FIG. 13 is employable.

Figure 36:
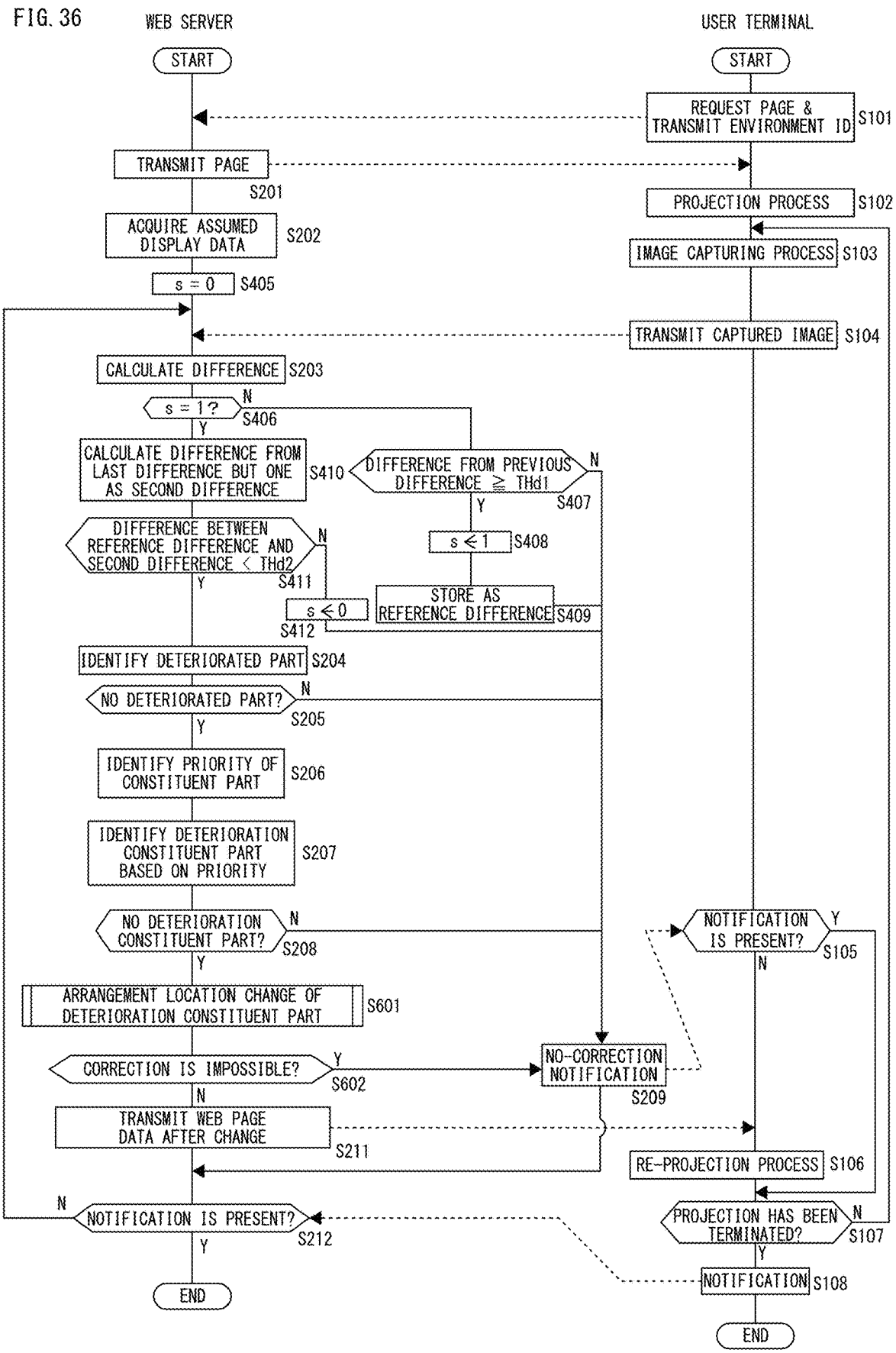
FIG. 36 is a flowchart illustrating a process as yet another second example in the modification 4.

A flowchart of FIG. 36 illustrates a procedure for a process that should be executed in the case.

Compared with the process of FIG. 13, this case is different in that the arrangement location change process of Step S601 is executed instead of the display aspect change process of Step S210 and the determination process of Step S602 is inserted between Step S601 and Step S211. In this case as well, when it is determined that the correction is impossible at Step S602, the no-correction notification process of Step S209 is executed. When it is determined that the correction is not impossible, the transmission process of Step S211 is executed.

In the second embodiment as well, by the use of the method similar to FIG. 13, deterioration of responsiveness of the deterioration correction can be effectively suppressed while the unnecessary execution of the deterioration correction following the temporal difference is prevented at the same time.

2-8. Modification 5

In the second embodiment as well, similar to the above-described modification 2 of the first embodiment, the priority of the constituent part p can be fixed according to the attribute of the constituent part p. That is, the priority identification processing unit F4a identifies the priorities set according to these attributes with respect to each constituent part p.

The priorities of the constituent parts p may be fixed according to the appearance frequencies of the constituent parts p.

In this case as well, the priority can be set according to the data amount (data size) of the constituent part p.

Furthermore, the priority can be identified based on the above-described feature quantity of the constituent part p (for example, the amount of edge and the density of the edge in the constituent part p).

2-9. Modification 6

The process related to the arrangement location determination of the constituent part p can be executed on the user terminal 4 side, similar to the modification 3 of the first embodiment.

Figure 37:
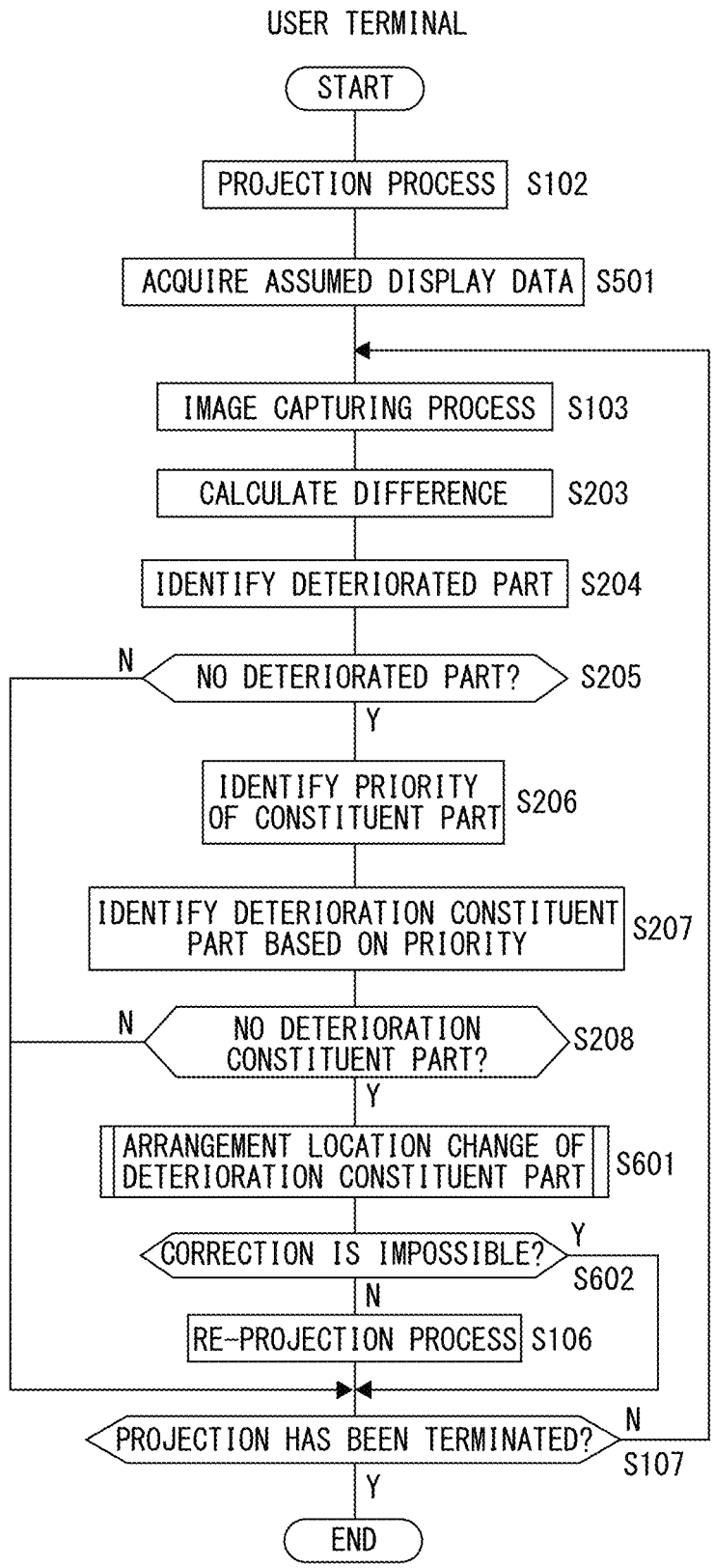
FIG. 37 is a flowchart illustrating a process as a modification 5 in the second embodiment.

FIG. 37 is a flowchart illustrating a procedure for a process that should be executed by the control unit 40 in the user terminal 4 in this case.

The differences from the previous FIG. 14 are that the arrangement location change process of Step S601 is executed instead of the display aspect change process of Step S210 and the determination process of Step S602 is inserted between Step S601 and Step S106. In this case, when it is determined that the correction is impossible at Step S602, the re-projection process of Step S106 is skipped and the process of Step S107 is executed. When it is determined that the correction is not impossible, the re-projection process of Step S106 is executed.

Note that the processes related to the arrangement location determination in the second embodiment, specifically the processes from the content data acquisition processing unit F1 to the content data creation processing unit F7 illustrated in FIG. 19, are not limited to the case where the web server 3' or the user terminal 4 is in charge of all processes, but the respective web server 3' and user terminal 4 may be partially in change of the processes.

2-10. Modification 70

The arrangement location change of the second embodiment is also not limited to the case achieved by the description change of the HTML data, and the change can be achieved by the image process on the image data such as JPEG. In this case as well, the use of the image process can extract any range in the projected content as the component of this content, thereby ensuring execution of the arrangement location change of the extracted component.

2-11. Summary of Second Embodiment

As described above, the content projection control device (web server 3') of the second embodiment includes the content data acquisition unit (content data acquisition processing unit F1), the projection area data acquisition unit (projection area data acquisition processing unit F2), the deteriorated part identification unit (deteriorated part identification processing unit F3), the priority identification unit (the priority identification processing unit F4a), and the arrangement location determination unit (arrangement location determination processing unit F6). The content data acquisition unit is configured to acquire the content data representing the content that includes at least one or more components. The projection area data acquisition unit is configured to acquire the projection area data representing the projection area. The deteriorated part identification unit is configured to identify a deteriorated part based on the projection area data. The deteriorated part is a part where the projection condition is deteriorated in the projection area. The priority identification unit is configured to identify the priority of the component constituting the projected content. The arrangement location determination unit is configured to determine the arrangement locations of the component included in the content data based on the position of the identified deteriorated part in the projection area, the content data projected onto the projection area, and the priority of the component included in the content data, such that the proportion of the one or more components with the relatively low priorities included in the deteriorated part is higher than the proportion of the one or more components with the relatively high priorities included in the deteriorated part.

This suppresses the deterioration of visibility of the relatively important information.

Therefore, even when the condition of the area to be projected is poor, the deterioration of visibility of the projected content can be suppressed.

With the content projection control device of the second embodiment, the deteriorated part identification unit is configured to identify the deteriorated part based on the captured image and the image of the content. The captured image is an image produced by capturing the image of the content projected onto the projection area, and the content is represented by the content data.

This allows properly identifying the component requiring the correction in the projected content.

Furthermore, with the content projection control device of the second embodiment, the arrangement location determination unit is configured to determine the arrangement locations of the components included in the content data based on the comparisons of the degrees of deterioration indicative of the degrees of deterioration calculated with respect to each identified deteriorated part and the thresholds according to the priorities of the components.

Accordingly, the arrangement location change is not executed on all components overlapped with the deteriorated parts but can be selectively executed on the component selected based on the degree of deterioration and the priority of the component.

This allows preventing unnecessarily increasing the components whose arrangement locations are to be changed, thereby ensuring reducing the processing load related to the change in arrangement location.

Furthermore, with the content projection control device of the second embodiment, the arrangement location determination unit is configured to calculate the degree of deterioration based on the difference in the feature quantities between the captured image and the image of the content. The captured image is an image produced by capturing an image of the content projected onto the projection area, and the content is represented by the content data.

This allows properly identifying the component target for the arrangement location change based on the magnitude of the degree of deterioration of visibility.

Additionally, with the content projection control device of the second embodiment, the arrangement location determination unit is configured to calculate the degree of deterioration based on the size of the deteriorated part identified based on the captured image and the content. The captured image is an image produced by capturing an image of the content projected onto the projection area, and the content is represented by the content data.

This allows properly identifying the component target for the arrangement location change based on the size of the part where the visibility is worsened.

Furthermore, with the content projection control device of the second embodiment, the arrangement location determination unit is configured to determine the arrangement locations in the descending order of the priority of the component.

This ensures securing a good position in the display area as the priority of the component becomes high, and the arrangement such that the visibility is enhanced as the information becomes important is possible.

Further, with the content projection control device of the second embodiment, the arrangement location determination unit is configured to determine the arrangement locations such that a range included in the deteriorated part is reduced only for the one or more components with the relatively high priorities among the components included in the deteriorated part.

Accordingly, since the arrangement overlapping with the deteriorated part is permitted for the components with the relatively low priorities, the arrangement locations of the components are easily determined in the limited space. Especially, in the case where the size reduction of the components and the aspect ratio change are permitted, a possibility of execution of the size reduction and the aspect ratio change can be lowered, thereby ensuring reducing the processing load accompanying these size reduction and aspect ratio change.

Further, with the content projection control device of the second embodiment, the priority identification unit is configured to identify the priority based on the feature quantity of the component included in the content.

This allows setting the appropriate priority according to the feature of the component.

Furthermore, with the content projection control device of the second embodiment, the priority identification unit is configured to identify the priority based on the projected size of the component included in the content.

It can be said that the larger the projected size of the component is, the higher the degree of importance of this component is; therefore, the configuration ensures appropriately determining the arrangement location in accordance with the degree of importance of the component.

Further, with the content projection control device of the second embodiment, the priority identification unit is configured to identify the priority based on the attribute of the component included in the content.

It can be said that the degree of importance of the component is correlated to this attribute of the component; therefore, the configuration ensures appropriately determining the arrangement location in accordance with the degree of importance of the component.

3. Program and Storage Medium

The web server 3 and the user terminal 4 as the first embodiment and the web server 3' and the user terminal 4 as the second embodiment of the information processing device according to the present invention have been described above. The programs of these embodiments are programs that cause the information processing device (such as a CPU) to execute the processes of these web server 3, web server 3', and user terminals 4.

The program of the first embodiment causes the information processing device to achieve a content data acquisition function, a projection area data acquisition function, a deteriorated part identification function, and a display aspect change function. The content data acquisition function is configured to acquire the content data representing the content that includes at least one or more components. The projection area data acquisition function is configured to acquire the projection area data representing the projection area. The deteriorated part identification function is configured to identify the deteriorated part based on the projection area data. The deteriorated part is a part where the projection condition is deteriorated in the projection area. The display aspect change function is configured to change the display aspect of a component displayed on the deteriorated part among the one or more components included in the content data based on the position of the identified deteriorated part in the projection area and the content data displayed on the projection area.

That is, this program is equivalent to a program that causes the information processing device to execute the processes described using, for example, FIG. 10 and FIG. 14.

The program according to the second embodiment causes the information processing device to achieve the content data acquisition function, the projection area data acquisition function, the deteriorated part identification function, the priority identification function, and the arrangement location determination function. The content data acquisition unit is configured to acquire the content data representing the content that includes at least one or more components. The projection area data acquisition unit is configured to acquire the projection area data representing the projection area. The deteriorated part identification unit is configured to identify the deteriorated part based on the projection area data. The deteriorated part is a part where the projection condition is deteriorated in the projection area. The priority identification unit is configured to identify the priority of the component constituting the projected content. The arrangement location determination unit is configured to determine the arrangement locations of the components included in the content data based on the positions of the identified deteriorated parts in the projection area, the content data projected onto the projection area, and the priorities of the components included in the content data, such that the proportion of the one or more components with the relatively low priorities included in the deteriorated parts is higher than the proportion of the one or more components with the relatively high priorities included in the deteriorated parts. That is, this program is equivalent to a program that causes the information processing device to execute the processes described using, for example, FIG. 24 and FIG. 37.

The above-described program allows achieving the information processing device as the web server 3 or the user terminal 4 of the first embodiment and the web server 3' or the user terminal 4 of the second embodiment.

Then, such a program can be preliminarily stored in an HDD as a storage medium built in equipment such as a computer device, a ROM in a microcomputer including a CPU, and the like. Alternatively, such a program can be temporarily or permanently stored (recorded) in a removable storage medium such as a semiconductor memory, a memory card, an optical disk, a magneto-optical disk, and a magnetic disk. Such a removable storage medium can be provided as what is called package software.

Such a program can be installed into a personal computer and the like from the removable storage medium, and can be downloaded from a download website via a network such as a LAN and the Internet.

REFERENCE SIGNS LIST

1, 1' network system, 2 network, 3, web server, 4 user terminal, 4*a* projector unit, 5 assumed data DB, 30 control unit, 33 communication unit. 40 control unit, 43 communication unit, 45 camera unit, F1 content data acquisition processing unit, F2 projection area data acquisition processing unit, F3 deteriorated part identification processing unit, F4 display aspect change processing unit, F4*a* priority identification processing unit, F5, F7 content data creation processing unit. F6 arrangement location determination processing unit, wp web page, Ap projection area, p1-p8 constituent part, D deteriorated part, Av sequential display target area

The invention claimed is:

1. A content projection control device comprising:
   at least one processor; and
   at least one memory device that stores instructions for a computer, which when executed by the processor, cause the processor to:
   acquire content data representing content that includes one or more components;
   acquire projection area data representing a projection area;
   identify a deteriorated part based on the projection area data, the deteriorated part being a part where a projection condition is deteriorated in the projection area;
   identify a priority of a component of the one or more components included in the content; and
   suppress display deterioration of the content caused by the deteriorated part, based at least in part on a position of the identified deteriorated part in the projection area, the content data displayed on the projection area, a threshold according to the identified priority, and a degree of deterioration indicative of a level of deterioration of the component.

2. The content projection control device according to claim 1, wherein the processor suppresses the display deterioration at least in part by changing a display aspect of a component displayed on the deteriorated part among the one or more components included in the content.

3. The content projection control device according to claim 1, wherein the processor identifies the deteriorated part based at least in part on a captured image and an image of the content, the captured image being an image produced by capturing an image of the content projected onto the projection area, the content being represented by the content data.

4. The content projection control device according to claim 1, wherein the processor identifies the priority of the component based at least in part on a feature quantity of the component included in the content.

5. The content projection control device according to claim 1, wherein the processor identifies the priority of the component based at least in part on a projected size of the component included in the content.

6. The content projection control device according to claim 1, wherein the processor identifies the priority of the component based at least in part on an attribute of the component included in the content.

7. The content projection control device according to claim 2, wherein
   the component includes a character, and
   the processor suppresses the display deterioration at least in part by changing a display color of the character included in the component to a color emphasized with respect to a color of the deteriorated part.

8. The content projection control device according to claim 2, wherein
   the component includes a character, and
   the processor suppresses the display deterioration at least in part by changing a display color other than a display color of the character included in the component to a color assimilated to a color of the deteriorated part.

9. The content projection control device according to claim 1, wherein the processor suppresses the display deterioration at least in part by determining arrangement locations of the one or more components such that a proportion of the one or more components with relatively low priorities included in the deteriorated part is higher than a proportion of the one or more components with relatively high priorities included in the deteriorated part.

10. The content projection control device according to claim 9, wherein the processor determines the arrangement locations of each of the one or more components in a descending order of priority.

11. The content projection control device according to claim 9, wherein the processor determines the arrangement locations such that a range included in the deteriorated part is reduced only for components with the relatively high priority among the one or more components included in the deteriorated part.

12. The content projection control device according to claim 1, wherein the processor calculates the degree of deterioration based at least in part on a difference in feature quantities between a captured image and an image of the content, the captured image being an image produced by capturing an image of the content projected onto the projection area, the content being represented by the content data.

13. The content projection control device according to claim 1, wherein the processor calculates the degree of deterioration based at least in part on a size of the deteriorated part identified based on a captured image and the content, the captured image being an image produced by capturing an image of the content projected onto the projection area, the content being represented by the content data.

14. The content projection control device accordingly claim 1, further comprising
an image-capturing unit configured to capture an image of the projection area.

15. An information processing method comprising:
acquiring content data representing content that includes one or more components;
acquiring projection area data representing a projection area;
identifying a deteriorated part based on the projection area data, the deteriorated part being a part where a projection condition is deteriorated in the projection area;
identifying a priority of a component of the one or more components included in the content; and
suppressing a display deterioration of the content caused by the deteriorated part based at least in part on a position of the identified deteriorated part in the projection area, the content data displayed on the projection area, a threshold according to the identified priority, and a degree of deterioration indicative of a level of deterioration of the component.

* * * * *